US011920574B2

(12) United States Patent
Murison et al.

(10) Patent No.: US 11,920,574 B2
(45) Date of Patent: Mar. 5, 2024

(54) DEVICES EXPLOITING FLUIDIC SYSTEMS AND ACTUATORS

(71) Applicants: Bruce Murison, North Gower (CA); Dylan Carson, Cloyne (CA)

(72) Inventors: Bruce Murison, North Gower (CA); Dylan Carson, Cloyne (CA)

(*) Notice: Subject to any disclaimer, the term of this patent is extended or adjusted under 35 U.S.C. 154(b) by 689 days.

(21) Appl. No.: 16/645,325

(22) PCT Filed: Sep. 7, 2018

(86) PCT No.: PCT/CA2018/000168
§ 371 (c)(1),
(2) Date: Mar. 6, 2020

(87) PCT Pub. No.: WO2019/046927
PCT Pub. Date: Mar. 14, 2019

(65) Prior Publication Data
US 2021/0161757 A1 Jun. 3, 2021

Related U.S. Application Data

(60) Provisional application No. 62/555,158, filed on Sep. 7, 2017.

(51) Int. Cl.
F04B 17/04 (2006.01)
A61H 9/00 (2006.01)
(Continued)

(52) U.S. Cl.
CPC ............ F04B 17/04 (2013.01); A61H 19/34 (2013.01); A61H 23/04 (2013.01); F16K 27/029 (2013.01);
(Continued)

(58) Field of Classification Search
CPC .. F04B 11/0008; F04B 11/0091; F04B 17/04; F04B 17/044; F16K 31/0627; F16K 11/044; F16K 27/003; F16K 27/029
(Continued)

(56) References Cited

U.S. PATENT DOCUMENTS 2,515,110 A    7/1950  Bornstein
4,444,215 A *  4/1984  Zukausky ............... F16K 19/00
                                                        137/98
(Continued)

FOREIGN PATENT DOCUMENTS

CN    2729362 Y    9/2005
EP    2712601 A1   4/2014
(Continued)

OTHER PUBLICATIONS

European Patent Office, European search report for Application No. 18855051.1-1122, dated Feb. 15, 2022, 12 pages.
(Continued)

Primary Examiner — Kenneth J Hansen
(74) Attorney, Agent, or Firm — Stetina Brunda Garred & Brucker

(57) ABSTRACT

The application of fluidic systems to a variety of consumer devices would typically exploit fluidic structures of a few millimeters to a centimeter or so that are between the common fluidic realms of microfluidics and macrofluidics. For these devices power consumption, portability, batter operation etc. are significant factors in the design and implementation of these fluidic systems. However, the necessary range of fluidic device structures for electromagnetically driven high efficiency pumps, valves, switches, capacitors etc. require development to provide both the required functionality as well as to meet the user expectations for functionality, variability, cost, etc. but also lifetime, reliabil-
(Continued)

ity, manufacturability etc. of the consumer devices exploiting these fluidic systems.

8 Claims, 44 Drawing Sheets

(51) Int. Cl.
*A61H 19/00* (2006.01)
*A61H 23/04* (2006.01)
*F16K 27/02* (2006.01)

(52) U.S. Cl.
CPC ............ *A61H 9/0078* (2013.01); *A61H 19/40* (2013.01); *A61H 2201/0157* (2013.01); *A61H 2201/1246* (2013.01)

(58) Field of Classification Search
USPC .................................. 137/565.01, 597, 883
See application file for complete search history.

(56) References Cited

U.S. PATENT DOCUMENTS

| | | | |
|---|---|---|---|
| 5,653,249 A * | 8/1997 | Reinartz | F16K 27/029 137/1 |
| 6,491,717 B1 | 12/2002 | Stanley et al. | |
| 6,889,709 B2 * | 5/2005 | Hanada | F16K 41/103 137/883 |
| 7,258,676 B2 | 8/2007 | Calderon et al. | |
| 8,449,274 B1 * | 5/2013 | Zelechonok | F04B 17/04 417/419 |
| 2007/0235093 A1 * | 10/2007 | Hettinger | F16K 27/029 137/625.43 |
| 2011/0077723 A1 | 3/2011 | Parish et al. | |
| 2012/0277641 A1 | 11/2012 | Wasowski | |
| 2014/0088468 A1 | 3/2014 | Murison | |
| 2014/0257149 A1 | 9/2014 | Cotton | |
| 2016/0074276 A1 | 3/2016 | Scheuring et al. | |
| 2016/0239025 A1 | 8/2016 | Van Der Merwe et al. | |

FOREIGN PATENT DOCUMENTS

| | | |
|---|---|---|
| EP | 3117106 A1 | 1/2017 |
| KR | 101310516 | 10/2013 |
| WO | WO2015135070 | 9/2015 |
| WO | 2018119508 A1 | 7/2018 |

OTHER PUBLICATIONS

Patent Cooperation Treaty, International Search Report for International Application No. PCT/CA2018/000168, dated Jan. 24, 2019, 10 pages.

* cited by examiner

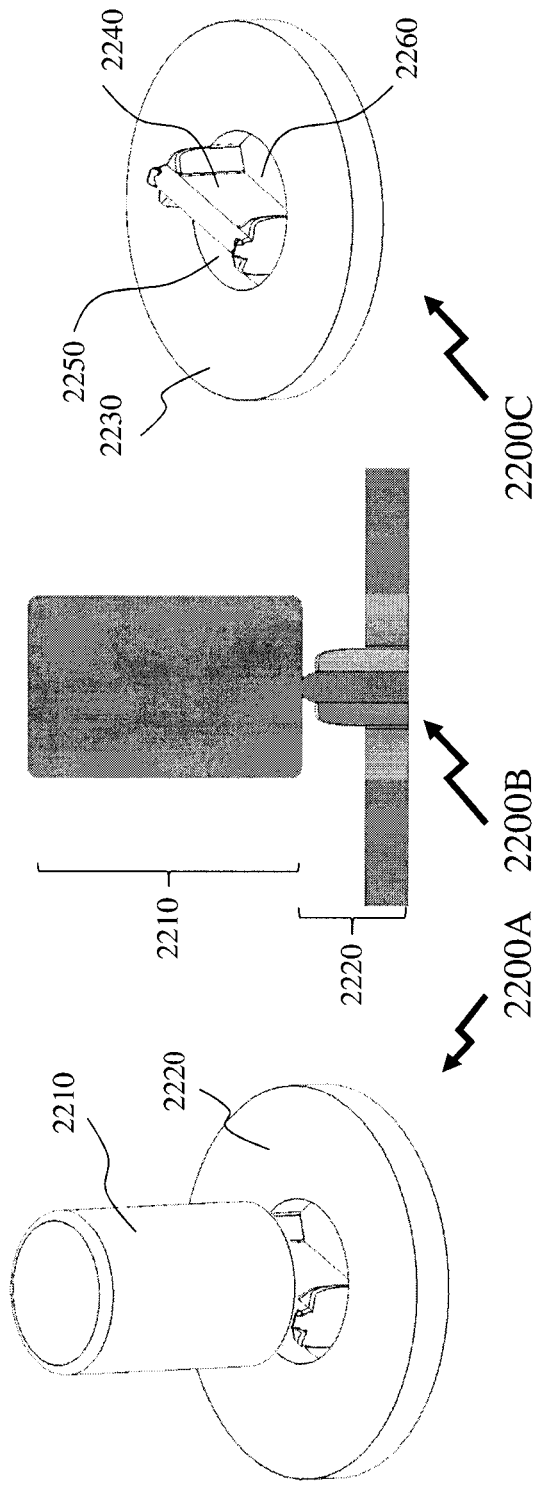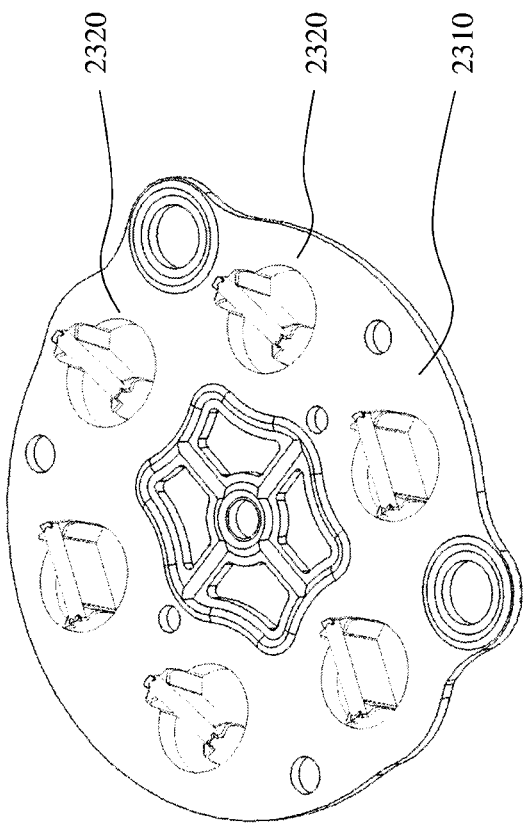
Figure 22
Figure 23

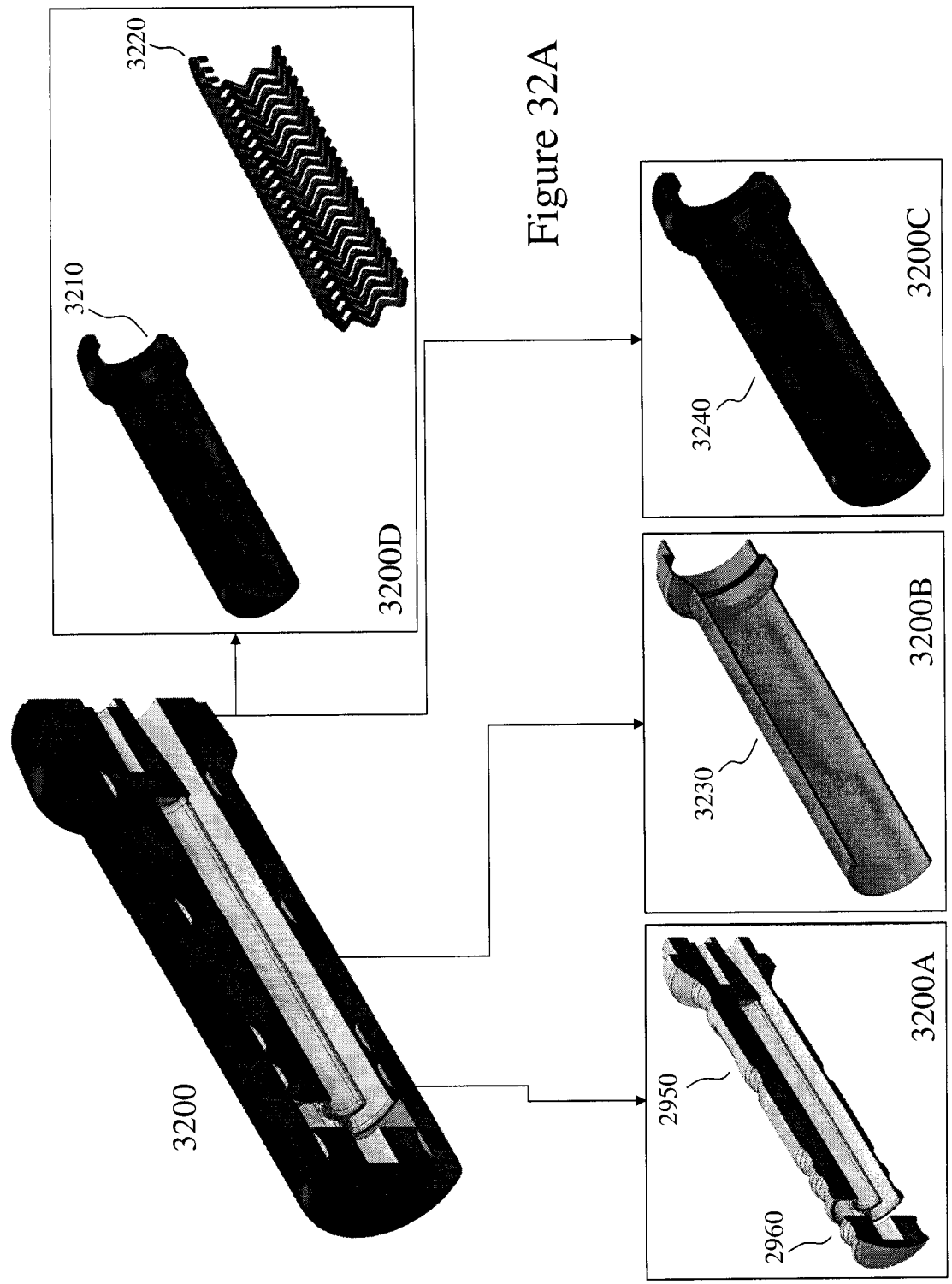

DEVICES EXPLOITING FLUIDIC SYSTEMS AND ACTUATORS

CROSS-REFERENCE TO RELATED APPLICATIONS

The present application claims priority to PCT International Application No. PCT/CA2018/000168 filed on Sep. 7, 2018, which relates to and claims the benefit of U.S. Provisional Application No. 62/555,158 filed on Sep. 7, 2017, the entirety of the disclosures of which are expressly incorporated herein by reference

STATEMENT RE: FEDERALLY SPONSORED RESEARCH/DEVELOPMENT

Not Applicable

FIELD OF THE INVENTION

The present invention relates to devices exploiting fluidic control in conjunction with vibratory and non-vibratory function and movement.

BACKGROUND OF THE INVENTION

Within the prior art fluidics has been primarily implemented at either opposite ends of the dimensional spectrum with microfluidic devices and macrofluidic devices. Microfluidic devices typically exploit capillary action to generate fluidic flow for manipulating biological samples etc. exploiting micrometer sized channel structures. Macrofluidic devices exploit a variety of pumps for a wide range of systems such as hydraulic systems, compressed air etc. where dimensions of the fluidic structures range from a centimeter or so in diameter upwards. Within these systems valves, pumps, etc. tend to be mains powered.

However, the application of fluidic systems to a variety of consumer devices would typically exploit fluidic structures of a few millimeters to a centimeter where power consumption, portability, batter operation etc. become significant factors in the design and implementation of these fluidic systems. Accordingly, it would be desirable to provide pumps, valves, and actuators that allow for high efficiency, high power to size ratio, low cost, limited or single moving part(s) etc. This regimen of fluidics between the micro and macro scales has been largely bypassed. As a result, the inventor has established a range of fluidic device structures for electromagnetically driven high efficiency pumps, valves, switches, capacitors etc. enabling a range of fluidic based consumer devices to be designed and implemented. As a result of developments with such actuators, fluidic systems and devices the inventor has established both new additional designs and design features to enable fluidic devices to meet user expectations for functionality, variability, cost, etc. but also lifetime, reliability, manufacturability etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to devices exploiting fluidic control in conjunction with vibratory and non-vibratory function and movement.

In accordance with an embodiment of the invention there is provided a device comprising:
a fluidic motor coupled to a reservoir for pumping a fluid from a negative side to a positive side;
at least one fluidic actuator of a plurality of fluidic actuators coupled via a first valve to the positive side of the fluidic motor and via a second valve to the negative side of the fluidic motor;
a scaffold providing a mechanical structure at least one of housing the fluidic motor and attached to the fluidic motor; and
a casing surrounding forming an exterior surface of device for sexual stimulation; wherein
the exterior surface of the scaffold disposed towards the casing comprising one or more surface structures fluidically coupled to the negative side of the fluidic pump such that any fluid leaking into the region between the scaffold and the spacing is coupled back to the reservoir.

In accordance with an embodiment of the invention there is provided a device comprising:
a scaffold providing a mechanical structure comprising a plurality of sections manufactured separately to one another and assembled to form the scaffold; wherein
the plurality of sections combine to define a plurality of fluidic channels within the scaffold; and
each fluidic channel of the plurality of fluidic channels has at least one inlet port at first end of the scaffold, at least one outlet port on the scaffold, and covers a predetermined portion of the cross-section of the scaffold.

In accordance with an embodiment of the invention there is provided a device comprising:
an electromagnetic pump for pumping fluid either from a reservoir to one or more actuators within the device or to a reservoir from one or more actuators; wherein
the reservoir is defined by a region around the electromagnetic pump and a scaffold such that a first predetermined portion of a compliant casing disposed over the scaffold is supported by the scaffold under operation of the electromagnetic pump and a second predetermined portion of the compliant casing can deform at least one of above and below the surface defined by the scaffold under the operation of the electromagnetic pump.

In accordance with an embodiment of the invention there is provided a device comprising:
a plurality of electromagnetically driven valves disposed within a body comprising:
a piston;
a bobbin within which the piston slides and around which one or more electromagnetic coils for driving the electromagnetically driven valve are disposed;
a first compliant gasket disposed at one end of the bobbin comprising a pair of openings to form a first valve of the valve pair such that when the piston is disposed adjacent the first compliant gasket the first valve is closed and open when the piston is not disposed adjacent the first compliant gasket;
a first manifold disposed adjacent the first compliant gasket of each electromagnetically driven valve of the plurality of electromagnetically driven valves comprising inlets coupled to a first opening of the pair of openings and outlets coupled to a second opening of the pair of openings;
the inlets of the first manifold are coupled to one side of an electromagnetically driven pump; and the outlets of the first manifold are each coupled to a fluidic channel forming a predetermined portion of the device.

In accordance with an embodiment of the invention there is provided a device comprising:
a first plurality of electromagnetically driven valves disposed within a body comprising:
a piston;
a bobbin within which the piston slides and around which one or more electromagnetic coils for driving the electromagnetically driven valve are disposed;
a first compliant gasket disposed at one end of the bobbin comprising a pair of openings to form a first valve of the valve pair such that when the piston is disposed adjacent the first compliant gasket the first valve is closed and open when the piston is not disposed adjacent the first compliant gasket;
a first fluidic reservoir receiving fluid from one side of an electromagnetically driven pump coupled to a first opening of the pair of openings of each electromagnetically driven valve of the plurality of electromagnetically driven valves;
a plurality of actuators each coupled to a second opening of the pair of openings of each electromagnetically driven valve of a predetermined subset of the plurality of electromagnetically driven valves.

In accordance with an embodiment of the invention there is provided a device comprising:
a scaffold providing a resilient mechanical structure comprising a plurality of sections that define a plurality of fluidic channels within the scaffold; and
each fluidic channel of the plurality of fluidic channels has at least one inlet port at first end of the scaffold, at least one outlet port on the scaffold, and covers a predetermined portion of the cross-section of the scaffold.

In accordance with an embodiment of the invention there is provided a device comprising:
a central body comprising at least a tube for coupling a fluid from an input port of the central body which is coupled to an external fluidic circuit to one or more output ports within the central body;
an outer shell disposed around the central body formed from a first predetermined material having a first predetermined Young's modulus and having a first dimension along a predetermined axis of the central body;
a plurality of elements, each element disposed at a predetermined location within the outer shell, formed from a second predetermined material having a second predetermined Young's modulus, and having a second dimension along the predetermined axis of the central body larger than the first dimension; wherein
absent fluid between the outer shell and the central body the outer shell has a dimension along the predetermined axis of the central body equal to the first dimension; and
for fluid pressures below a first predetermined volume the outer shell has a dimension along the predetermined axis of the central body between the first dimension and the second dimension; and
for fluid pressures above the first predetermined volume the outer shell has a dimension along the predetermined axis of the central body equal to the second dimension.

In accordance with an embodiment of the invention there is provided a device comprising:
a central body comprising at least a tube for coupling a fluid from an input port of the central body which is coupled to an external fluidic circuit to one or more output ports within the central body;
an outer shell disposed around the central body formed from a first predetermined material having a first predetermined Young's modulus and having a first dimension along a predetermined axis of the central body;
a plurality of elements, each element disposed at a predetermined location within the outer shell, formed from a second predetermined material having a second predetermined Young's modulus, and having a second dimension along the predetermined axis of the central body larger than the first dimension; wherein
absent fluid between the outer shell and the central body the outer shell has a dimension along the predetermined axis of the central body equal to the first dimension; and
for fluid pressures below a first predetermined volume the outer shell has a dimension along the predetermined axis of the central body between the first dimension and the second dimension and each element has a dimension along the predetermined axis of the central body equal to the second dimension;
for fluid pressures between the first predetermined volume and a second predetermined volume the outer shell has a dimension along the predetermined axis of the central body greater than the second dimension and each element has a dimension along the predetermined axis of the central body greater than to the second dimension; and
for fluid pressures above the second predetermined volume the outer shell has a constant dimension established in dependence upon the second dimension, the second Young's modulus, and a force applied by the fluid against the outer shell.

In accordance with an embodiment of the invention there is provided a device comprising:
an electromagnetic pump for pumping fluid within a fluidic circuit either to or from a first actuator and from or to a second actuator;
the first actuator having a first predetermined maximum volume; and
the second actuator having a second predetermined maximum volume; wherein
the volume of the fluidic circuit comprising the electromagnetic pump, first actuator and second actuator is less than the sum of the first predetermined maximum volume and the second predetermined maximum volume.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 22 depicts a gate valve design to replace the gasket valve elements forming part of piston based actuators according to embodiments of the invention; and FIG. 23 depicts a valve assembly according to an embodiment of the invention similar to that depicted in FIG. 17 but exploiting gate valves such as depicted in FIG. 22;

FIGS. 32A and 32B depict the geometry of the extended actuator arm for the FLUDEV according to an embodiment of the invention as depicted in FIG. 29A;

DETAILED DESCRIPTION

Figure 1:
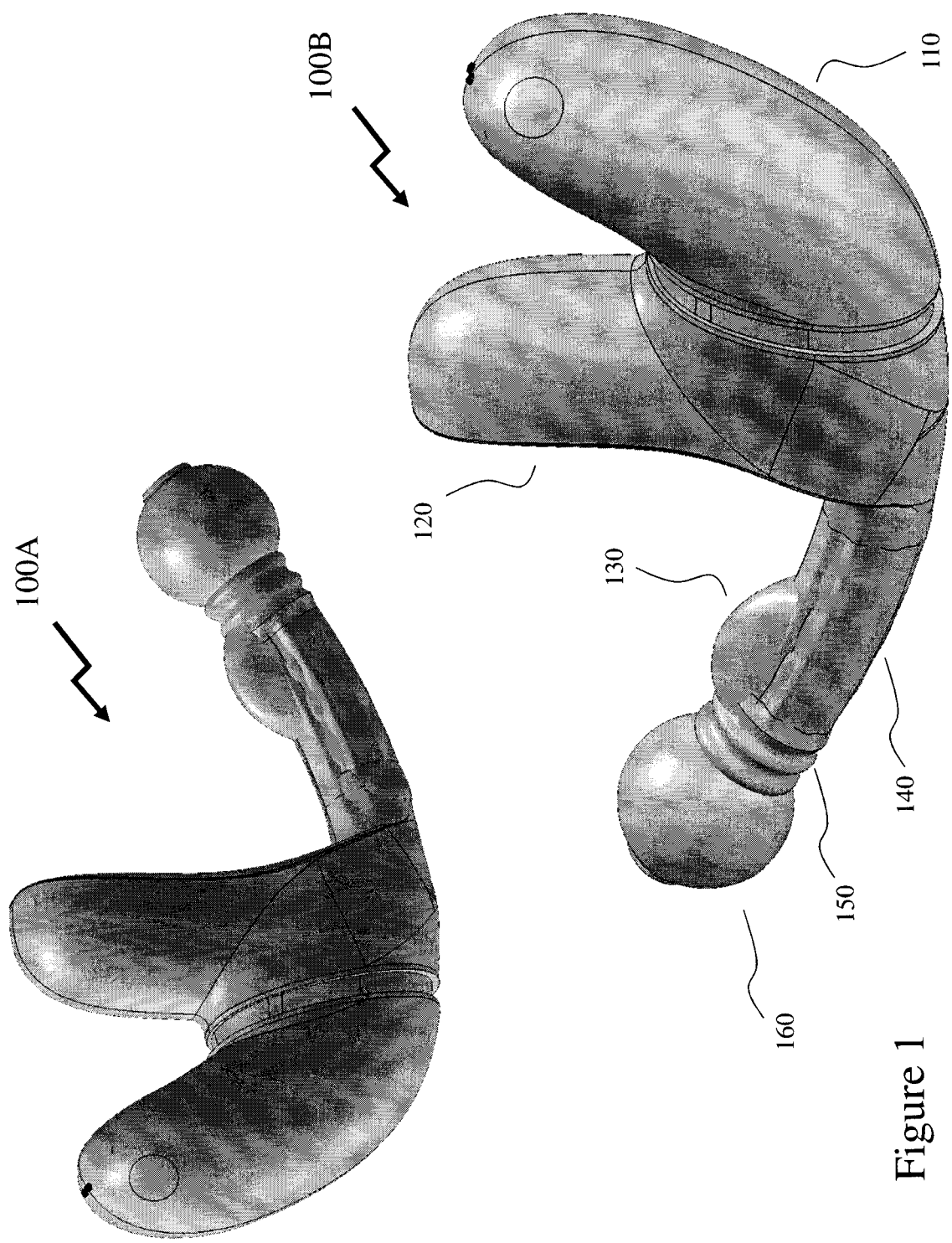
FIG. 1 depicts a fluidic device (FLUDEV) according to an embodiment of the invention providing vibration, pressure, axial extension; and radial dilation.

The present invention is directed to devices exploiting fluidic control in conjunction with vibratory and non-vibratory function and movement.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may be associated with biometric data which may be, but not limited to, monitored, acquired, stored, transmitted, processed and analysed either locally or remotely to the user. A user may also be associated through one or more accounts and/or profiles with one or more of a service provider, third party provider, enterprise, social network, social media etc. via a dashboard, web service, website, software plug-in, software application, and graphical user interface.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors. The wearable devices and/or wearable sensors may include, but not be limited to, devices that can stimulate and/or measure parameters that are designed to fit on or near the perineum, anal area, vagina, clitoral area, and nipples.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

A "fluidic device" (FLUDEV) as used herein, and throughout this disclosure, refers to a device that provides a specific function or functions to a user which exploits a fluidic system. Accordingly, such fluidic devices (FLUDEVs) may provide one or more effects including, but not limited to, linear motion, vibratory motion, radial expansion, flexural motion, and radial twisting. Such FLUDEVs may include, but not be limited to, toys, massagers, adult toys, physiotherapy devices, medical devices, and non-medical devices.

A "toy" as used herein, and throughout this disclosure, refers to any item that can be used for play adults, children and pets. These include, but are not limited to, toys that are used to discover identity, help bodies grow strong, learn cause and effect, explore relationships, and practice skills they will need as adults. Adults toys include, but are not limited to, those relating to playing to form and strengthen social bonds, teach, remember and reinforce lessons from youth, discover identity, exercise minds and bodies, explore relationships, practice skills, and decorate living spaces. Pet's toys include, but are not limited to, those relating to exercising minds and bodies.

A "massager" as used herein, and throughout this disclosure, refers to any item that can be used for the manipulation of superficial and deeper layers of muscle and connective tissue using various techniques, to enhance function, aid in the healing process, decrease muscle reflex activity, inhibit motor-neuron excitability, promote relaxation and well-being, and as a recreational activity. Accordingly, such massagers may be used upon tissues including, but not limited to, muscles, tendons, ligaments, fascia, skin, joints, or other connective tissue, lymphatic vessels, organs of the gastro-intestinal system, hands, fingers, elbows, knees, legs, arms, and feet.

An "accessory" or "accessories" as used herein, and throughout this disclosure, refers to one or more objects that can be affixed to or otherwise appended to the body of a sexual pleasure device in order to enhance and/or adjust the sensation(s) provided. Such accessories can be passive, such as nubbies, fronds, fingers, finger, dildo, etc. or they may be active, such as a vibrator(s), electrode(s), hydraulically actuated structures, etc.

A "profile" as used herein, and throughout this disclosure, refers to a computer and/or microprocessor readable data file comprising data relating to settings and/or limits of an adult device. Such profiles may be established by a manufacturer of the adult device or established by an individual through a user interface to the adult device or a portable electronic device (PED)/fixed electronic device (FED) in communication with the adult device.

A "vibrator" as used herein, and throughout this disclosure, refers to an electronic sexual pleasure device intended for use by an individual or user themselves or in conjunction with activities with another individual or user wherein the vibrator provides a vibratory mechanical function for stimulating nerves or triggering physical sensations.

A "dildo" as used herein, and throughout this disclosure, refers to a sexual pleasure device intended for use by an individual or user themselves or in conjunction with activities with another individual or user wherein the dildo provides non-vibratory mechanical function for stimulating nerves or triggering physical sensations.

A "nubby" or "nubbies" as used herein, and throughout this disclosure, refers to a projection or projections upon the surface of a sexual pleasure device intended to provide additional physical interaction. A nubby can be permanently part of the sexual pleasure device or it can be replaceable or interchangeable to provide additional variation to the sexual pleasure device.

A "scaffold" or "scaffolds" as used herein, and throughout this disclosure, refers to a structure that is used to hold up, interface with, or support another material or element(s). This includes, but is not limited to, such two-dimensional (2D) structures such as substrates and films, three-dimensional (3D) structures such as geometrical objects, non-geometrical objects, combinations of geometrical and non-geometrical objects, naturally occurring structural configurations, and manmade structural configurations. A scaffold may be solid, hollow, and porous or a combination thereof. A scaffold may contain recesses, pores, openings, holes, vias, and channels or a combination thereof. A scaffold may be smooth, textured, have predetermined surface profiles and/or features. A scaffold may be intended to support one or more other materials, one or more films, a multilayer film, one type of particle, multiple types of particles etc. A scaffold may include, but not be limited to, a spine of a device and/or a framework, for example, which also supports a shell and/or a casing. Within embodiments of the invention a scaffold may form part of the external surface of the device for which the scaffold forms part whilst in other embodiments of the invention a one or more portions of the scaffold form part of the external surface of the device of which it forms part whilst one or more other portions of the scaffold form part of the internal structure of the device whilst some of these portions may form part of both the internal structure and external surface.

A "shell" as used herein, and throughout this disclosure, refers to a structure that is used to contain and/or surround at least partially and/or fully a number of elements within adult devices according to embodiments of the invention. A shell may include, but not limited to, a part or parts that are mounted to a scaffold or scaffolds that support elements within a device according to an embodiment of the invention. Within embodiments of the invention a shell may form part of the external surface of the device for which the shell forms part whilst in other embodiments of the invention a one or more portions of the shell form part of the external surface of the device of which it forms part whilst one or more other portions of the shell form part of the internal structure of the device whilst some of these portions may form part of both the internal structure and external surface.

A "casing" as used herein, and throughout this disclosure, refers to a structure surrounding a scaffold and/or shell. This includes structures typically formed from an elastomer and/ or silicone to provide a desired combination of physical tactile surface properties to the device it forms part of and other properties including, but not limited to, hermeticity, liquid ingress barrier, solid particulate ingress barrier, surface sheen, and colour. A casing may include, but not limited to, a part or parts that are mounted to a scaffold or scaffolds and/or a casing or casings forming part of a device according to an embodiment of the invention. A casing within the adult device industry is typically a silicone coating. Within embodiments of the invention a casing may form part of the external surface of the device for which the casing forms part whilst in other embodiments of the invention a one or more portions of the casing form part of the external surface of the device of which it forms part whilst one or more other portions of the casing form part of the internal structure of the device whilst some of these portions may form part of both the internal structure and external surface.

Within the ensuing description and with respect to embodiments of the invention the terms "casing" and "shell" may be used interchangeably and are primarily differentiated by mechanical properties such that a "shell" is typically a harder, more resilient material such as a plastic or "hard" rubber/elastomer for example whereas a "casing" is typically a softer, less resilient material such as an "soft" rubber or soft elastomer. A FLUDEV may comprise a scaffold only, a scaffold with a shell, a scaffold with a casing, a scaffold with a shell and a casing, a shell and casing only without a scaffold, only a shell, and only a casing. It would be further evident that in some embodiments of the invention a material forming part of a scaffold of a FLUDEV may within other FLUDEVs be employed as the casing and/or shell. Similarly, a material employed for a casing within a FLUDEV may within other FLUDEVs be employed as a shell and/or scaffold. Whilst a casing is generally a soft material encompassing a predetermined portion of the FLUDEV nothing within the following description should be construed as limiting the use of soft materials as part of a casing and/or scaffold. For example, within one design of a FLUDEV a projecting arm or element supporting actuators may be rigid whereas within another design of the same FLUDEV the projecting arm or element may be formed from a material supporting deformation in use so that the projecting arm or element conforms to, for example, a region of a user's body rather than the region of the user's body conforming to the projecting arm or element.

An "electric motor" or "motor" as used herein, and throughout this disclosure, refers to a category of providers of motive means characterised by a periodic movement of a shaft or drive shaft connected to the motor which is powered by electricity. Such motors include DC and AC motors. This includes, but is not limited to, brushed DC motors, permanent magnet DC motors, brushless DC motors, switched reluctance motors, universal AC-DC motors, induction motors, ironless or coreless rotor motors, pancake or axial rotor motors, stepper motors, piezoelectric motors and linear motors.

A "polyester" as used herein, and throughout this disclosure, refers to a category of polymers that contain the ester functional group in their main chain. This includes, but is not limited to polyesters which are naturally occurring chemicals as well as synthetics through step-growth polymerization, for example. Polyesters may be biodegradable or not. Polyesters may be a thermoplastic or thermoset or resins cured by hardeners. Polyesters may be aliphatic, semi-aromatic or aromatic. Polyesters may include, but not be limited to, those exploiting polyglycolide, polylactic acid (PLA), polycaprolactone (PCL), polyhydroxyalkanoate (PHA), polyhydroxybutyrate (PHB), polyethylene adipate (PEA), polybutylene succinate (PBS), polyethylene terephthalate (PET), polybutylene terephthalate (PBT), polytrimethylene terephthalate (PTT), and polyethylene naphthalate (PEN).

A "thermoplastic" or "thermosoftening plastic" as used herein and throughout this disclosure, refers to a category of polymers that become pliable or moldable above a specific temperature and solidify upon cooling. Thermoplastics may include, but not be limited, polycarbonate (PC), polyether sulfone (PES), polyether ether ketone (PEEK), polyethylene (PE), polypropylene (PP), poly vinyl chloride (PVC), polytetrafluoroethylene (PTFE), polyimide (PI), polyphenylsulfone (PPSU), polychlorotrifluoroethene (PCTFE or PTFCE), florinated ethylene propylene (FEP), and perfluoro alkoxy alkane (PFA).

A "metal" as used herein, and throughout this disclosure, refers to a material that has good electrical and thermal conductivity. Such materials may be malleable and/or fusible and/or ductile. Metals may include, but not be limited to, aluminum, nickel, copper, cobalt, chromium, silver, gold, platinum, iron, zinc, titanium, and alloys thereof such as bronze, stainless steel, stainless stainless steel, brass, and phosphor bronze.

An "aramid" as used herein, and throughout this disclosure, refers to an aromatic polyamide. Aramids are a class of materials fibers in which the chain molecules are highly oriented along the fiber axis, so the strength of the chemical bond can be exploited. Examples include, but are not limited to fibers distributed under brand names such as Kevlar™, Technora™, Twaron™, Heracron™, Nomex™, Innegra S™ and Vectran™ as well as nylon and ultra-high molecular weight polyethylene.

A "silicone" as used herein, and throughout this disclosure, refers to a polymer that includes any inert, synthetic compound made up of repeating units of siloxane. Silicones have in general the chemical formula [R2SiO]n, where R is an organic group such as an alkyl (methyl, ethyl) or phenyl group. Silicones may be formed by the polymerization of silyl acetates or silyl chlorides for example.

An "elastomeric" material or "elastomer" as used herein, and throughout this disclosure, refers to a material, generally a polymer, with a defined level of viscoelasticity. Elastomers may include, but not be limited to, halogenated butyl rubber (halobutyl), chlorinated butyl rubber (chlorobutyl), butyl rubber, isobutylene isoprene, chlorinated polyethylene (PE-C), ethylene-propylene (EPDM}, EPDM/Neoprene/styrene-butadiene rubber (SBR) foam, ethylene tetrafluoroethylene (ETFE), ethylene-vinyl acetate (EVA), fluorinated ethylene propylene (FEP), fluoroelastomer rubber (FKM), hexafluoropropylene (HFP), vinylidene fluoride (VDF or VF2), terpolymers of tetrafluoroethylene (TFE), vinylidene fluoride (VDF), hexafluoropropylene (HFP), perfluoromethylvinylether (PMVE), fluorosilicone rubber (e.g. FVMQ), high-density polyethylene (HDPE), alkathene, polythene, tetrafluoroethylene perfluoromethylvinylether, natural rubber, gum rubber, latex rubber, neoprene, polychloroprene, chloroprene, nitrile rubber, acrylonitrile butadiene rubber, a nitrile-vinyl blend, perfluoroalkoxy alkane (PFA), polyamide, nylon, aramid, polycarbonate (PC), polyethylene and ethylene vinyl alcohol (EVOH) blend, polyethylene (PE), polyisoprene, polyoxymethylene (POM), acetal, polyacetal, polyformaldehyde, polypropylene (PP), PP and latex, polytetrafluoroethylene (PTFE), polyurethane (PUR), polyvinyl alcohol immersion (PVA), polyvinylidene fluoride or polyvinylidene difluoride (PVDF), polypropylene (PP), polyvinyl chloride (PVC), PVC/Polyurethane, thermoplastic vulcanizates (TPV, for example ethylene propylene diene monomer (EPDM) rubber encapsulated in a polypropylene (PP) matrix), styrene butadiene rubber (SBR), SBR coated polyester, silicone, peroxide cured silicone, thermoplastic elastomer (TPE), thermoplastic polyurethane (TPU), vinyl, fluorocarbon, and a fluoroelastomer.

A "balloon" as used herein, and throughout this disclosure, refers to an element intended to adjust its physical geometry upon the injection of a fluid within it. Such balloons can be formed from a variety of elastic and non-elastic materials and be of varying non-inflated and inflated profiles, including for example spherical, elongated, wide, thin, etc. A balloon may also be used to transmit pressure or pressure fluctuations to the sexual pleasure device surface and user where there is an inappreciable, or very low, change in the volume of the balloon.

The terms "woman" or "female" as used herein, and throughout this disclosure, refers to a human having a clitoris or clitoral region and, optionally, a vagina and/or an anus. The terms "woman" and "female" are used interchangeably herein. A female may be a user, an individual, another user, and/or another individual within contexts of the specification.

The terms "man" or "male" as used herein, and throughout this disclosure, refers to a human having a penis and, optionally, testes and/or an anus. The terms "man" and "male" are used interchangeably herein. A male may be a user, an individual, another user, and/or another individual within contexts of the specification.

The term "resilient," as used herein, refers to the ability of a body that has been subjected to an external force to recover, or substantially recover, its original size and/or shape, following deformation.

The term "flexible," as used herein, refers to the ability of a body that has been subjected to an external force to return to its original size and/or shape once the external force has been removed or reduced to below a particular level.

The term "malleable," as used herein, refers to the ability of a body that has been subjected to an external force to deform and maintain, or substantially maintain, the deformed size and/or shape.

The terms "sex", "intercourse", "sexual intercourse" as used herein, and throughout this disclosure, are intended to have a meaning referring to an act or action between two users wherein part of the act or action relates to the stimulation of one user's or both user's sexual erogenous zones and/or genitalia. Such acts or actions may or may not involve according to sex of the user the concurrent stimulation of their clitoris, vagina, anus, penis, testes, etc. and may be male-female, female-female, and solitary female based acts or actions.

A "FLuidic DEVice" (FLUDEV) as used herein, and throughout this disclosure, refers to a device intended to provide stimulation, movement, dimensional adjustment etc. though one or more actuators exploiting a fluidic driving mechanism in conjunction with a pump, such as an Electromagnetic PUMP (EL-PUMP), and valves/switches etc. Such FLUDEVs being described and depicted by the inventor within World Patent Applications WO/2014/047,717 entitled "Methods and Devices for Fluid Driven Adult Devices" published Apr. 3, 2014; WO/2014/047,718 entitled "Fluidic Methods and Devices" published Apr. 3, 2014; WO/2015/135,070 entitled "Methods and Devices for Hydraulic Consumer Devices" published Sep. 17, 2015; and WO/2018/119,508 entitled "Methods and Devices relating to Hydraulic Valves and Switches" published Jul. 5, 2018.

An "ELectromagnetic PUMP" (EL-PUMP) as used herein, and throughout this disclosure, refers to a fluidic pump. An EL-PUMP may employ the linear motion of a magnetic piston under action of an externally applied magnetic field from an electromagnet or it may be a rotary pump etc. Within the embodiments of the invention depicted below the EL-PUMPs being described and depicted are those established previously by the inventor within World Patent Applications WO/2014/047,717 entitled "Methods and Devices for Fluid Driven Adult Devices" published Apr. 3, 2014; WO/2014/047,718 entitled "Fluidic Methods and Devices" published Apr. 3, 2014; WO/2015/135,070 entitled "Methods and Devices for Hydraulic Consumer Devices" published Sep. 17, 2015; and WO/2018/119,508 entitled "Methods and Devices relating to Hydraulic Valves and Switches" published Jul. 5, 2018.

A "reservoir" as used herein, and throughout this disclosure, refers to a region within the fluidic circuit within a FLUDEV which holds fluid. A reservoir may include, but not be limited to, a "balloon", a fluidic actuator, a region around an EL-PUMP defined by a scaffold/casing around the EL-PUMP, and a dedicated element within the fluidic circuit. A reservoir may be a single reservoir, or it may be comprised of multiple smaller reservoirs disposed within the fluidic circuit at different locations.

Referring to FIG. 1 there are depicted first and second images 100A and 100B of a fluidic device (FLUDEV) according to an embodiment of the invention providing vibration, pressure, axial extension; and radial dilation. As depicted the FLUDEV comprises a handle 110, first stimulator 120, Second stimulator 130, actuated member 140, extending member 150, and dilatory element 160. As will become evident in respect of FIGS. 2 to 18 the first stimulator 120, Second stimulator 130, actuated member 140, extending member 150, and dilatory element 160 are all FLuidic ACTuators (FLACTs) driven by fluidic elements within the FLUDEV under control of a controller.

Figure 2:
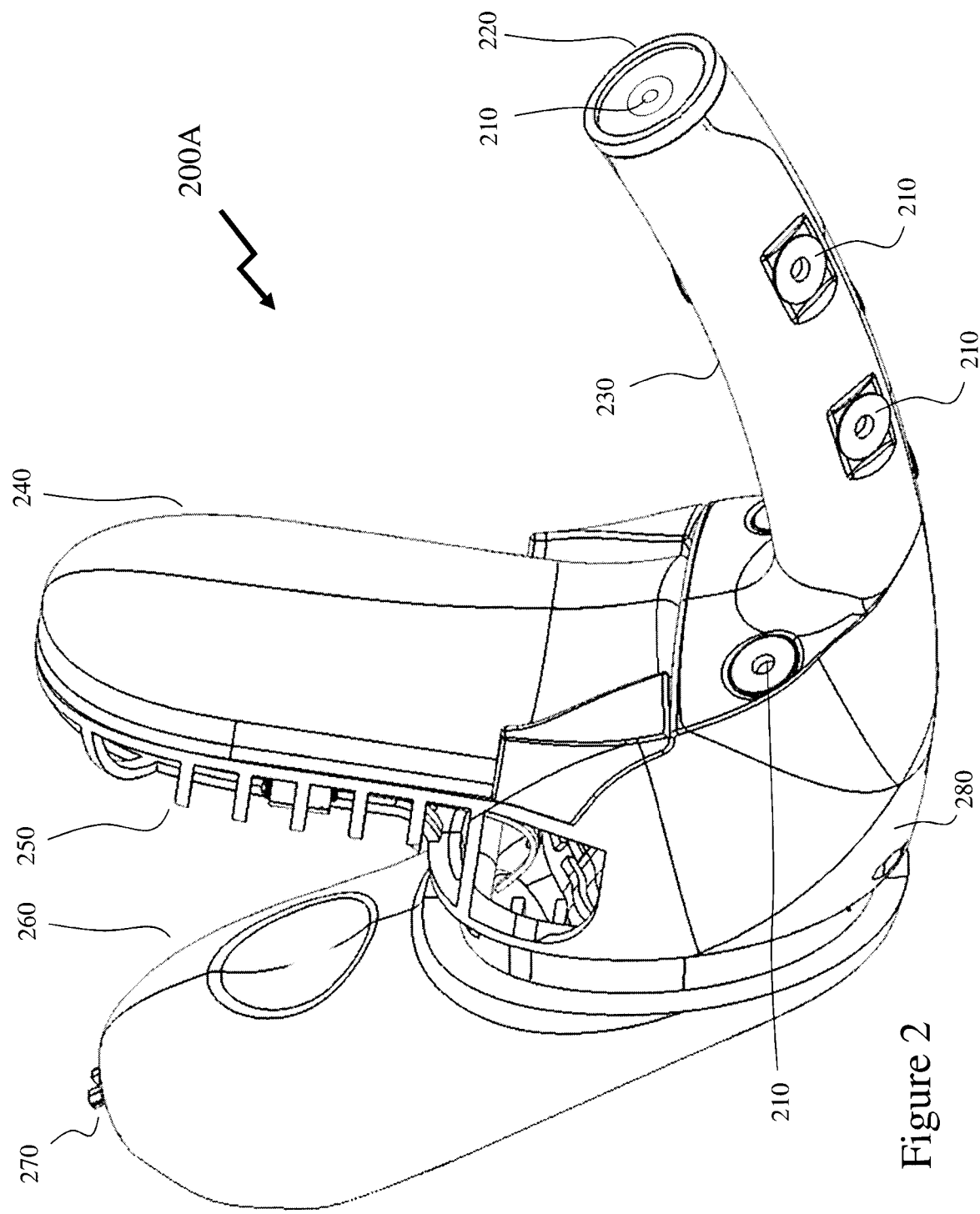
FIG. 2 depicts the FLUDEV of FIG. 1 according to an embodiment of the invention providing vibration, pressure, axial extension; and radial dilation with the external casing removed.
Figure 3:
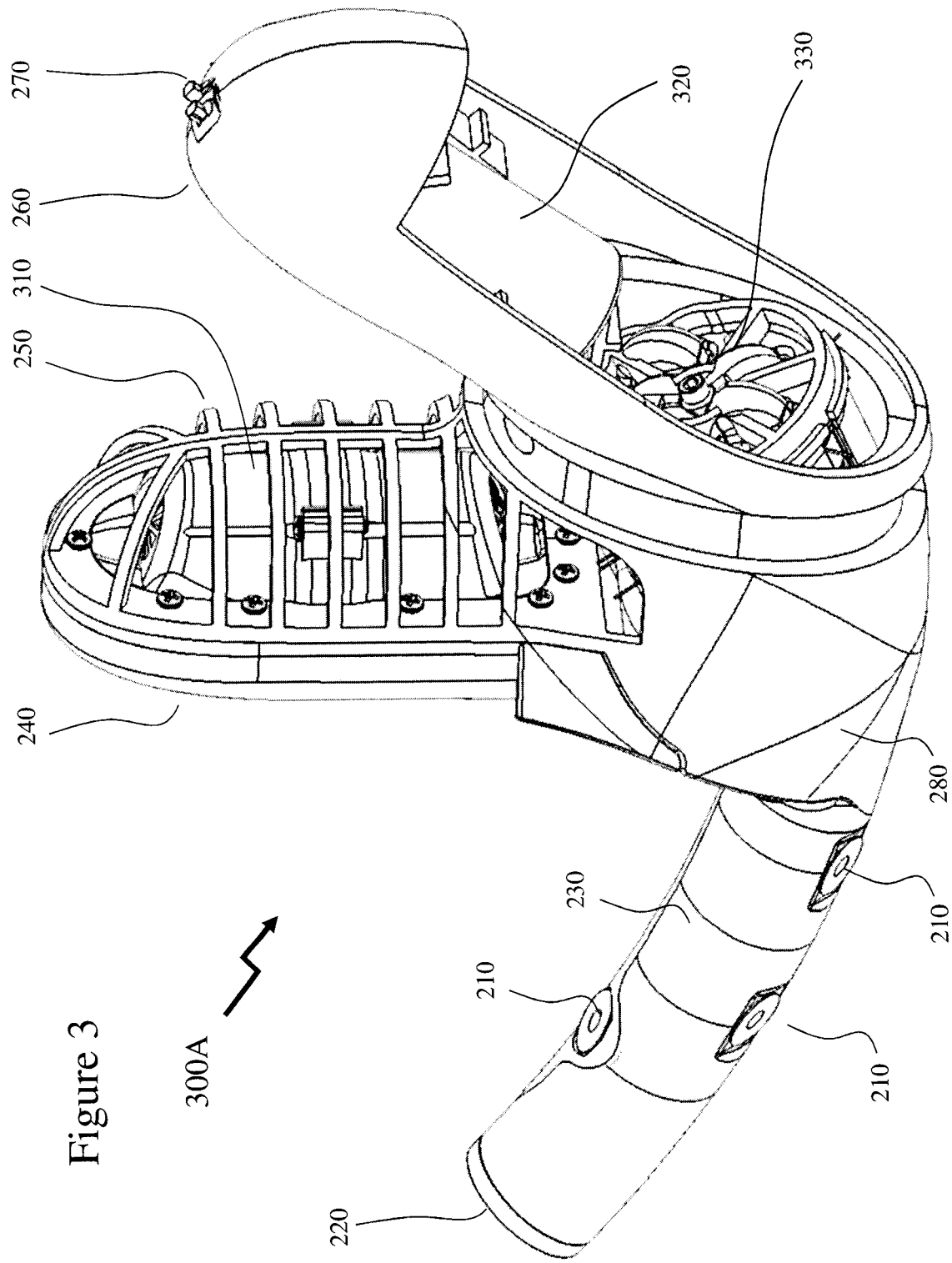
FIG. 3 depicts the FLUDEV of FIG. 1 according to an embodiment of the invention providing vibration, pressure, axial extension; and radial dilation without the external casing removed.

Now referring to FIGS. 2 and 3 there are depicted first and second images 200A and 200B respectively for the FLUDEV of FIG. 1 according to an embodiment of the invention providing vibration, pressure, axial extension; and radial dilation with the external casing removed. Accordingly, in first image 200A the FLUDEV is viewed from a front right perspective wherein the FLUDEV scaffold and shell are depicted. As noted supra references to orientation are essentially arbitrary but for the purposes of the description in respect of FIGS. 1 to 18 then front of the FLUDEV is considered as the tip of the penetrative element comprising Second stimulator 130, actuated member 140, extending member 150, and dilatory element 160 whilst the back/rear of the FLUDEV is considered the handle 110 of the FLUDEV. From this then up/top is considered as being the first stimulator 120.

Accordingly, a plurality of fluidic balloon interfaces (FLUBINTs) 210 are depicted which would each couple to a FLUidic BALLoon (FLUBALL). The plurality of FLUBINTs not being depicted for clarity. Accordingly, a FLUBALL would be attached to the FLUBINT 210 on the tip 220 of the actuated member 230, on the FLUBINTs 210 along the actuated member 230, and those on the FLUBINT 210 on the intermediate body portion 280. Attached to the intermediate body portion 280 are clitoral stimulator comprising wall portion 240 and framed portion 250. Also attached to the intermediate body portion 280 is the handle portion 260 which terminates in electrical CHARging INTerface (CHARINT) 270.

Within embodiments of the invention the wall portion 240 may be contoured rather than having a profile such as depicted in FIG. 2. Such contouring may be periodic, aperiodic, etc. with no specific alignment of the contouring to the user's body or alternatively a portion or portions of the wall portion 240 may be contoured such that a portion of the user's body, e.g. clitoris, engages the contoured region. For example, the contour of the wall portion 240 is a recess within the wall portion 240 for the user's clitoris to engage such that the remainder of the wall portion 240 engages the user's pubic mound around their clitoris. Optionally, within other embodiments of the invention the wall portion 240 may have one or more fluidic actuators disposed within it such that in addition to an overall vibratory effect arising from the EL-PUMP the wall portion 240 may impart a second frequency component of vibration, an overall expansion/contraction etc. or it may provide a "sucking" type functionality to the user's clitoris.

The lengthwise "waves" along the length of the shaft of the FLUDEV and the circular "rings" at the tip allow the elastomer to expand/get longer etc. without wasting too much energy stretching the skin, e.g. elastomer, as initially these "fill" out with low energy to provide increased diameter/length etc. Under operation of the EL-PUMP the wall section 240 stretches acting as a positive pressure side fluidic capacitor. On the "negative side" with the framed portion 250 the inventors have established that whilst providing a flexible diaphragm for provisioning of a fluidic capacitor is important that the distance of the EL-PUMP inlet valve from the diaphragm skin impacts efficiency and that for improved efficiency and reduced "water column shaking" on the inlet side of the EL-PUMP that the distance between the valve and the diaphragm should be kept small.

Within embodiments of the invention the handle may provide a reservoir for the fluidic system wherein according to the design the skin of the handle collapses as actuators along the shaft are expanded or expands as the actuators along the shaft are emptied and reduce in dimension. Accordingly, as depicted the rear of the handle casing/shell is partially removed to allow the skin to collapse. Alternatively, the fluidic reservoir may be a collapsible "bag" or "balloon" disposed within a solid handle or may be a handle having a framed design such as over the framed portion. If the "balloon" is only covered by the outer skin or is defined by the outer skin, then the skin may in embodiments of the invention be formed from or with a higher Durometer material such that the reservoir does not "bulge" when full and the position/orientation of the FLUDEV adjusted.

Accordingly, the positive pressure portion of the fluidic circuit is contained by the shell/scaffold (e.g. plastic) around the EL-PUMP (motor) and the diaphragm (wall section 240) then the only inlet to this chamber is the outlet valves, the only outlet is the fluidic path that leads to the valves/manifold, commonly referred to by the inventors as the "6-Shooter" due to its six valves and circular design having visual correspondence to the cylinder of a traditional revolver. The low pressure side, on the other hand is the remainder of the internal volume of the FLUDEV including obviously the reservoir. Any leakage from actuators, nipples, switches, plastic channel holes or leaks, will always find its way back to the low pressure side and in order to enhance this the shell/scaffold may have surface features, commonly referred to as ditches by the inventors, so that water between the skin and the shell/scaffold has a return path to the pump inlet. In some instances, the fluid around the actuators may act as a lubricant between the "flexible" skin of the actuators and "inflexible" shell/casing.

In second image 300 in FIG. 3 the FLUDEV is viewed from a rear left side perspective wherein the FLUDEV scaffold and shell are depicted. Accordingly, the actuated member 230 is evident with the plurality of FLUBINTs 210 on the left of the second image 300 with the intermediate portion 280, the clitoral stimulator comprising wall portion 240 and framed portion 250. Within the framed portion is EL-PUMP 310. On the right of second image 300A there is depicted the handle 260 wherein a portion has been removed to show the battery 330 and 6-piston actuator array 330, so-called "6-Shooter" which is coupled to the plurality of FLUBINTs 210. Also depicted in CHARINT 270.

Figure 4:
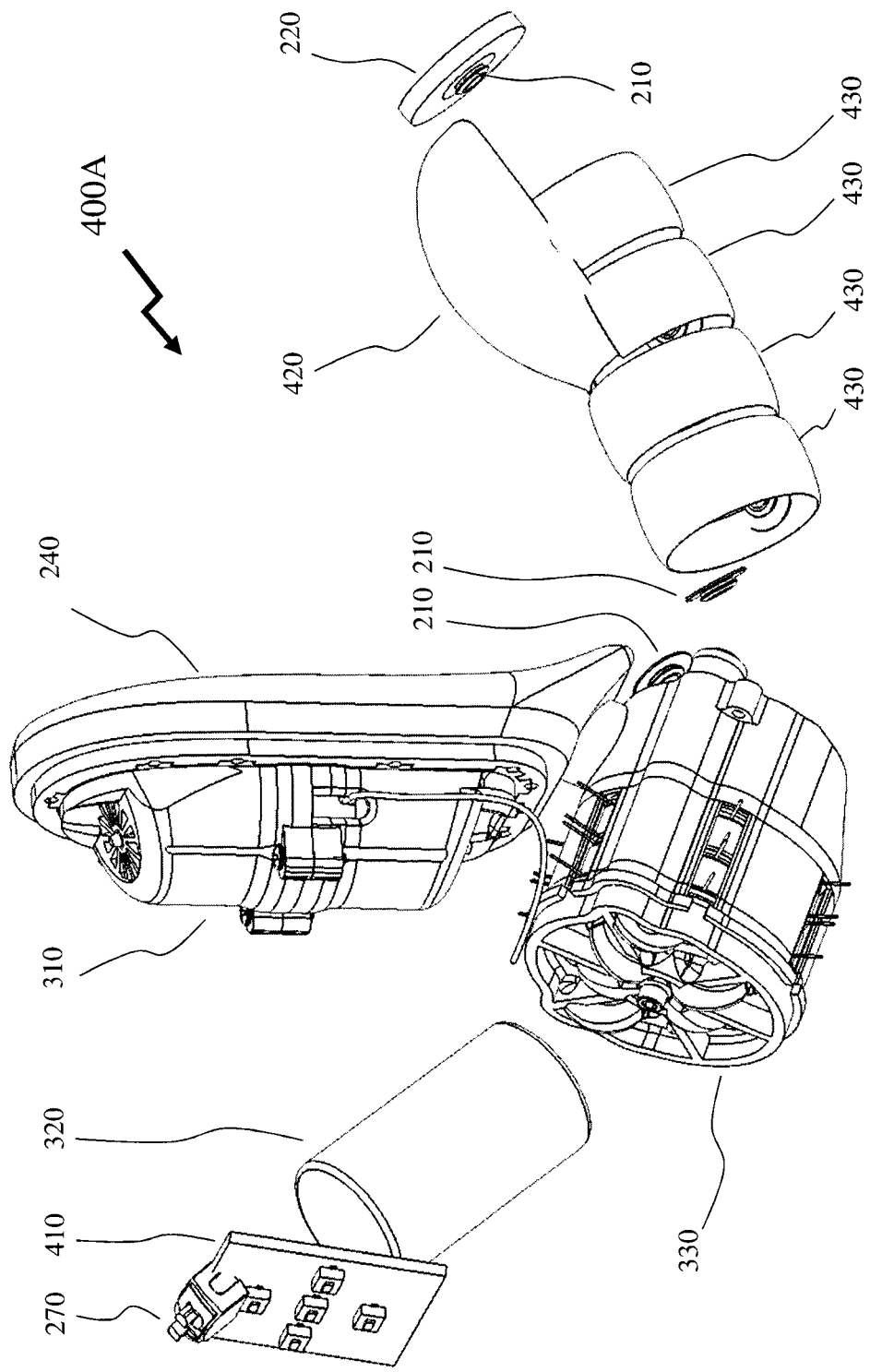
FIG. 4 depicts the FLUDEV of FIG. 1 according to an embodiment of the invention providing vibration, pressure, axial extension; and radial dilation with the external casing and scaffold/shell removed.

Referring to FIG. 4 there is depicted image 400A wherein the scaffold/shall of the FLUDEV of FIG. 1 has been removed in addition to the casing, Accordingly, there are depicted the EL-PUMP 310, battery 320, CHARINT 270, Controller 320 and 6-Shooter 330. On the right of the image 400A are depicted FLUBINTs 210, G-spot stimulator 420, ring actuators 430, and tip 220 of the actuated member.

Figure 5:
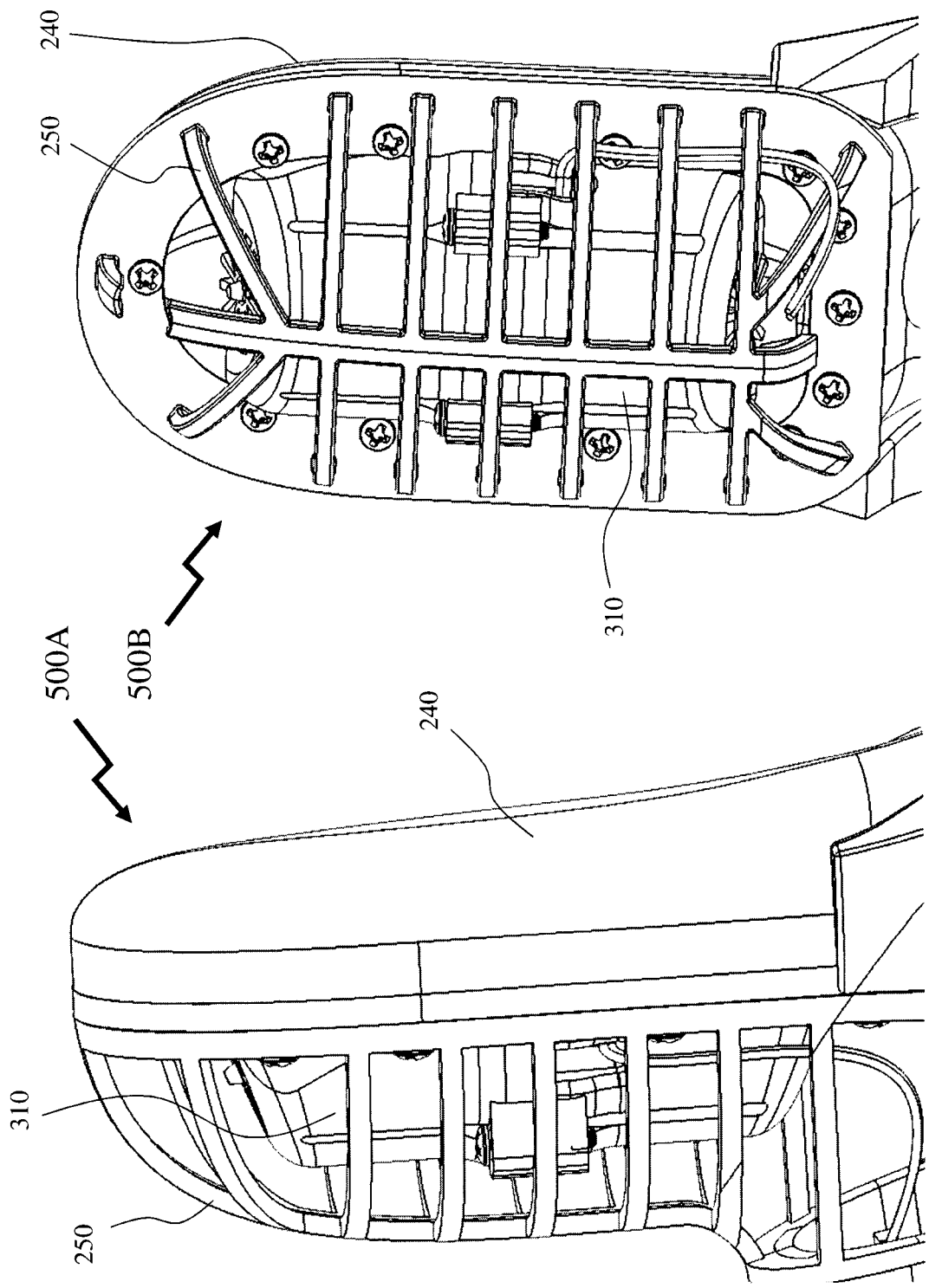
FIG. 5 depicts a portion of the FLUDEV of FIG. 1 depicting the combination of scaffold/shell on either side of a linear electromagnetic pump (EL-PUMP) to provide actuator and fluidic capacitor elements concurrently with the external casing removed.

Now referring to FIG. 5 there are depicted first and second images 500A and 500B of the is depicted a portion of the FLUDEV of FIG. 1 depicting the combination of scaffold/shell on either side of the EL-PUMP 310 to provide actuator and fluidic capacitor elements concurrently with the external casing removed. Accordingly, there are depicted wall portion 240 which is intended to fit against a female user's clitoral region and vibrate and/or apply pressure. The inventor has established that for efficient operation of the EL-PUMP 310 within a closed fluidic system that one or more fluidic capacitive elements. Within the FLUDEV a capacitive element is provided by the flexible casing of the FLUDEV over the framed portion 250. Those portions of the casing (not shown in this image) not supported can "flex" whilst those against the framed portion 250 prevent collapse of the fluidic capacitor.

Within this patent the side of the EL-PUMP 310 with the framed portion 250 is referred to as the "negative" side of the pump (e.g. EL-PUMP 310) in that the pump draws from this side and pumps into the other "positive side." Accordingly, those portions of the fluidic circuit fed from the positive side may be referred to as positive side elements such as positive side washer, positive side spacer etc. whilst those on the negative side of the fluidic system may be referred to as negative side washer, negative side spacer etc. Within this configuration positive side fluidic circuits couple/operate to fill or add fluid to fluidic actuators/balloons etc. whilst negative side circuits couple/operate to empty or withdraw fluid from fluidic actuators/balloons etc.

Within an embodiment of the invention the negative side fluidic capacitor, nominally at zero pressure, may be actually slightly under "vacuum" (i.e. below 0 psi). The framed portion 250 keeps the flexible skin, e.g. 10 Durometer elastomer skin, from collapsing. Optionally, additional fluidic channels may extend from the wall portion 240 along the shaft portion of the FLUDEV between the shell and the skin such that with EL-PUMP providing pulsed fluidic pumping into the wall portion 240 to provide clitoral region stimulation the additional fluidic channels, for example tubes or rings, under the skin similarly vibrate whilst the actuators coupled to the manifold, as described and depicted below, expand—contract and/or pulse based upon the overall control provided from the valves within the manifold disposed between the actuators and the wall portion 240. Alternatively, these additional fluidic channels may be coupled to the manifold and one or more valves. For example, the FLUBINTs 210 in the region between the EL-PUMP/wall section 240 and the shaft 230 may provide for subsequent assembly once the casing has been assembled.

Within other embodiments of the invention the negative side of the fluidic system rather than being at zero pressure or slightly negative (i.e. below 0 psi) may be highly negative with the positive side of the fluidic system being at zero pressure or positive (i.e. above 0 psi) such that the actuator(s), casing and/or shell shrink and/or collapse to yield a puckered external surface and/or collapse/shrink the actuator rapidly. Accordingly, the overall bias pressure of the fluidic circuit (average of positive pressure on positive side of fluidic circuit and negative pressure on negative side of fluidic circuit) may be neutral, negative, or positive). Optionally, within embodiments of the invention the bias pressure may be for the entire fluidic circuit or according to the EL-VALVE(s) for an individual actuator. Optionally, multiple fluidic circuits with different positive/negative pressures and pressure bias may be implemented with the same FLUDEV.

Figure 6:
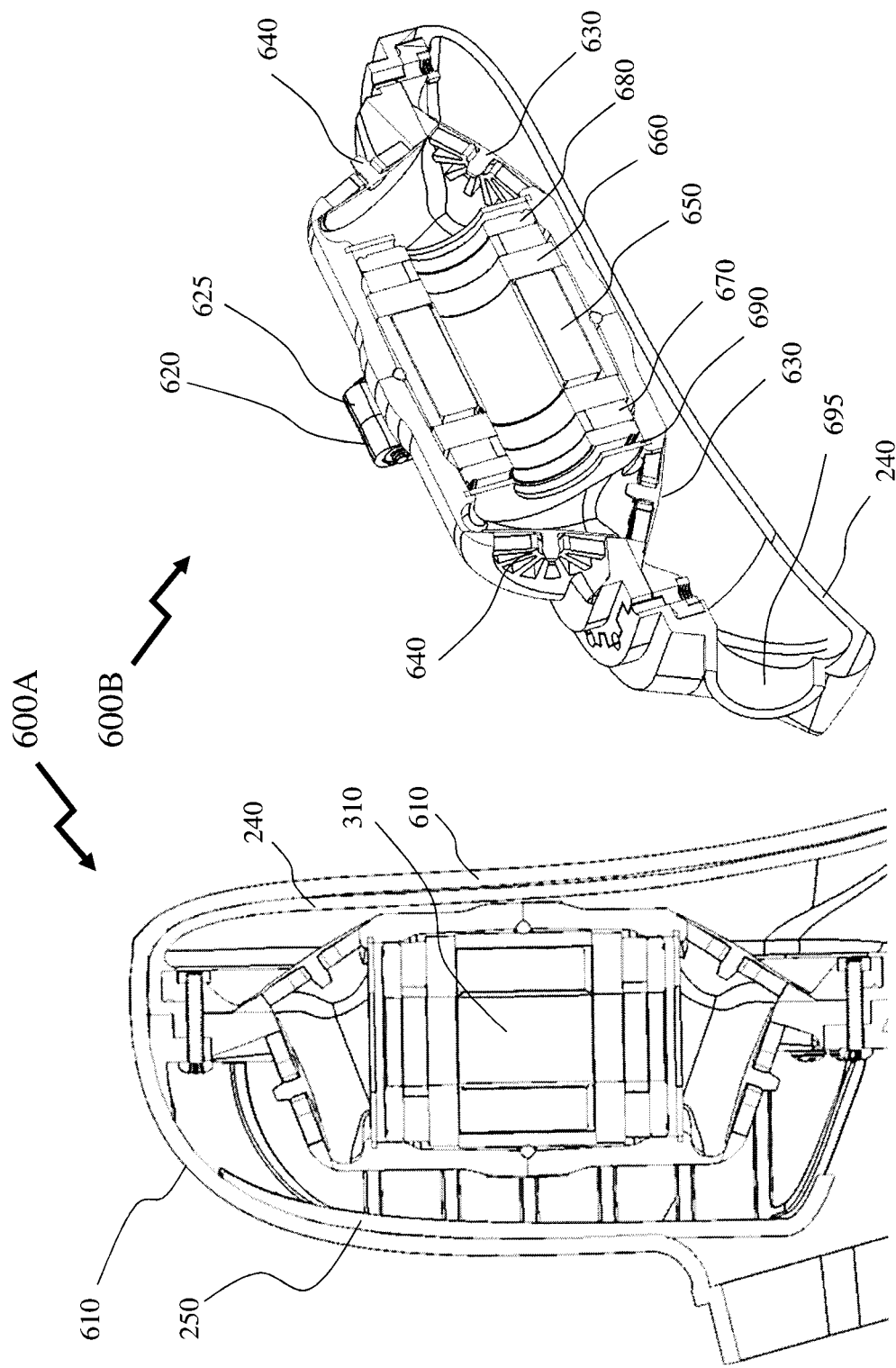
FIG. 6 depicts a cross-section of a portion of the FLUDEV of FIG. 1 depicting the combination of scaffold/shell on either side of a linear EL-PUMP to provide actuator and fluidic capacitor elements concurrently in conjunction with the external casing together with a cross-section of the EL-PUMP.

This structure is also depicted in first and second images 600A and 600B respectively in FIG. 6 wherein cross-sections of a portion of the FLUDEV of FIG. 1 depicting the combination of scaffold/shell on either side of a linear EL-PUMP to provide actuator and fluidic capacitor elements concurrently in conjunction with the external casing and of the EL-PUMP 310. Within first image 600A the casing 610 is shown over the framed portion 250 and wall portion 240 with the EL-PUMP 310 within them. The EL-PUMP 310 is depicted in cross-section in second image 600B within first and second body portions 620 and 625 which are coupled to the wall portion 240 which incorporates outlet port 695. As depicted the EL-PUMP 310 comprises inlet non-return valves (NRVs) 640 and outlet NRVs 630. Accordingly, the EL-PUMP 310 draws fluid from the region between the EL-PUMP 310 and casing 610 within the region defined within the framed portion 250 and pumps it into the wall portion 240 wherein it then flows out through the outlet port 695. The EL-PUMP 310 is depicted without the piston for clarity and comprises Coil 650, Inner Washer 660, Magnet 670, Outer Washer 680, and Stand-off Washer 690. Alternate designs and constructions of the EL-PUMP 310 may be employed without departing from the scope of the invention.

Figure 7:
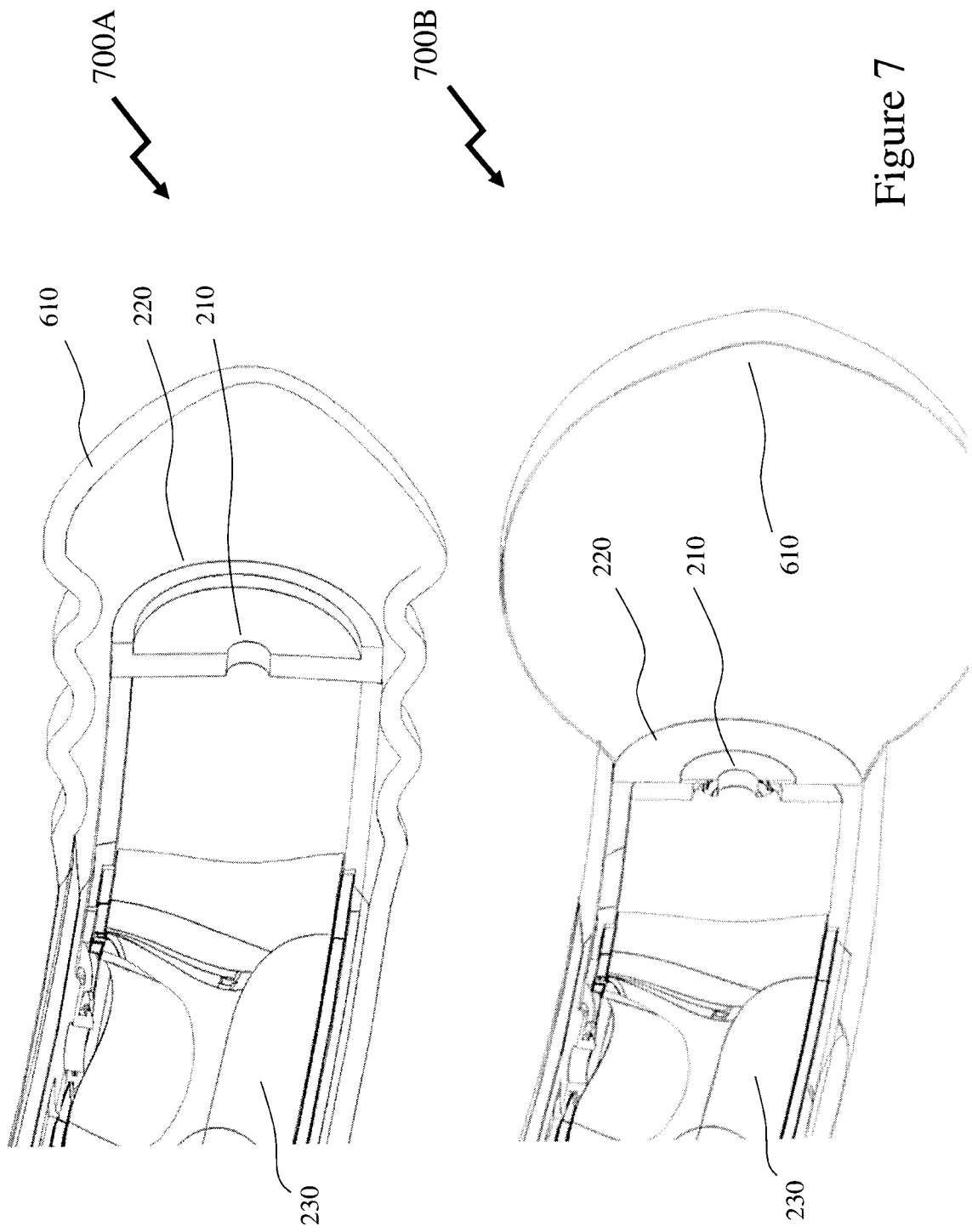
FIG. 7 depicts a dilatory tip for a FLUDEV according to an embodiment of the invention.
Figure 8:
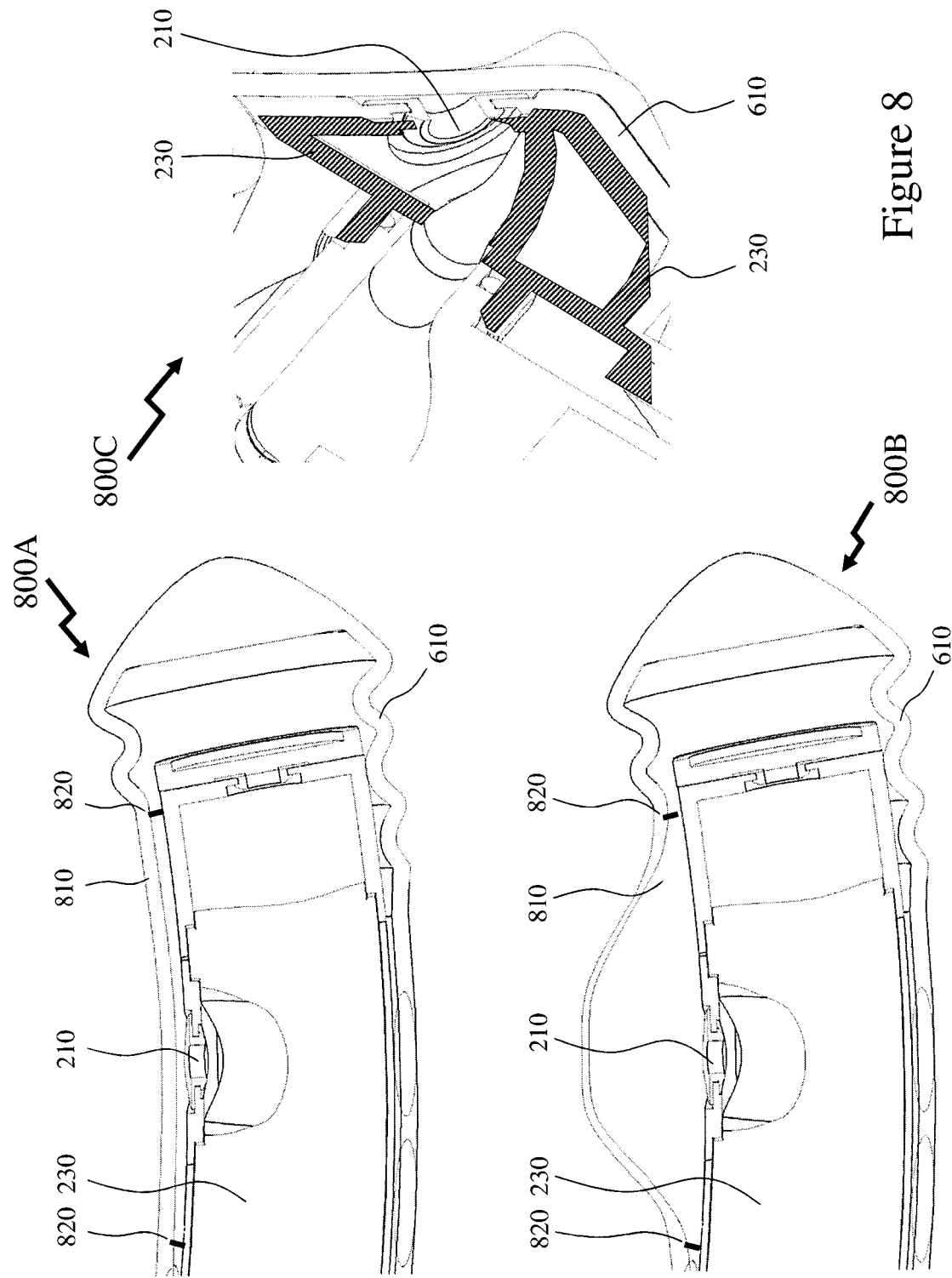
FIG. 8 depicts an expansion drive G-spot actuator for a FLUDEV according to an embodiment of the invention.

Referring to FIG. 7 there are depicted first and second images 700A and 700B respectively for a dilatory tip for a FLUDEV according to an embodiment of the invention non-inflated and inflated. Within first image 700A the actuated member 230 is shown with tip 220 within which is FLUBINT 210. Surrounding the tip 220 of the actuated member 230 is casing 610 which is formed with a series of ridges and bulbous portion. In second image 700B the fluidic system, such as EL-PUMP 310 and a valve pump fluid through the FLUBINT 210 expanding the formed portion of the casing 610. The inventor has established that a pre-formed section of casing 610 expands faster and with lower pressure than a non-formed section.

In contrast first and second images 800A and 800B the Second stimulator 130 is depicted in deflated and inflated states respectively. Accordingly, the actuated member 230 is depicted with a FLUBINT 210 on the upper surface whilst a region 810 of the casing 610 is sealed to the actuated member 230 by sealing ring 820. Accordingly, under actuation of the fluidic system coupled to the appropriate portion of the actuated member 230 the region 810 can be inflated to filled region 830 therein pushing against the upper interior wall of the user's vagina in the region of the G-spot. Optionally, the filled region 830 may be partially filled or filled under all operating conditions and the fluidic system provides vibration and/or pressure pulses.

Third image 800C depicts a FLUBINT 210 coupled to a portion of the casing 610, one of a pair either side of the actuated member 230, which are disposed adjacent to and/or against the labia of the user. Accordingly, under the action of the fluidic system the regions of the casing 610 may expand to apply pressure and/or vibrate to provide stimulation to the region just below and to the side of the user's clitoris and above their vagina.

Figure 9:
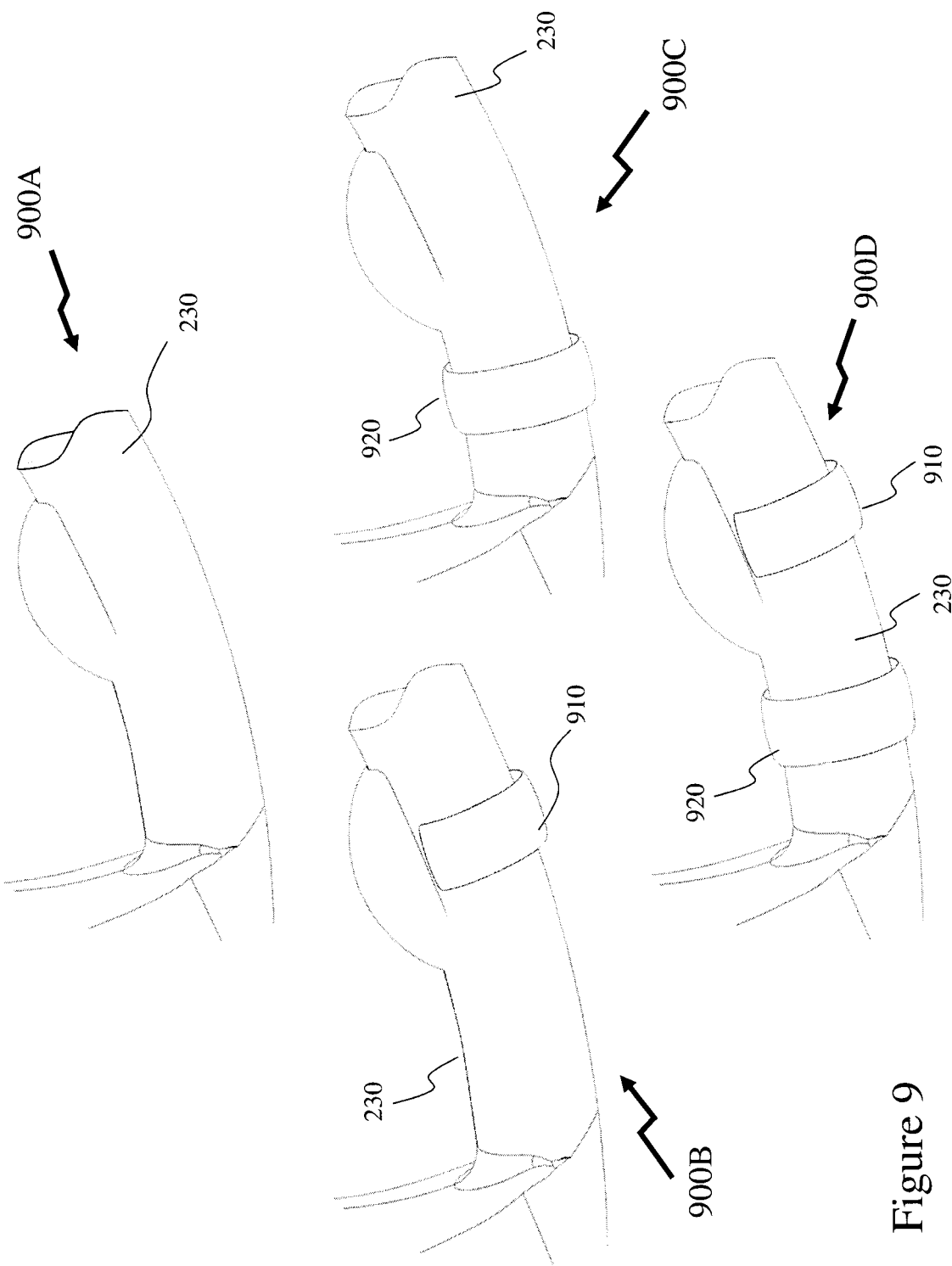
FIG. 9 depicts radial dilatory actuators for a FLUDEV according to an embodiment of the invention.

Referring to FIG. 9 there are depicted first to fourth images 900A to 900D respectively for a pair of radial dilatory actuators, first and second actuators 910 and 920 respectively, upon the actuated member 230 of a FLUDEV according to an embodiment of the invention. As depicted in first image 900A the actuated member 230 is depicted without either of the radial dilatory actuators activated. In second image 900B first actuator 910 is activated whilst in third image 900C the second actuator 920 is actuated. In fourth image 900D both of the first and second actuators 910 and 920 are activated and expanding. Each radial dilatory actuator applies pressure to the interior vaginal walls of the user or alternatively, if inserted into their anus to the rectal walls wherein the G-spot actuator may now stimulate the A-spot. As depicted first actuator 910 is "U-shaped" and second actuator 920 "ring" shaped such that the G-spot balloon does not overlap the first actuator 910.

Referring to FIGS. 10A to 12 there are depicted a fluidic manifold 1030 and actuated member 230 which couples to the FLUBINTs upon the actuated member 230 and therein couples the fluidic system within the exterior portion to the actuator balloons within the vaginal portion of the FLUDEV. Accordingly, in FIG. 10 there are depicted first to fourth images 1000A to 1000D respectively of the exterior of the fluidic manifold 1030 and actuated member 230. First image 1000A depicts a lower elevation wherein four FLUBINTs 210 are disposed along the actuated member 230 whilst second and third images 1000B and 1000C respectively depict a top elevation and end elevation wherein a single FLUBINT 210 is disposed along each of the upper surface and end of the actuated member 230 respectively. Fourth image 1000D depicts a top elevation with the fluidic manifold 1030 and actuated member 230 rotated to such that the upper surface 1020 of the fluidic manifold 1030. As evident within the upper surface 1020 of the fluidic manifold 1030 there are disposed 6 ports, first to sixth ports 1010A to 1010F respectively. The relationship between the first to sixth ports 1010A to 1010F respectively of the fluidic manifold 1030 to the FLUBINTs 210 on the actuated member is depicted in FIGS. 11A and 11B respectively.

Figure 10A:
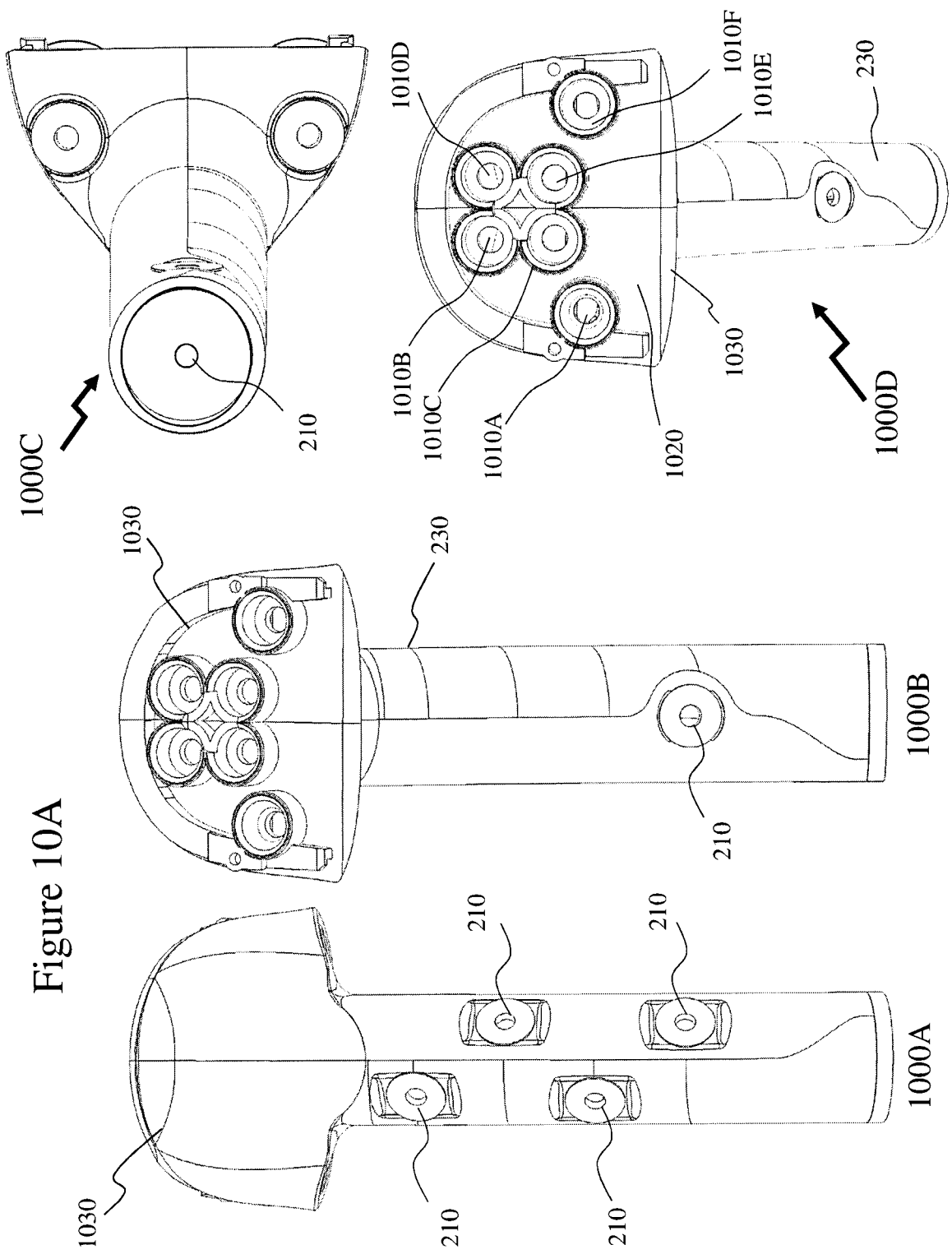
FIGS. 10A to 12 depict a fluidic manifold and actuator balloon interfaces for the vaginal portion of the FLUDEV of FIG. 1 according to an embodiment of the invention.
Figure 10B:
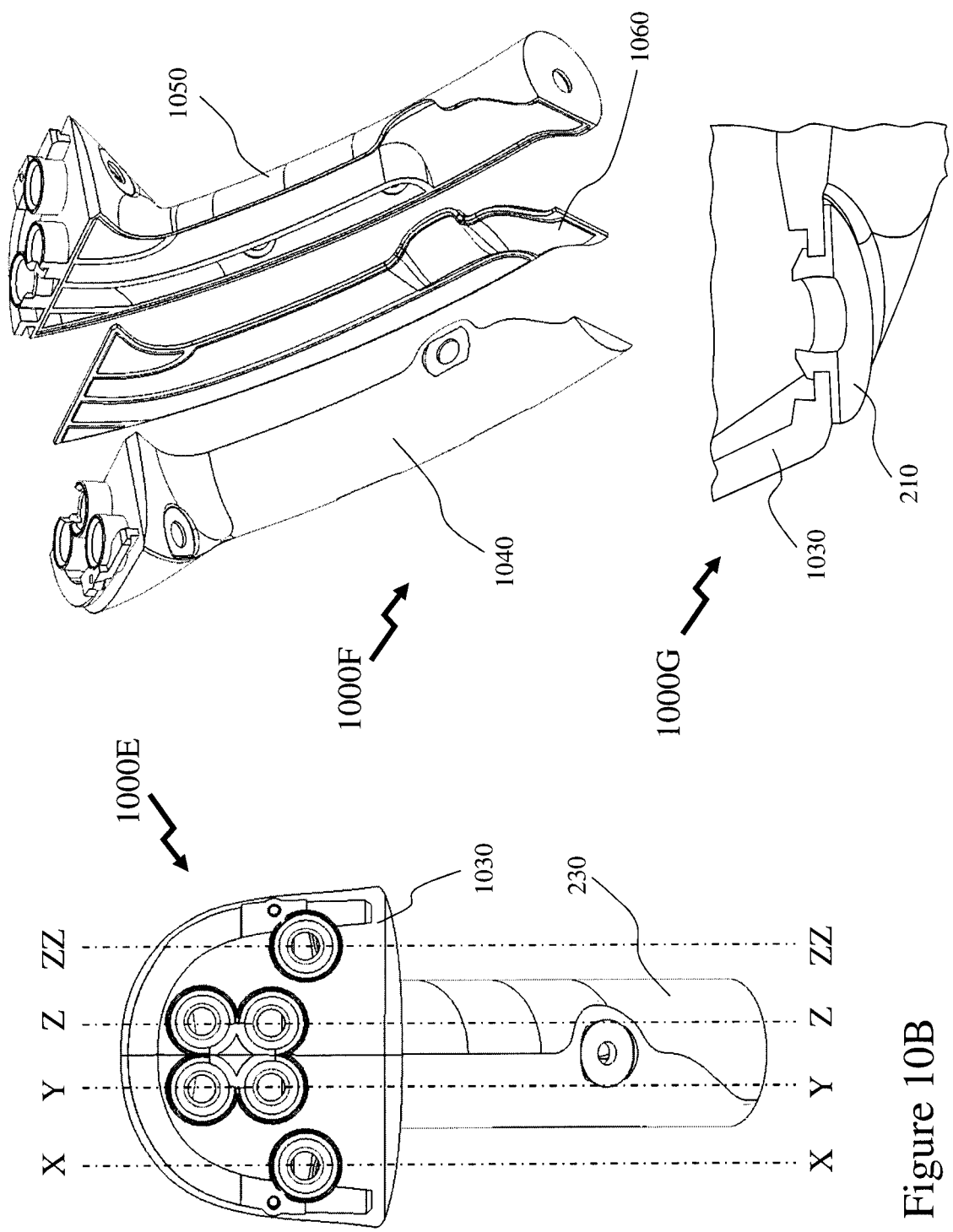
Figure 11A:
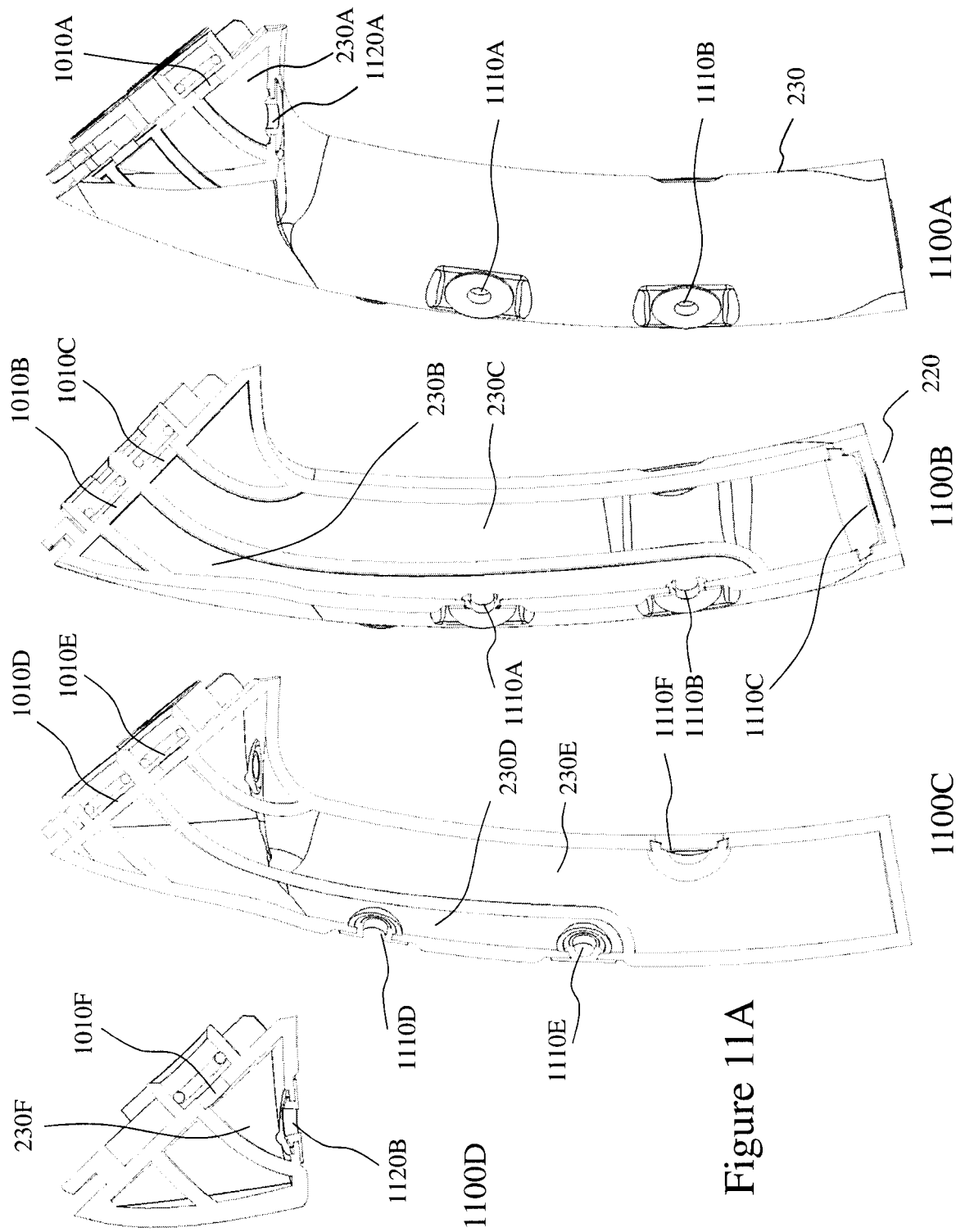
Figure 11B:
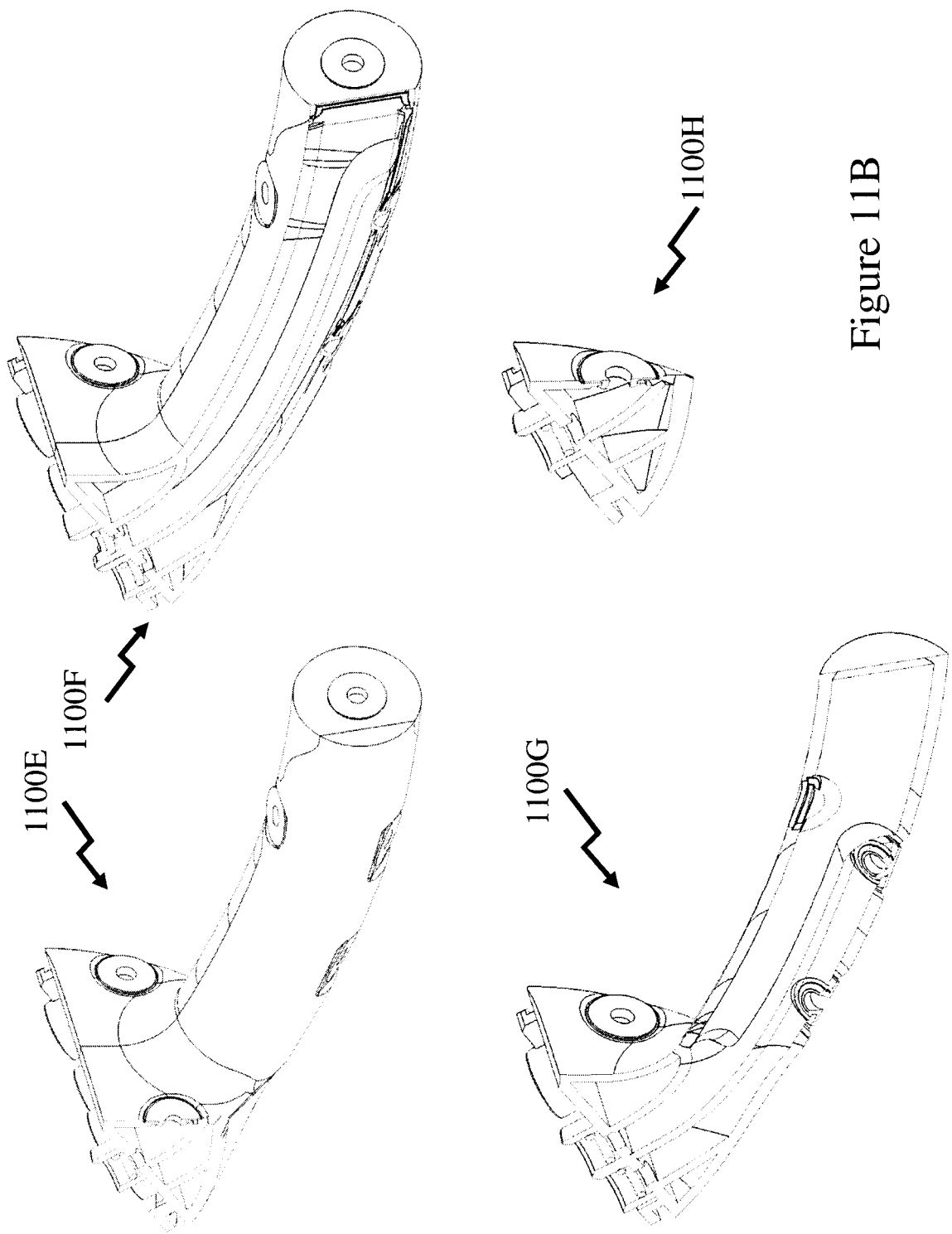

Now referring to FIG. 10B first image 1000E depicts the four sections lines employed, approximately, in FIGS. 11A and 11B respectively. Accordingly, these are depicted as first to fourth sections X-X, Y-Y, Z-Z and ZZ-ZZ respectively. As evident:

First section X-X through first port 1010A;
Second section Y-Y through second and third ports 1010B and 1010C;
Third section Z-Z through fourth and fifth ports 1010D and 1010E; and
Fourth section ZZ-ZZ through sixth port 1010F.

Second image 1000F depicts the fluidic manifold 1030 and actuated member 230 in expanded perspective view comprising first to third elements 1040 to 1060 respectively wherein first and third elements 1040 and 1060 form the exterior shell for both the fluidic manifold 1030 and actuated member 230 whilst second element 1060 in combination with the first and third elements 1040 and 1060 provides for the formation of several fluidic channels within the fluidic manifold 1030 and actuated member 230. Third image 1000G depicts the fluidic manifold 1030 in cross-section with FLUBINT 210. The FLUBINT 210 is inserted into an opening within the fluidic balloon which is to be attached to the FLUBINT 210 and form an actuator of the FLUDEV. Accordingly, the opening of the fluidic balloon is sealed by the FLUBINT 210 which extends around the interior portion of the fluidic balloon.

Referring to first images 1100A and 1100E in respect of FIGS. 11A and 11B respectively the first section X-X of first image 1000E in FIG. 10B is depicted. This cuts through first port 1010A and as depicted in third image 800C in FIG. 8 which is coupled to a fluidic actuator adjacent the actuated member 230 via first manifold FLUBINT 1120A. Second images 1100B and 1100F depict the second section Y-Y through second and third ports 1010B and 1010C respectively wherein second port 1010B couples to first fluidic channel 230B which couples to the first and second FLUBINTs 1110A and 1110B on the lower surface of the actuated member 230. Third port 1010C couples to second fluidic channel 230C and therein to the third FLUBINT 1110C on the tip 220 of the actuated member 230.

Third images 1100C and 1100G in respect of FIGS. 11A and 11B depict third cross-section Z-Z through fourth and fifth ports 1010D and 1010E respectively which are coupled to third and fourth fluidic channels 230D and 230E respectively. As evident third fluidic channel 230D couples to the fourth and fifth FLUBINTs 1110D and 1110E on the lower surface of the actuated member 230 whilst fourth channel 230E couples to sixth FLUBINT 1110F on the upper surface and actuates the G-spot stimulator as described supra. Fourth images 1100D and 1100H in respect of FIGS. 11A and 11B depict the fourth cross-section ZZ-ZZ through sixth port 1010F which is similarly coupled to an actuator adjacent the actuated member 230 via second manifold FLUBINT 1120B.

Optionally, an actuated member 230 may comprise one or more malleable sections and/or fluidic channels such that the overall geometry of the actuated member 230 may be adjusted by a user of a FLUDEV comprising such an actuated member 230. Within some embodiments of the invention the malleable sections are formed by providing metallic elements joining sections of the actuated member or sections of the actuated member formed from a material with lower Young's modulus than the remainder of the actuated member such that by an appropriate level of pressure/force the malleable section(s) can be adjusted to "bend" the actuated member at the malleable section(s). Optionally, the malleable sections may be a thermoplastic having a softening temperature allowing a user to soften and deform the thermoplastic without disrupting the overall device or require complex procedure to achieve the desired temperature.

Figure 12:
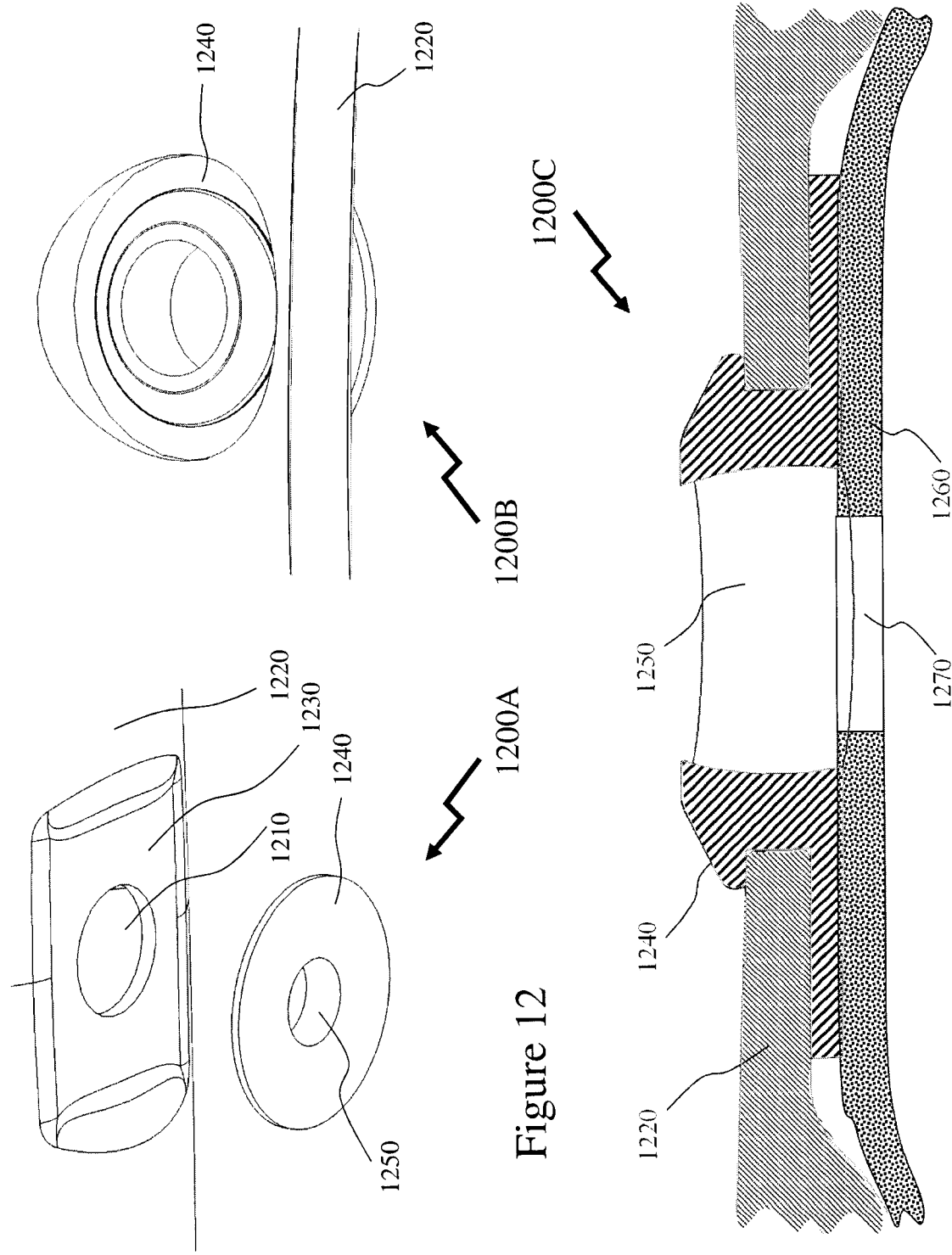
Figure 44:
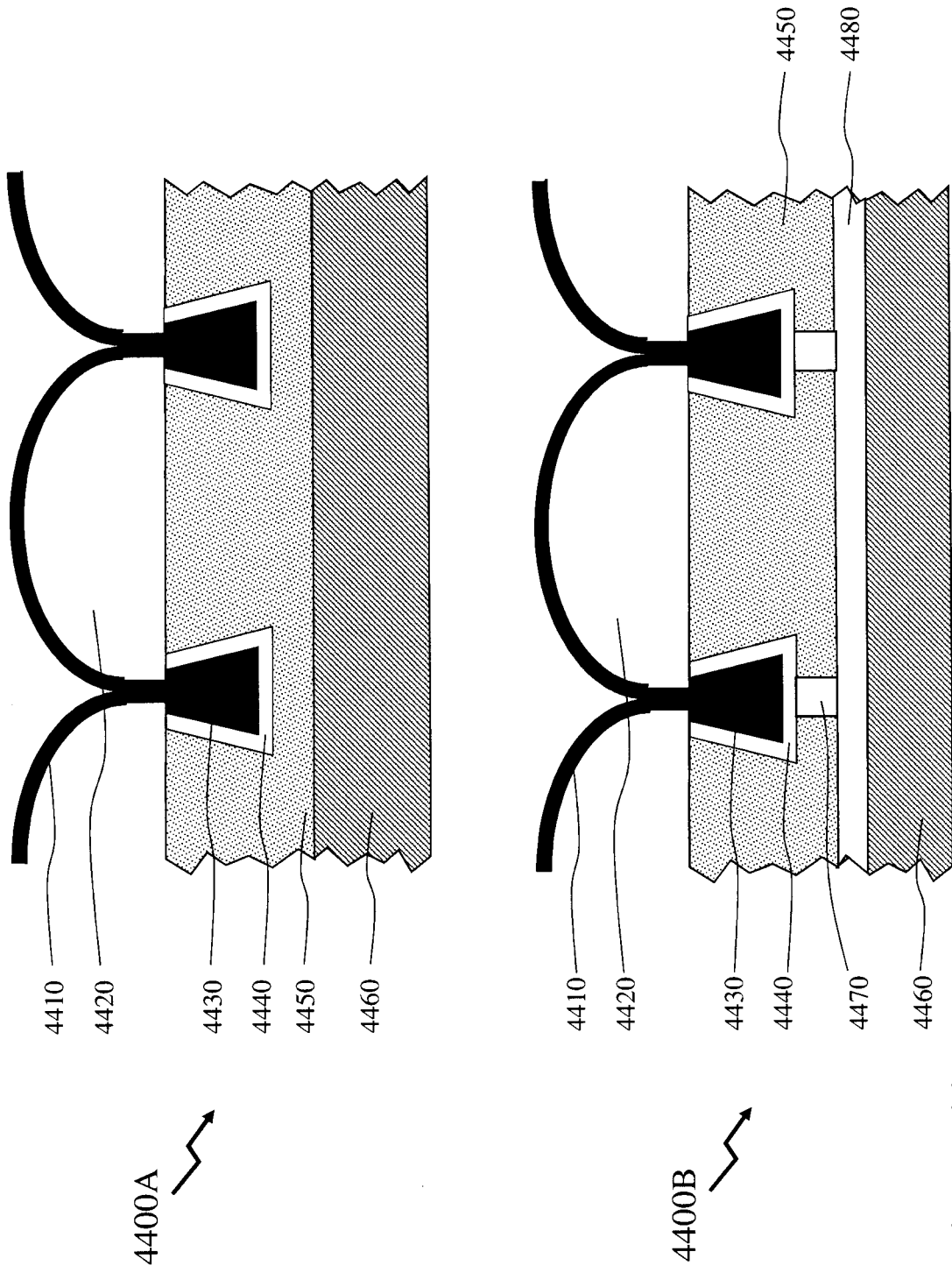
FIG. 44 depicts alternate configurations for attaching balloon based actuators to a fluidic device according to embodiments of the invention.

Now referring to FIG. 12 there are depicted first to third images 1200A to 1200C respectively for a balloon attachment means to the casing of the FLUDEV. As depicted in FIG. 12A an opening 1210 is formed within a recessed portion 1230 of the shell 1220 of a FLUDEV according to an embodiment of the invention. The nipple 1240 fits within the opening 1210 and comprises a first annular portion that fits around the opening 1210 within the recessed portion 1230 and a second annular portion that fits around the opening 1210 on the other side of the shell 1220 to that of the first annular portion. The "balloon" for the fluidic actuator comprises flexible wall 1260 which is attached to the first annular portion of the nipple 1240 and has an opening 1270 which aligns with feedthrough 1250 of the nipple 1240. Accordingly, the FLUDEV may be assembled with the EL-PUMP, casing etc. and then the fluidic actuators attached through the nipples 1240 to the openings 1210 within the shell 1220. Accordingly, nipple 1240 provides a FLUBINT such as described and depicted supra in respect of FIGS. 1 to 11. Within other embodiments of the invention the "balloon" for a fluidic actuator may be attached directly to the scaffold or shell of a FLUDEV thereby eliminating the need for nipples as depicted in FIG. 44 with first and second configurations 4400A and 4400B respectively.

Figure 13:
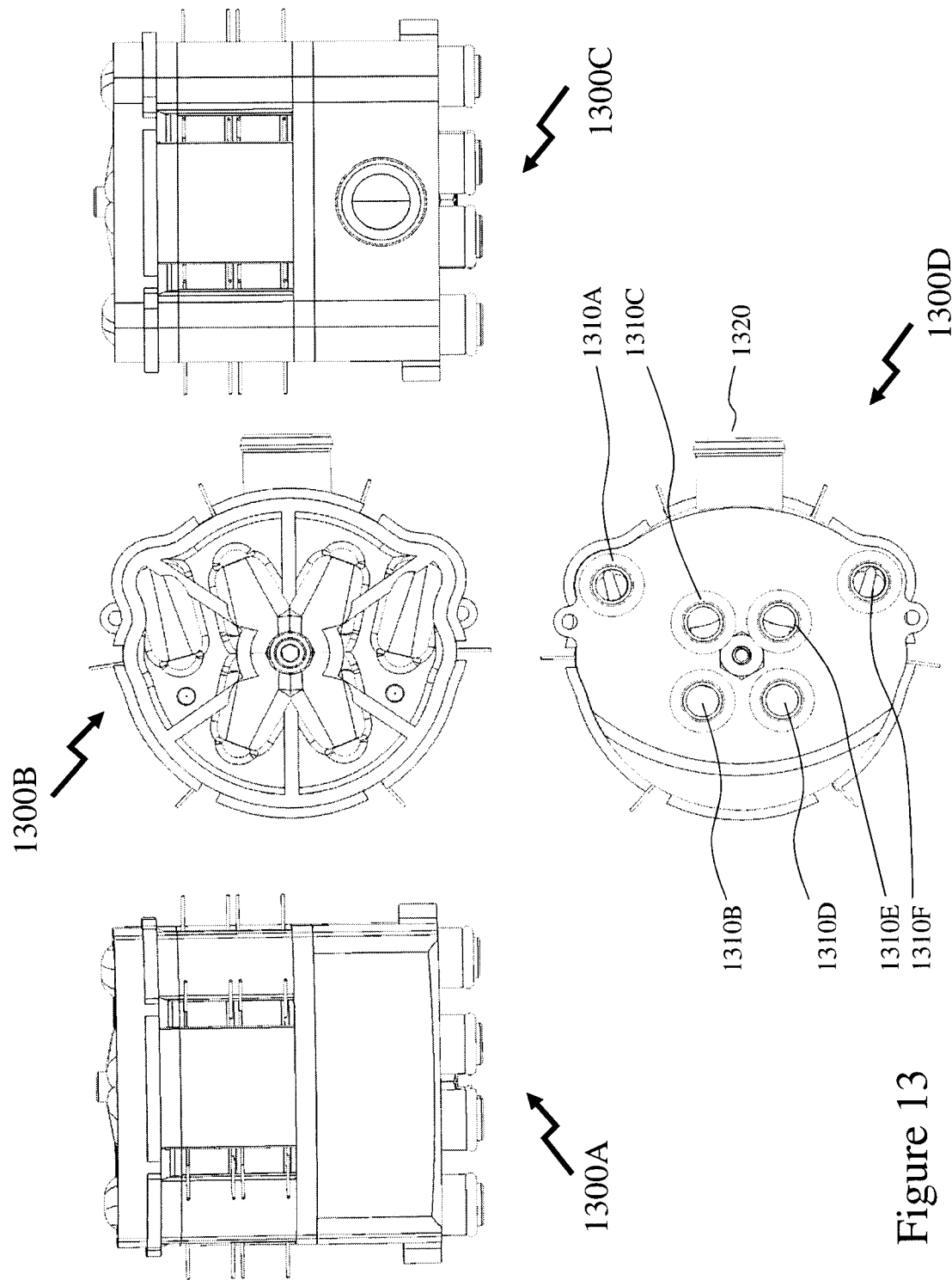
FIG. 13 depicts a 6-piston actuator array for coupling to the fluidic manifold of the vaginal portion of the FLUDEV of FIG. 1 according to an embodiment of the invention.

Referring to FIG. 13 there are depicted first to fourth images 1300A to 1300D of the 6-piston actuator array 330, so-called "6-Shooter", as described and depicted in respect of FIG. 4 which is disposed between the outlet port 695 of the solid wall 240 and the fluidic manifold 1030 which is coupled to the actuated member 230. First to fourth images 1300A to 1300D representing left side elevation (first image 1300A), top elevation (second image 1300B), right side elevation (third image 1300C) and bottom elevation (fourth image 1300D) respectively. As shown in bottom elevation (fourth image 1300D) there is an inlet port 1320 which is coupled to the outlet port 695 of the solid wall 240. Also visible on the bottom of the "6-Shooter" are first to sixth outlet ports 1310A to 1310F respectively which are coupled to the first to sixth ports respectively of the fluidic manifold, such as fluidic manifold 1030 in FIG. 10. Accordingly, the "6-Shooter" controls the fluid coupled to the fluidic actuators attached to the fluidic manifold and actuated member.

Figure 14A:
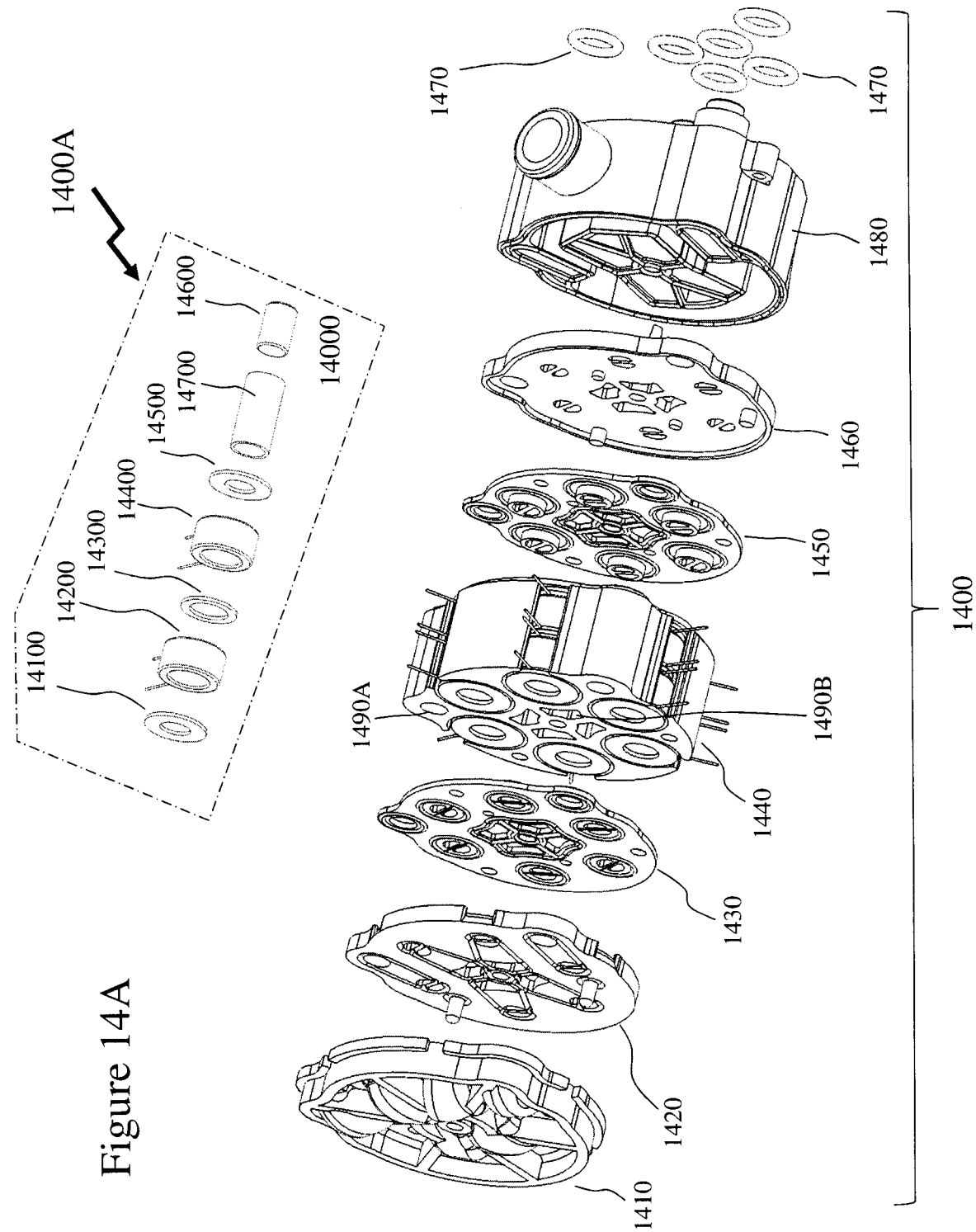
FIG. 14A to 14C depict expanded perspective and cross-sectional views of the 6-piston actuator array of FIG. 13 for coupling to the fluidic manifold of the vaginal portion of the FLUDEV of FIG. 1 according to an embodiment of the invention.

Now referring to FIG. 14A there is depicted an expanded perspective view of "6-Shooter" 1400 of the "6-Shooter" actuator array of FIG. 13 for coupling to the fluidic manifold and the actuated member of the FLUDEV of FIG. 1 according to an embodiment of the invention. As depicted the "6-Shooter" 1400A comprises the following elements:

an upper manifold 1410, referred to as the negative side of the "6-Shooter" 1400A;
negative side housing spacer 1420;
negative side gasket 1430;
switch body 1440;
positive side gasket 1450;
positive side housing spacer 1460;
lower manifold 1480; and
washers 1470.

The "6-Shooter" 1400 within the switch body 1440 hold 6 EL-VALVEs 14000 comprising upper magnetic washer 14100 (negative side), upper coil 14200, spacer 14300, lower coil 14400, lower magnetic washer 14500 (positive side) and piston 14600. Each EL-VALVE 14000 may be driven to the negative side or positive side thereby either opening or closing the valve at either end of the EL-VALVE 14000.

Figure 14B:
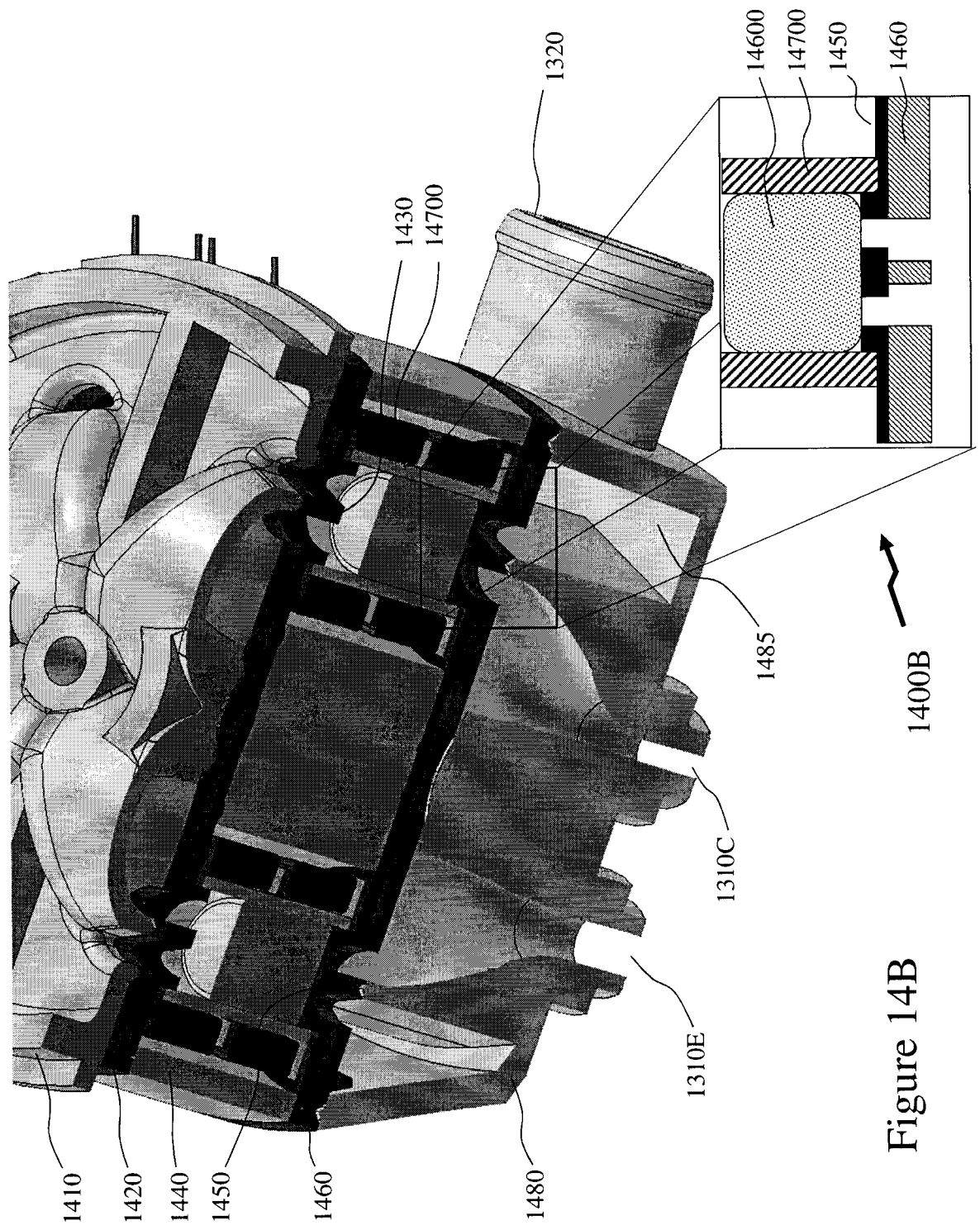
Figure 14C:
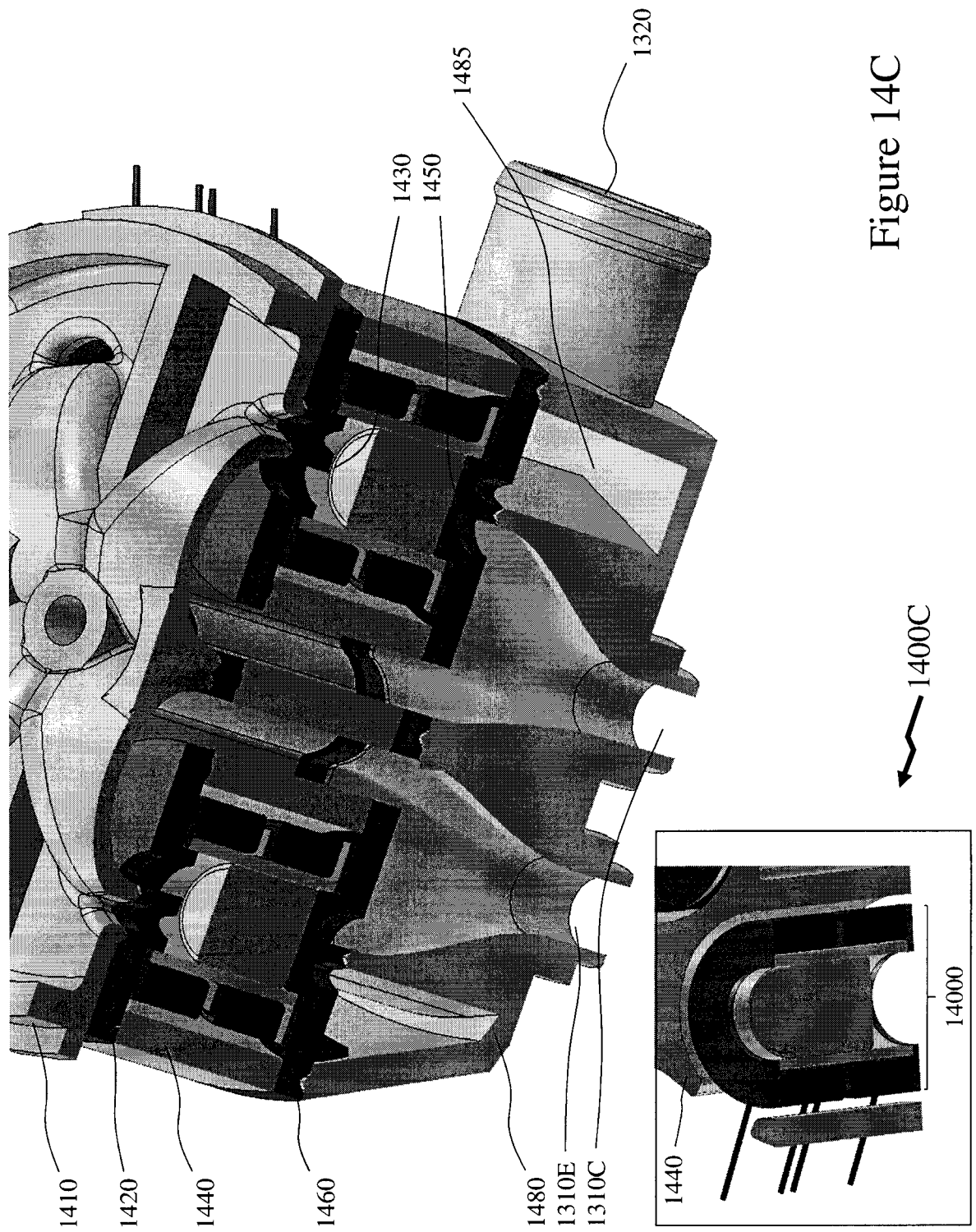

Referring to FIG. 14B there is depicted a perspective cross-sectional assembly of the 6-Shooter 1400. Within the configuration depicted in FIG. 14B the pistons of the EL-VALVEs are at the positive side such that the chamber 1485 within the lower manifold 1480 is blocked by the pistons such that no fluid flows to either of the third or fifth outlet ports 1310C and 1310E respectively. As the pistons are blocking the lower valves the upper valves are both open as depicted in FIG. 14C which depicts a cross-section that is slightly offset from that within FIG. 14B. Accordingly, the valves at the top of the 6-Shooter 1400 are evident as open from the third and fifth outlet ports 1310C to 1310E respectively via the ports to the exterior region above the upper manifold 1410. This region within the FLUDEV is coupled to portion of the EL-PUMP with the scaffold and casing. Accordingly, with the pistons as depicted the fluidic actuators within the FLUDEV are emptied by the action of the EL-PUMP. When the pistons are at the other end to that as shown the fluidic actuators are coupled to the same side of the EL-PUMP as the solid section and accordingly they are filled.

In this manner depending upon the position of each piston within each EL-VALVE a fluidic actuator may be filled or emptied to a predetermined level between empty and completely full. Alternatively, alternating the piston position results in fluidic pressure modulation which is coupled to the user's body as a physical vibration through the FLUDEV. Accordingly, each of the EL-VALVEs controls fluidic coupling from the EL-PUMP via the chamber 1485 to one of the output ports and from the output ports to the EL-PUMP via the channels that route through the positive side housing spacer 1460, positive side gasket 1450, switch body 1440, negative side gasket 1430, and negative side housing spacer to the upper manifold 1410.

Also depicted in FIG. 14B is insert 1400B showing the piston 14600 within the bobbin 14700 it moves within and around which the upper magnetic washer 14100 (negative side), upper coil 14200, spacer 14300, lower coil 14400, and lower magnetic washer 14500 (positive side) are assembled. Also depicted are the positive side gasket 1450 and positive side housing spacer 1460. Accordingly, it is evident that the positive side gasket 1450 (and the negative side gasket 1430) are designed to cover a peripheral region of the piston 14600 so that any chamfers on the piston 14600 do not provide a leakage path past the valve of which the piston 14600 and positive side gasket 1450 (or corresponding negative side gasket 1430) form part. The portion of the gaskets forming the openings at either end of the switch body may project into the body of the switch body 1440 only such that the bobbin is disposed between them or into both the body of the switch body 1440 and the bobbin 14700. The depth of the gaskets within the openings and/or bobbin may define the "stop" position of the piston at each end of the EL-VALVE and accordingly the position of the piston relative to the upper magnetic washer 14100 and lower magnetic washer 14500.

In order to reduce electrical power consumption, the upper magnetic washer 14100 and lower magnetic washer 14500 may be designed to provide sufficient magnetic retention of the piston 14600 at either end so that the upper coil 14200 and/or lower coil 14400 are only activated in order to open either the positive side valve or the negative side valve. However, as the positive side valve is intended to be held closed against the positive pressure from the EL-PUMP, for example 7 pounds per square inch (7 psi or approximately 50 kilopascal (kPa)) whilst the negative side may be held closed at 0 psi or lower pressures than 7 psi there is in embodiments of the invention an asymmetry in the distance of the upper washer 14100 from the piston end when the piston 14600 is against the negative side gasket 1430 on the negative side of the fluidic circuit to the distance of the lower washer 14500 from the piston end when the piston 14600 is against the positive side gasket 1450 on the positive side of the fluidic circuit. This distance may be controlled through the gaskets with their protrusions into the bore of the bobbin 14700 of each EL-VALVE. Alternatively, the distances are equal, but the magnet strength of the washers may be varied. Optionally, the spacer 14300 may be employed or removed with equal strength magnetic upper and lower washers 14100 and 14500 respectively wherein with the spacers 14300 in place the EL-VALVE is less efficient but offers increased latching force and without the spacers the efficiency is increased but the latching force reduced.

Within embodiments of the invention depicted a pair of coils for each valve/switch have been depicted although it would be evident that a single coil may be employed. However, with dual coils these may be wound inversely to one another, e.g. one clockwise and the other counter clockwise, such that they each create the same pole in the middle region of the valve/switch, e.g. North or South, and the other pole at the external ends, e.g. South or North. As noted supra the energy required to flip a switch from flowing to closed requires the magnet to push against the pressure within the fluidic system and hence takes more energy than opening the switch to allow flow to commence. Accordingly, within another embodiment of the invention the two coils may employ different wire diameters, e.g. average wire gauge (AWG) so each coil produces a different magnetic force. Accordingly, if the magnet is currently at the end of the valve with Coil A with its south (S) pole towards the end of the tube and its north (N) pole towards the middle of the valve/switch then the magnet N is closer to the middle of coil B than the magnet S is to coil A. Accordingly, coil B has an advantage over coil A. Accordingly, the switch design can be tuned to minimize energy use by using coils that are different from one another in wire AWG and or length and by optimizing magnet "standoff offset" distance for the +7 and 0 PSI ends.

Figure 15:
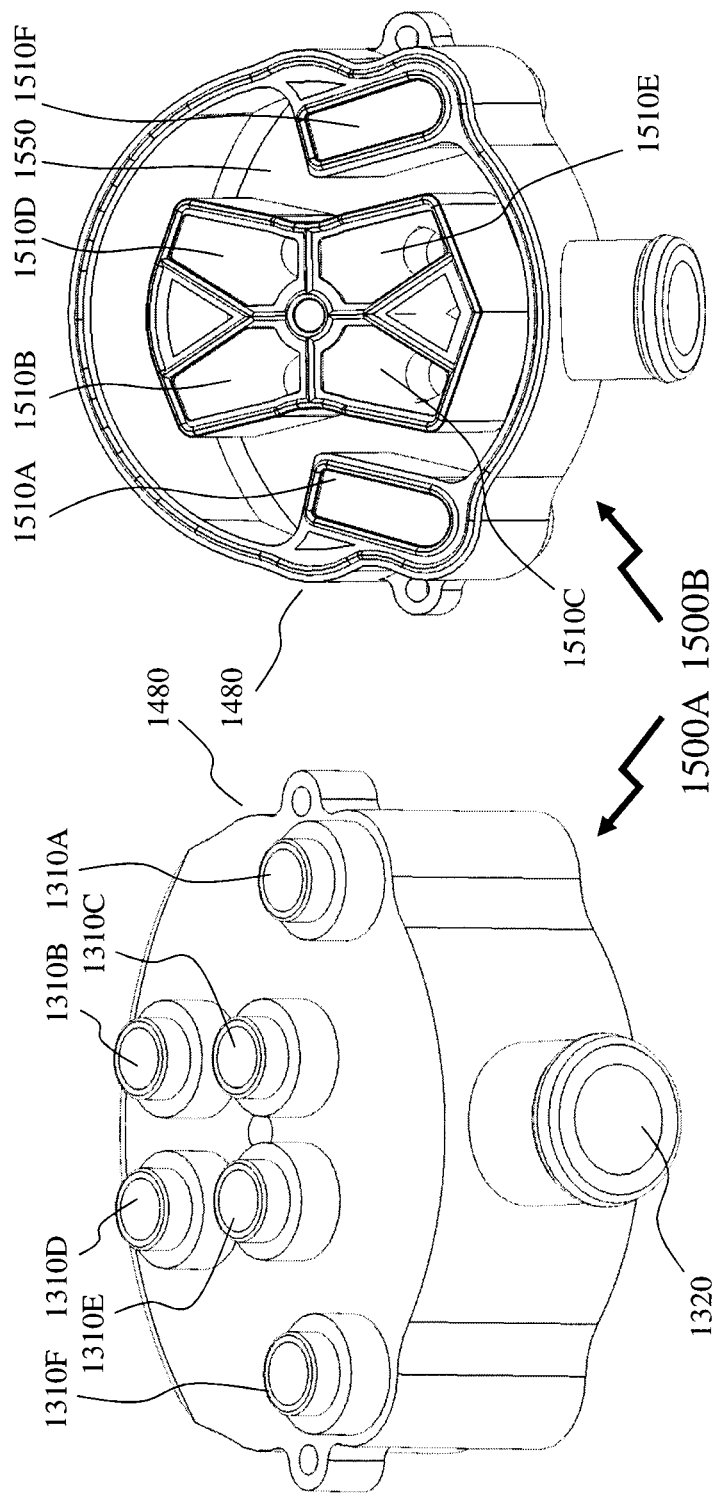
FIG. 15 depicts the common distribution assembly and manifold interface for the positive side assembly of the 6-piston actuator depicted in FIGS. 13 and 14 according to an embodiment of the invention.

Referring to FIG. 15 there are depicted first and second images 1500A and 1500B of the common distribution assembly and manifold interface (lower manifold 1480) for the positive side assembly of the "6-Shooter" 1400 depicted in FIGS. 13 and 14 according to an embodiment of the invention. On the lower side are first to sixth outlet ports 1310A to 1310F respectively. These couple to feeds 1510A to 1510F on the other side of the manifold interface 1480. The remainder of the manifold interface 1480 comprises chamber 1550 which is coupled to inlet port 1320.

Figures 16, 17:
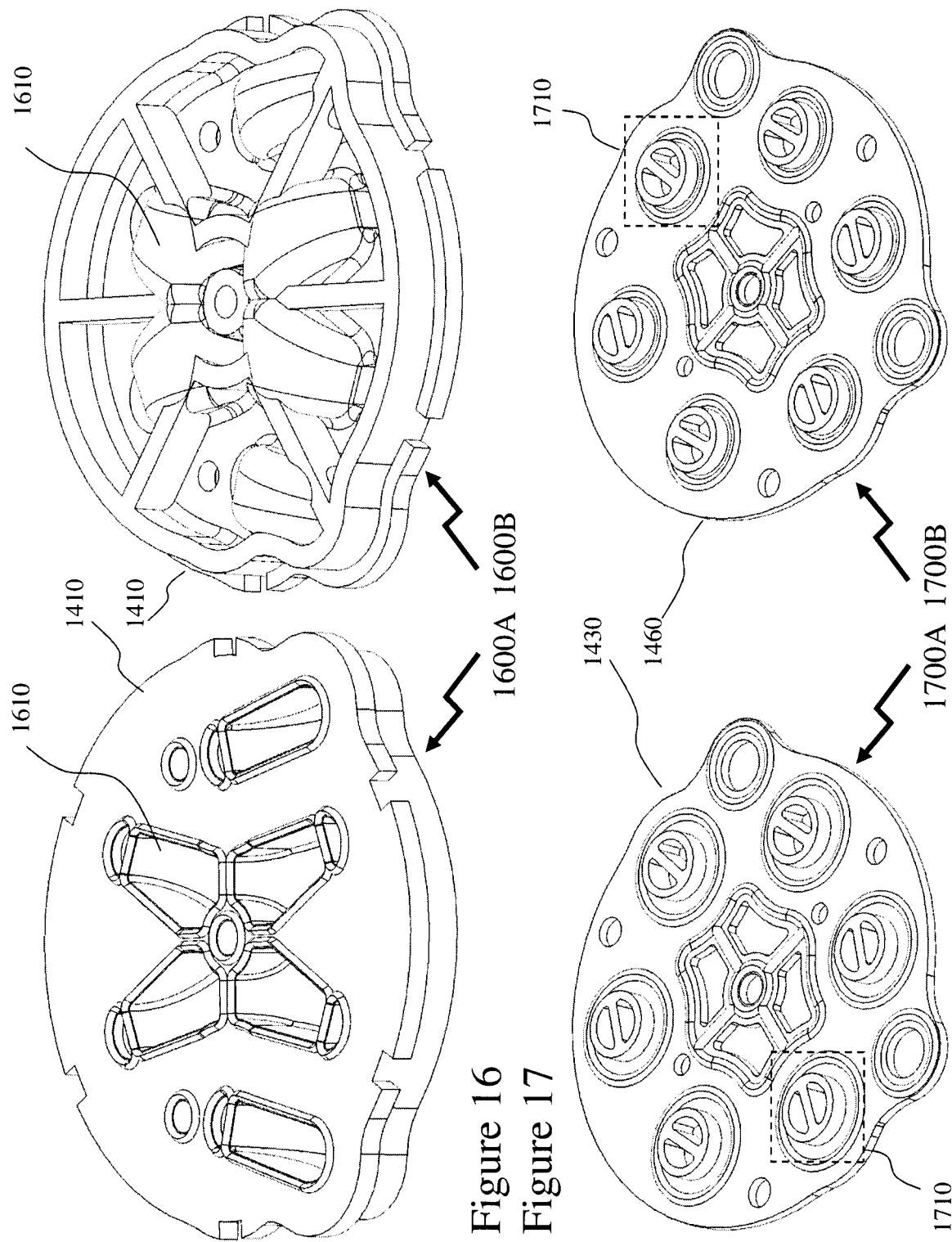
FIG. 16 depicts the distribution assembly and manifold interface for the negative side assembly of the 6-piston actuator depicted in FIGS. 13 and 14 according to an embodiment of the invention.
FIG. 17 depicts the gaskets for the positive and negative side assemblies of the 6-piston actuator depicted in FIGS. 13 and 14 according to an embodiment of the invention.

Now referring to FIG. 16 there are depicted first and second images 1600A and 1600B for the distribution assembly and manifold interface (upper manifold 1410) for the negative side assembly of the 6-piston actuator depicted in FIGS. 13 and 14 according to an embodiment of the invention. Within the lower surface of the upper manifold 1410 are guides 1610 which couple the output of each EL-PUMP 14000 to the peripheral channels 1490A and central openings 1490B within the switch body 1440 and their corresponding openings within the negative side housing spacer 1420, negative side gasket 1430, positive side gasket 1450, positive side housing spacer 1460, and washers 1470.

Referring to FIG. 17 there are depicted first and second images 1700A and 1700B respectively depicts the gaskets for the positive and negative side assemblies of the 6-piston actuator depicted in FIGS. 13 and 14 according to an embodiment of the invention, these being negative side gasket 1430 and positive side gasket 1460 respectively. The surfaces of the negative side gasket 1430 and positive side gasket 1460 depicted in first and second images 1700A an 1700B respectively are those disposed towards the EL-PUMPs within the "6-Shooter." Each raised portion 1710 on the EL-PUMP negative side gasket 1430 and positive side gasket 1460 due to the flexibility of the gaskets provides for a seal against the piston of the EL-VALVE. As discussed supra the negative and positive side gaskets 1430 and 1460 respectively may have different thicknesses (or what may be considered depth) such that the magnet standoff distance varies from one side to the other based upon one side requiring that a closed valve hold off the pressure from the pump whilst on the other return side the closed valve is holding off no pressure. Optionally, the washer may be replaced and/or used in combination with one or more gate seals.

Figure 18:
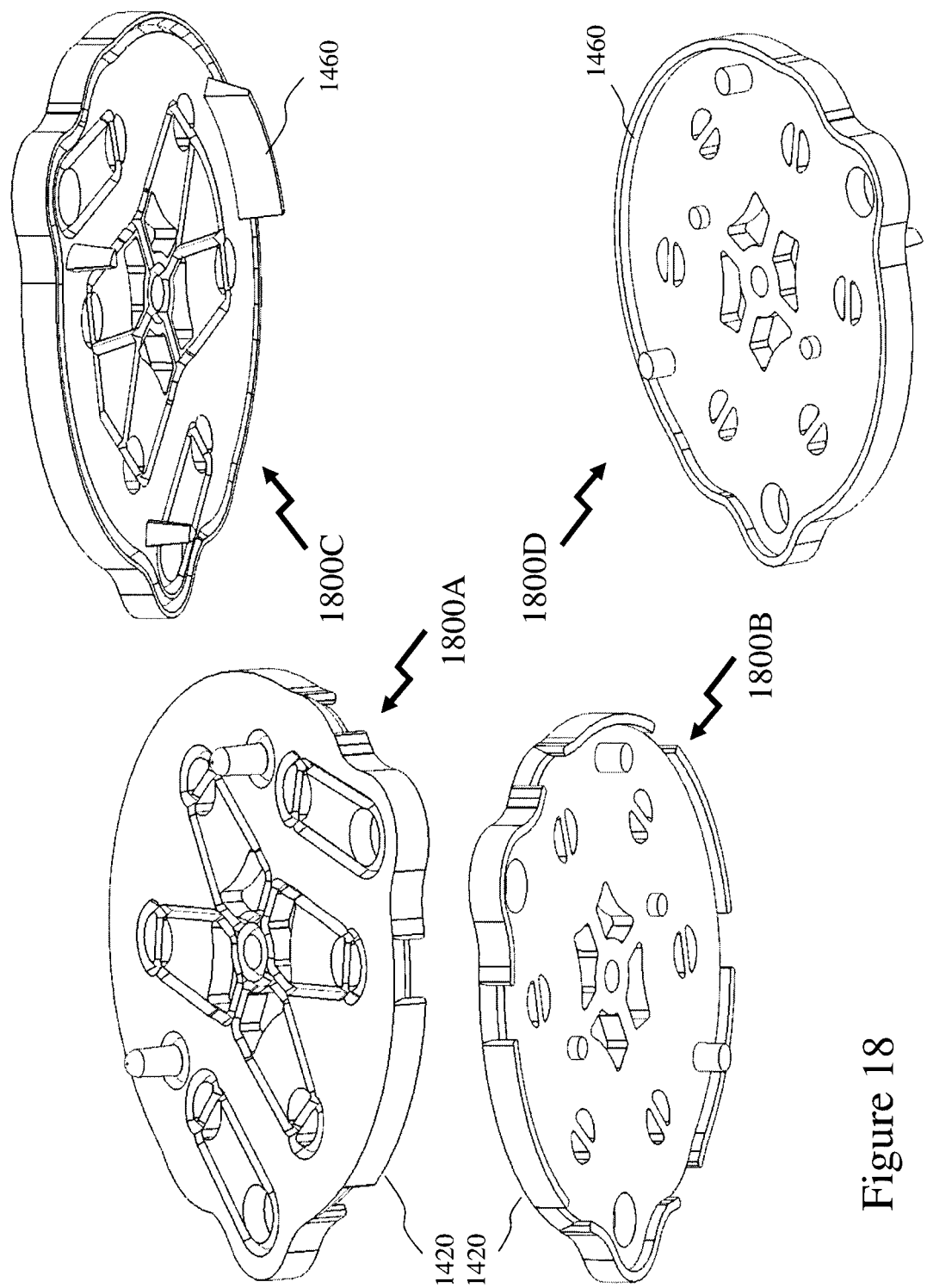
FIG. 18 depicts the gasket holders for the positive and negative side assemblies of the 6-piston actuator depicted in FIGS. 13 and 14 according to an embodiment of the invention.

Now referring to FIG. 18 there are depicted first to fourth images 1800A to 1800D respectively for the negative and positive side housing spacers 1420 and 1460 respectively for the positive and negative side assemblies of the 6-piston EL-VALVE depicted in FIGS. 13 and 14 according to an embodiment of the invention. As noted supra the negative and positive side gaskets 1430 and 1460 respectively are flexible allowing them to form an effective fluidic seal in conjunction with the piston of each EL-VALVE. However, without some resiliency the piston will simply push the gaskets back and this is provided by the negative and positive side housing spacers 1420 and 1460 respectively.

Figure 19:
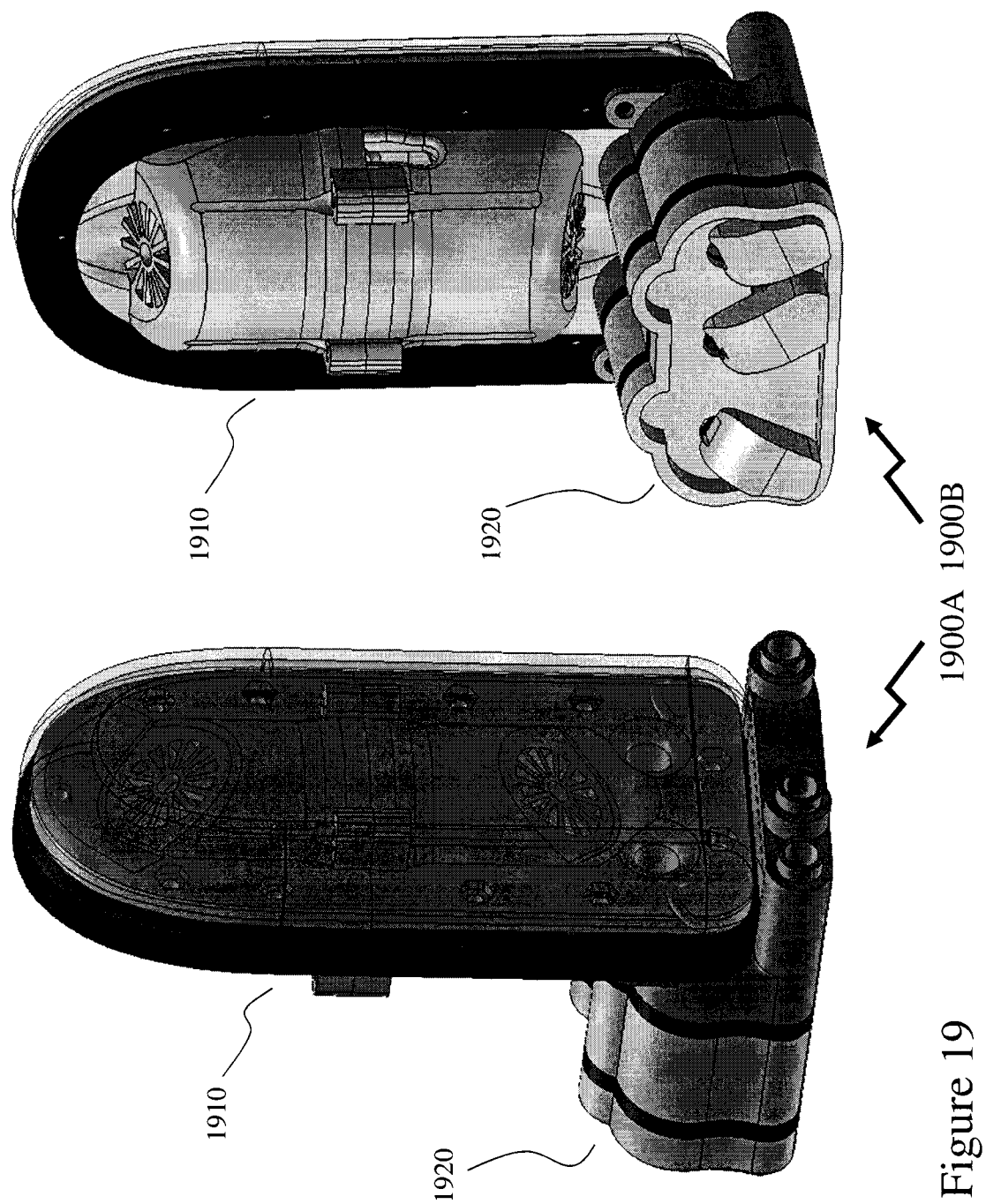
FIG. 19 depicts a linear EL-PUMP and 3-piston actuator combination according to an embodiment of the invention for use within a FLUDEV according to an embodiment of the invention wherein the positive side of the 3-piston actuator is directly coupled to the fluidic capacitor on the output of the EL-PUMP.
Figure 20:
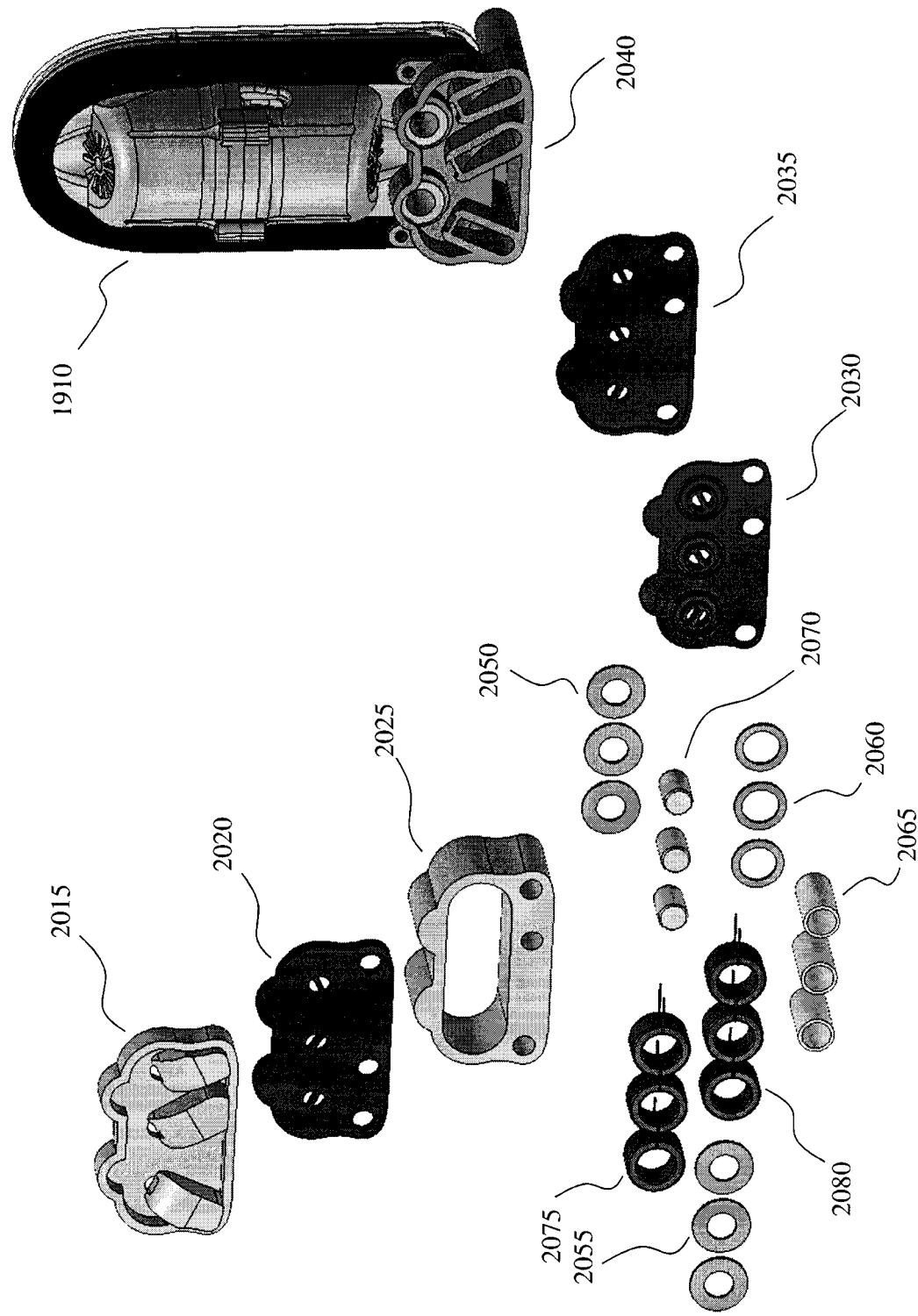
FIG. 20 depicts an exploded perspective view of the 3-piston actuator of the linear EL-PUMP and 3-piston actuator combination according to an embodiment of the invention depicted in FIG. 19.

Referring to FIG. 19 depicts a linear EL-PUMP 1910 and 3-piston actuator 1920 combination according to an embodiment of the invention for use within a FLUDEV according to an embodiment of the invention if first and second perspective views 1900A and 1900B respectively. Within these the EL-PUMP 1910 is depicted without the negative side frame, such as framed portion 250 depicted in FIGS. 3, 5 and 6 supra for clarity. Within first image 1900A the positive side of the 3-piston actuator is shown semi-transparent allowing the outlet non-return valve ports on either end of the pump to be visible whilst the 3 common ports of the 3-piston actuator 1920 are evident below it. The 3-piston actuator 1920 is attached directly to the EL-PUMP 1910 via ports on the EL-PUMP 1910 which are evident within the exploded three-dimensional (3D) perspective view of FIG. 20. Accordingly, the 3-piston actuator 1920 is depicted as comprising:
 a return manifold 2015, referred to as the negative side of the 3-piston actuator 1920;
 negative side spacer 2020;
 actuator body 2025;
 positive side gasket 2030;
 positive side spacer 2035; and
 output manifold 2040.

Disposed between the negative side spacer 2020 and positive side spacer 2035 within the actuator body 2025 are three electromagnetically activated valves (EL-VALVE) together with associated filler etc. to retain the 3 EL-VALVES. Each EL-VALVE comprising:
 positive side magnetic washer 2050;
 negative side magnetic washer 2055;
 inner washer 2060;
 casing 2065;
 piston 2070;
 positive side coil 2075; and
 negative side coil 2080.

Figure 21:
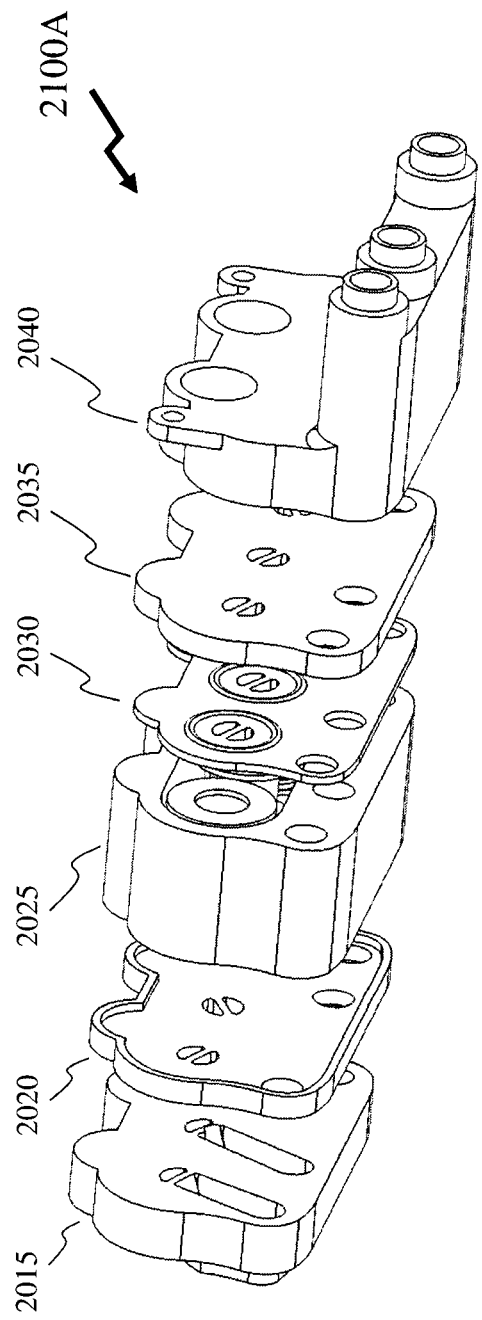
FIG. 21 depicts an exploded perspective view of the 3-piston actuator of the linear EL-PUMP and 3-piston actuator combination according to an embodiment of the invention depicted in FIG. 19.
Figure 21:
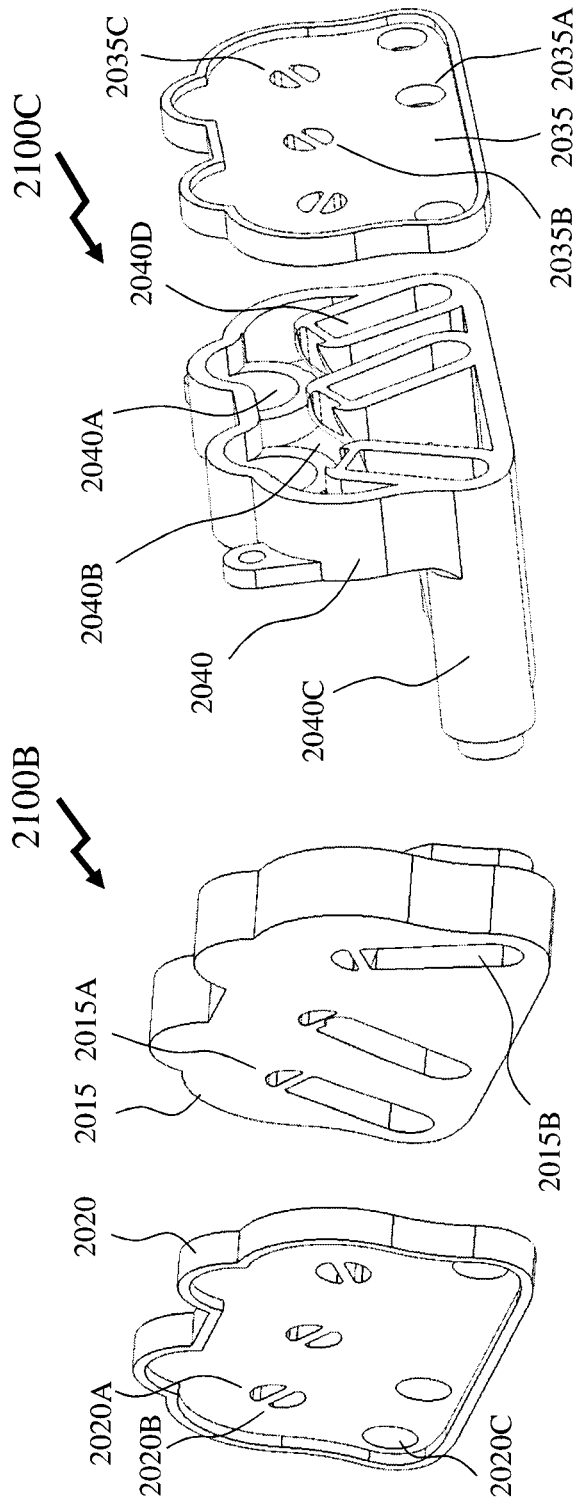

Optionally, the positive and negative side coils 2075 and 2080 may be a single coil. FIG. 21 similarly depicts the 3-piston actuator 1920 in exploded perspective 2100A together with first views 2100B which depicts a perspective view of the return manifold 2015 and negative side spacer 2020. The negative side spacer 2020 has three sets of first and second valve openings 2020A and 2020B which are covered or uncovered by the piston 2070 according to the drive signals applied to the coil(s) within the EL-VALVE. Now considering the return manifold 2015 each first valve opening 2020A aligns with a through path 2015A in the return manifold 2015 whilst each second opening aligns to one end of the channel 2015B wherein the other end of the channel 2015B aligns to the through ports 2020C within the negative side spacer 2020. Accordingly, return path fluid coupled to the common ports of the 3-piston actuator 1920 on the output manifold 2040 is coupled through the through ports 2020C to the channel 2015B and therein to the second port 2020B of the negative side spacer 2020. If the piston is driven to that end of the 3-piston actuator 1920 then it covers the first and second ports 2020A and 2020B stopping fluid flow otherwise fluid flows from the second port 2020B to the first port 2020A with the region between the piston and negative side spacer 2020. From the first port 2020A the fluid when flowing is coupled to the through path 2015A and out behind the return manifold 2015 into the negative side capacitor region of the fluid system of the FLUDEV.

Second view 2100C depicts the fluid links between the positive side spacer 2035 and output manifold 2040. As depicted an inlet port 2040A coupled to the positive fluidic capacitor of the EL-PUMP couples fluid into a chamber 2040B of the output manifold 2040. This fluid is then coupled via the first opening 2035C within the positive side spacer 2035 to the second opening 2035B when the piston is not adjacent the positive side spacer 2015 and blocked when the piston is adjacent the positive side spacer 2035. Fluid coupled to the second opening 2035B then flows via channel 2040D within the output manifold 2040 before flowing out the output port 2040C. Also disposed within the positive side spacer 2035 are openings 2035A which link to the output port 2040C and thereby to similar openings within the positive side gasket actuator body 2025 and positive side spacer 2035 (as noted supra having through ports 2020C).

Accordingly, with the piston within the EL-VALVE towards the return manifold 2015 fluid from the positive fluidic capacitor of the EL-PUMP is coupled to fluidic actuators coupled to the appropriate output port 2040C. When the piston within the EL-VALVE is then towards the output manifold 2040 fluid is withdrawn from the fluidic actuators coupled to the appropriate output port 2040C and coupled to the negative fluidic capacitor of the EL-PUMP.

Referring to FIG. 22 there is depicted a gate valve design to replace the gasket valve elements forming part of piston based actuators according to embodiments of the invention. Within embodiments of the invention described supra in respect of FIGS. 1 to 21 a valve opening consists of a pair of "D" shaped openings which are either exposed or blocked by the piston within the valve. As noted supra these "D" shaped openings may be implemented as raised portions 1710 as depicted in FIG. 17 wherein raised portion 1710 provides for a fluidic seal against the piston. In contrast, a gate valve 2220 according to an embodiment of the invention blocks/allows fluid flow from one side of the valve to the other, i.e. from first opening 2250 to second opening 2260 for example, based upon whether the piston 2210 engages the central ridge 2240. As depicted in FIG. 23 a plurality of gates 2320 may be provided upon a gasket 2310.

Now referring to FIGS. 24 to 27 there are depicted valve assembly variants according to embodiments of the invention. Considering initially valve assembly 2400 in FIG. 24 comprises first and second body portions 2410 and 2420 respectively and central body 2430 which define inlet and outlet openings that are selectively blocked/unblocked by pivotable stem 2440 which is driven to close either the port between first body portion 2410 and central body 2430 or the port between the second body portion 2420 and central body 2430 by first and second electromagnetic assemblies disposed within the first and second body portions 2410 and 2420 respectively, each comprising a coil 2460 and magnet 2470. The pivotable stem 2440 being mounted upon pivot 2450. Above the pivotable stem 2440 is an opening to an actuator (not identified by a reference numeral).

Figures 24, 25:
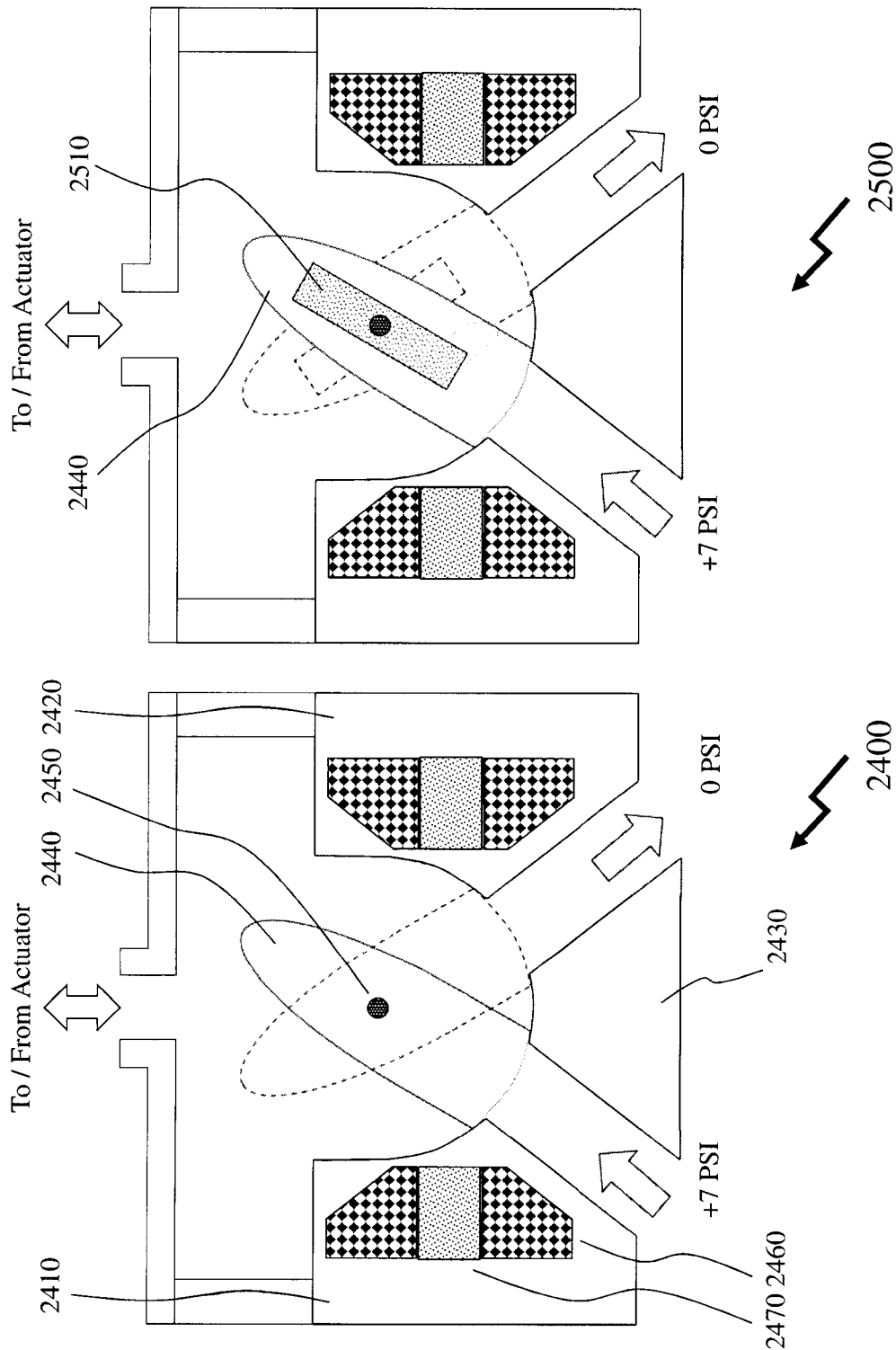
FIGS. 24 to 27 depict valve assemblies according to embodiments of the invention.

Within FIG. 24 the pivotable stem 2440 is metal whilst within FIG. 25 within valve assembly 2500 a magnet 2510 is disposed within the pivotable stem 2440. Optionally, a variety of magnet/metal (iron) combinations are possible as is replacing the metal of the pivotable stem 2440 with plastic such that a magnet is embedded within a plastic casing. Optionally, single or multiple coils may be employed as well as single or multiple magnets etc. Within other embodiments of the invention the pivotable stem 2440 may be latched into position when switched. This latching may employ a variety of means including, but not limited to, a spring or springs, a flexible member, a snap fitting etc.

Figure 27:
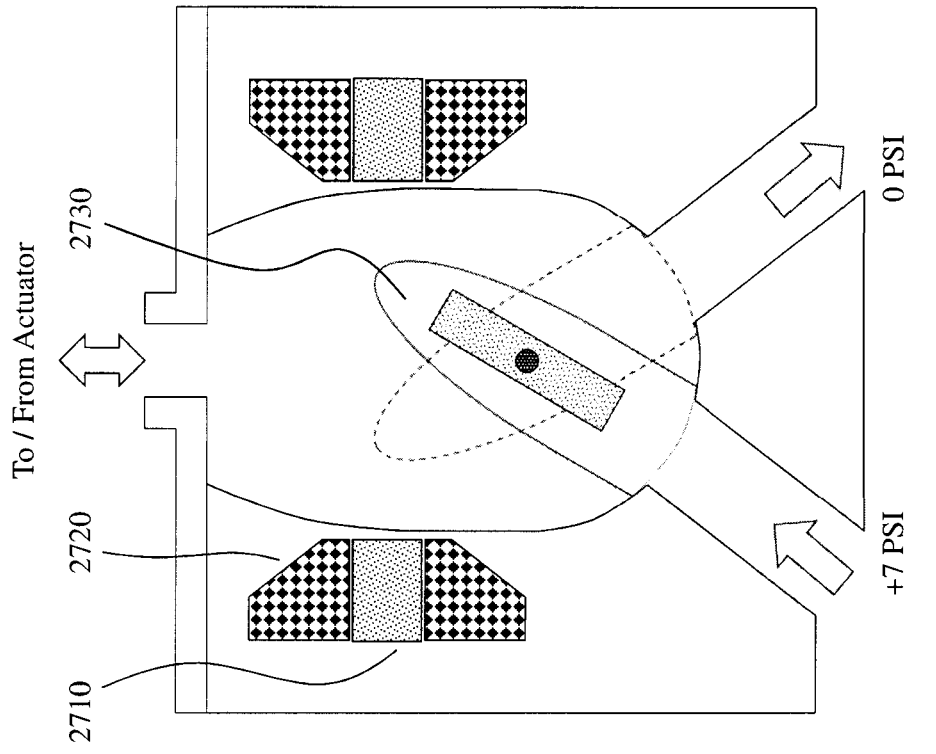
Figure 26:
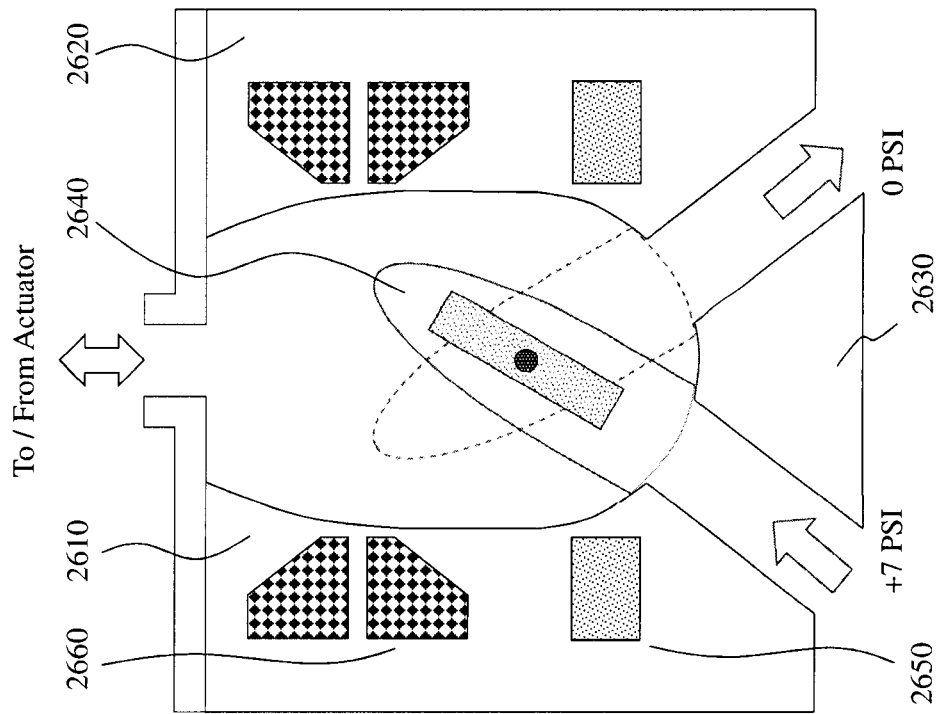

Within FIG. 26 a valve assembly 2600 is depicted wherein the first and second body portions 2610 and 2620 respectively and central body 2630 which define inlet and outlet openings that are selectively blocked/unblocked by pivotable stem 2640. However, now the magnets 2650 and electromagnetic coils 2660 are separated with the coils 2660 at the distal end of the pivotable stem 2640 from the ports being opened/closed where the magnets 2650 are disposed. Alternatively, as depicted in FIG. 27 with valve assembly 2700 the magnets 2710 and coils 2720 are both disposed towards the distal end of the pivotable stem 2730 from the ports being opened/closed.

Figure 28:
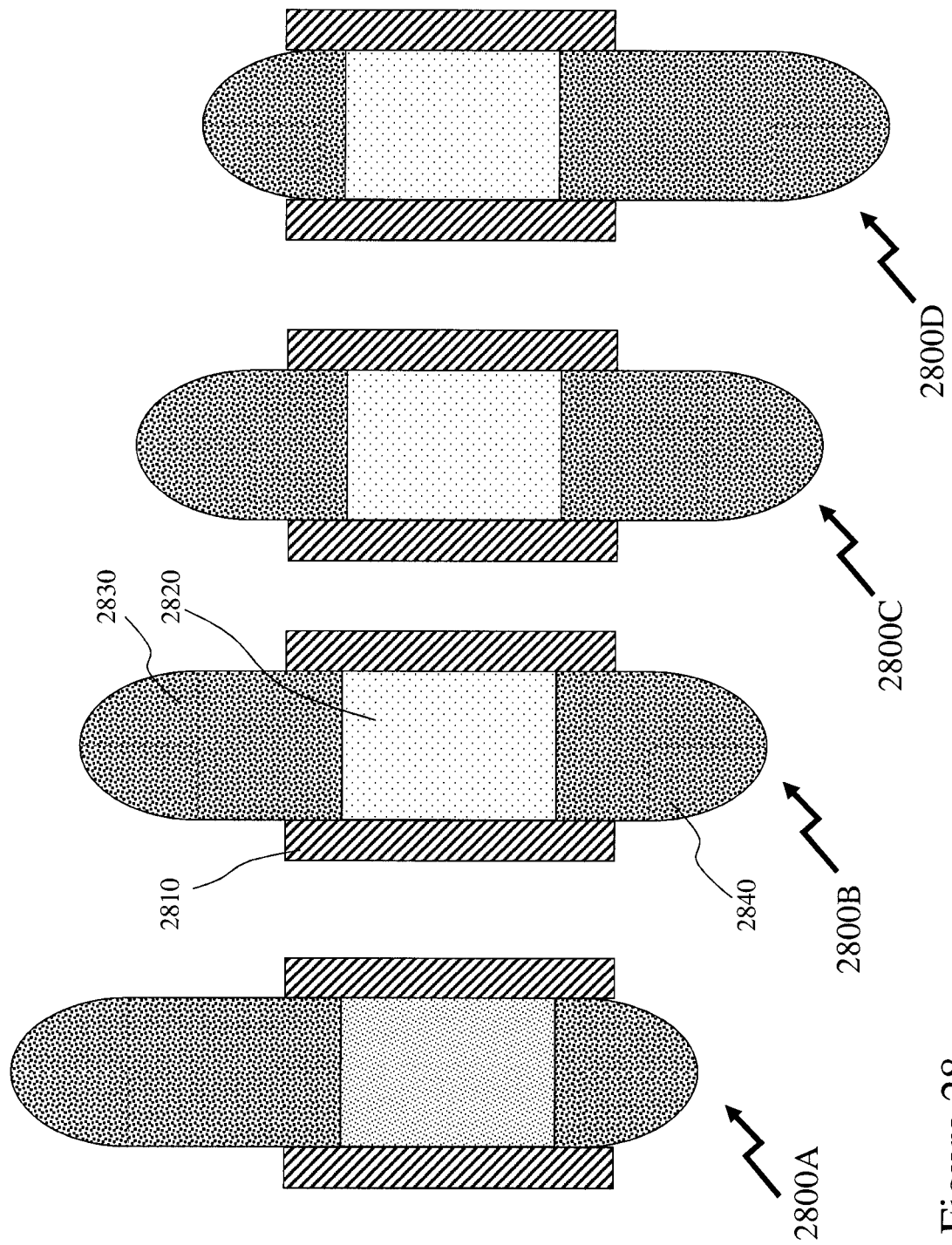
FIG. 28 depicts a fluidically activated device according to an embodiment of the invention.

Now referring to FIG. 28 there are depicted first to fourth views 2800A to 2800D respectively of a double-ended FLUDEV according to an embodiment of the invention wherein a pump 2820 is disposed within a handle 2810 with first and second fluidic actuators 2830 and 2840 at either end. Accordingly, the grow or shrink in perfect out of phase motion as depicted through first to fourth views 2800A to 2800D respectively. Accordingly, the device depicted has no "reservoir" but has two "phallic" ends for use by two people or one. Optionally, the body may be longer with a flexible geometry to allow the device to flex and/or bend with the pump disposed at one end of that central body or a series of pumps are sequentially connected such that they similarly flex or bend as a chain with the body of the device.

Accordingly, the FLUDEV in FIG. 28 without a reservoir means that one end grows as the other shrinks thereby allowing the weight and volume of the reservoir to be removed from the device. Within another embodiment of the invention a smaller reservoir than that necessary to fill both actuators may be provided such that both actuators, or the number of actuators within the device, cannot be empty or full at the same time. Exemplary configurations for a fluidic system for shrinking one reservoir and expanding the other reservoir are depicted in FIGS. 35 to 42 respectively although other configurations may be implemented.

Figure 29A:
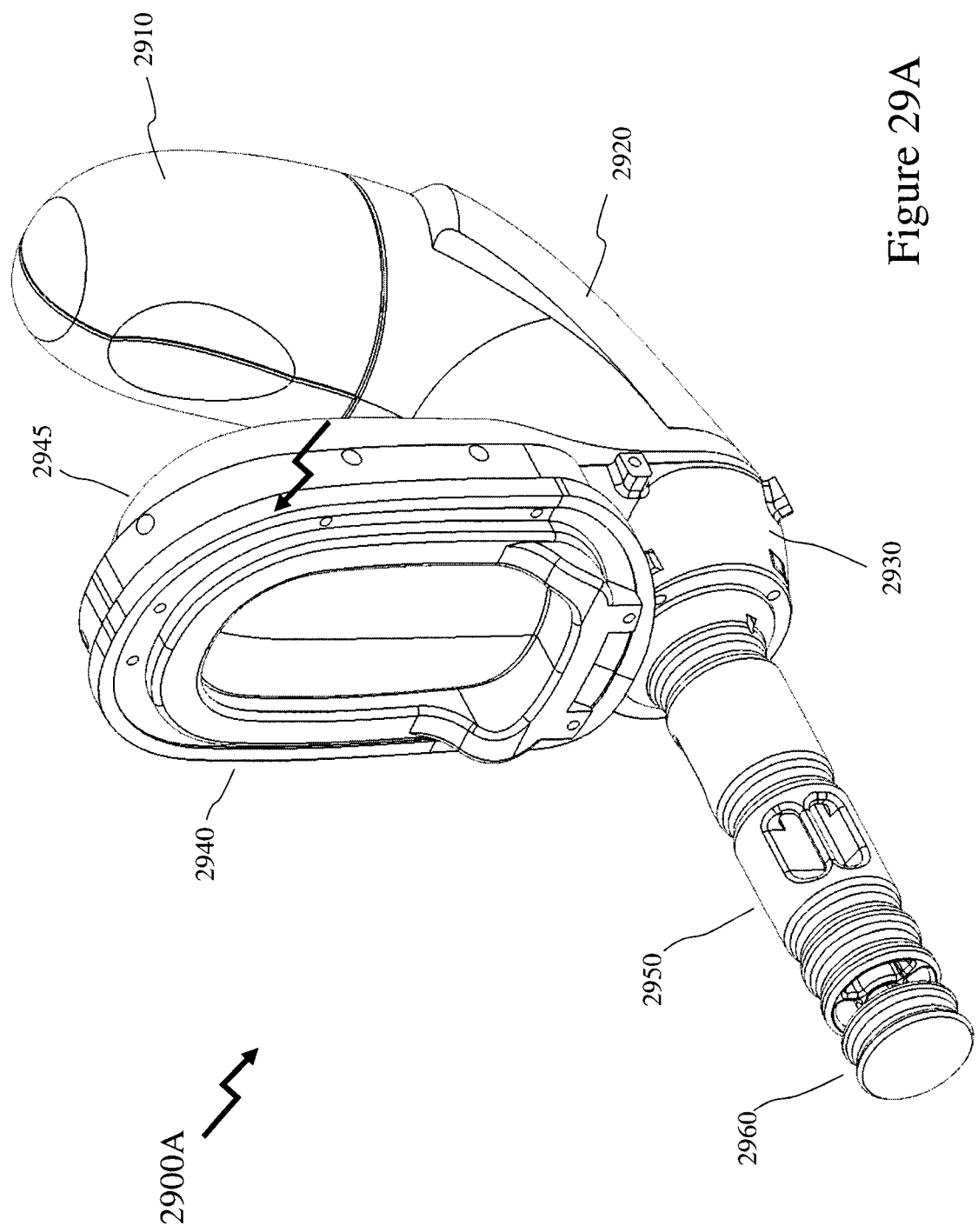
FIG. 29A depicts a FLUDEV according to an embodiment of the invention providing vibration, pressure, axial extension; and radial dilation.
Figure 29B:
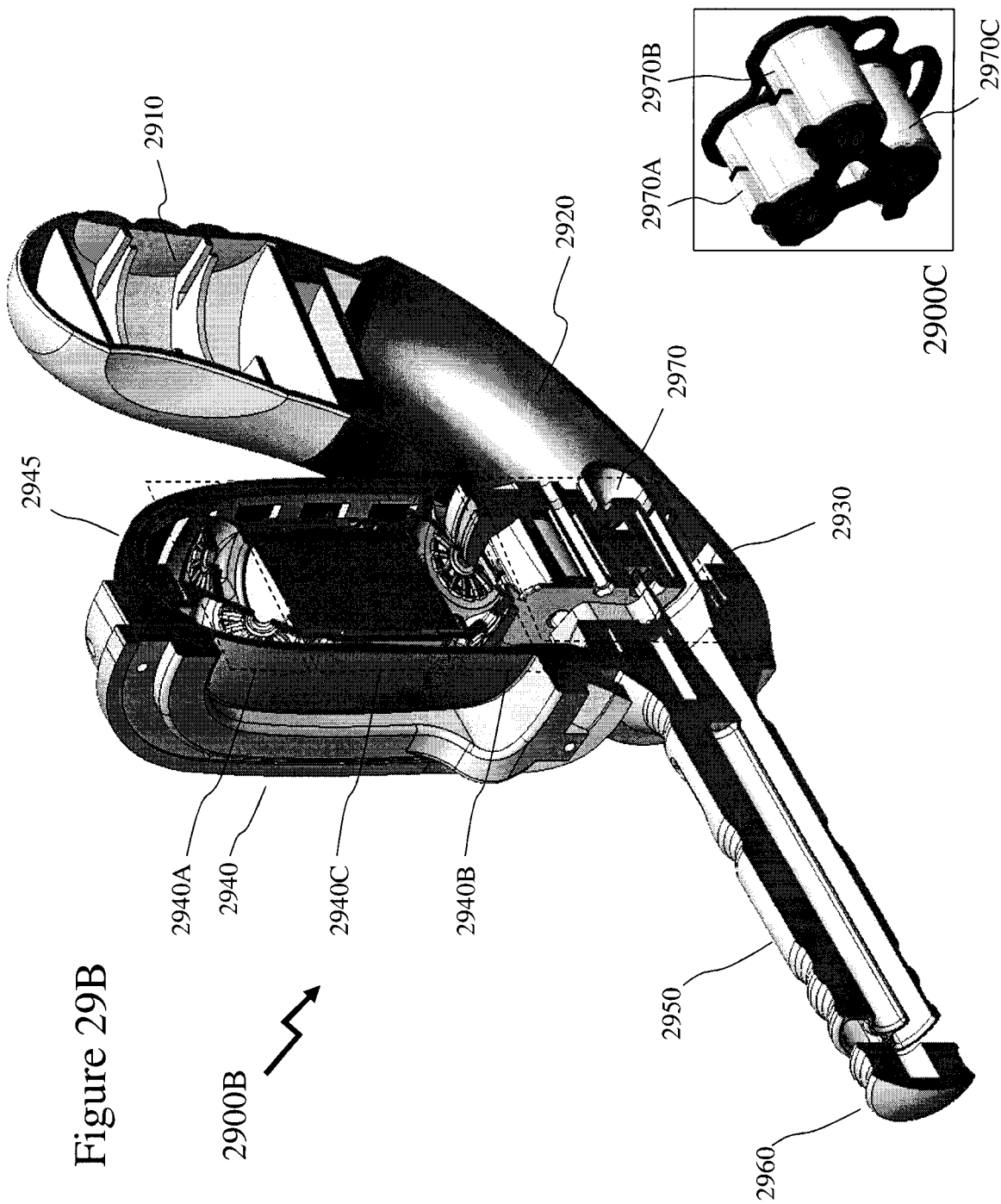
FIG. 29B depicts the FLUDEV according to FIG. 29A in cross-section perspective view.

FIG. 29A depicts a FLUDEV in image 2900A according to an embodiment of the invention providing vibration, pressure, axial extension; and radial dilation. As depicted the FLUDEV comprises first and second handle portions 2910, reservoir 2920, fluidic switch housing 2930, first actuator 2940, extended actuator arm 2950, and second actuator 2960. The FLUDEV in image 2900A is depicted without a casing with respect to the first actuator 2940, extended actuator arm 2950, and second actuator 2960. Within FIG. 29B in second image 2900B the FLUDEV is depicted in cross-section wherein the first and second handle portions 2910, reservoir 2920, fluidic switch housing 2930, first actuator 2940, extended actuator arm 2950, and second actuator 2960 are again visible. Within the fluidic switch housing 2930 is a three element fluidic switch array (3EL-SWITCH) 2970 exploiting switch elements having similar design to that depicted with respect to the 6-element switch array ("6-shooter") described supra in respect of FIGS. 13-19 respectively and the 3-element piston array described supra in respect of FIGS. 19-23 respectively. The 3EL-SWITCH 2970 having a configuration of three elements in a triangular array, as depicted in insert 2900C, rather than disposed radially as in FIGS. 13-18 respectively or linearly as in FIGS. 19-23 respectively. Accordingly, as depicted the 3EL-SWITCH 2970 has first to third switches 2970A to 2970C respectively disposed within.

Accordingly, disposed at one end of the three elements is a first manifold coupling fluid from the positive side of the pump assembly comprising first inlet/outlet element 2940A, second inlet/outlet element 2940B, and EL-PUMP 2940C to the three elements. Disposed on the other end of the three elements is a second manifold coupling to the negative side of the pump assembly. Accordingly, actuation of an element to move the piston within element away from the end with the first manifold to the second manifold couples fluid from the positive side of the EL-PUMP 2940C to the fluidic actuator(s) it is attached to such that the EL-PUMP 2940C pumps fluid into the fluidic actuator(s). Actuation of the piston in the element away from the second manifold to the first manifold couples the actuator to the negative side of the EL-PUMP 2940C such that fluid is removed from the fluidic actuator(s). Accordingly, actuation of each element in the 3EL-SWITCH 2970 results in fluid being pumped into or pumped from the fluidic actuator(s) it is coupled to. Reference to "positive side" being a convention employed by the inventor and within this specification refers to the side of the fluidic circuit wherein fluid is pumped from a reservoir or other portion of the fluidic circuit into a fluidic actuator whilst reference to the "negative side" through the convention employed by the inventor and within this specification refers to the side of the fluidic circuit wherein fluid is pumped to a reservoir or other portion of the fluidic circuit from a fluidic actuator.

Figure 30:
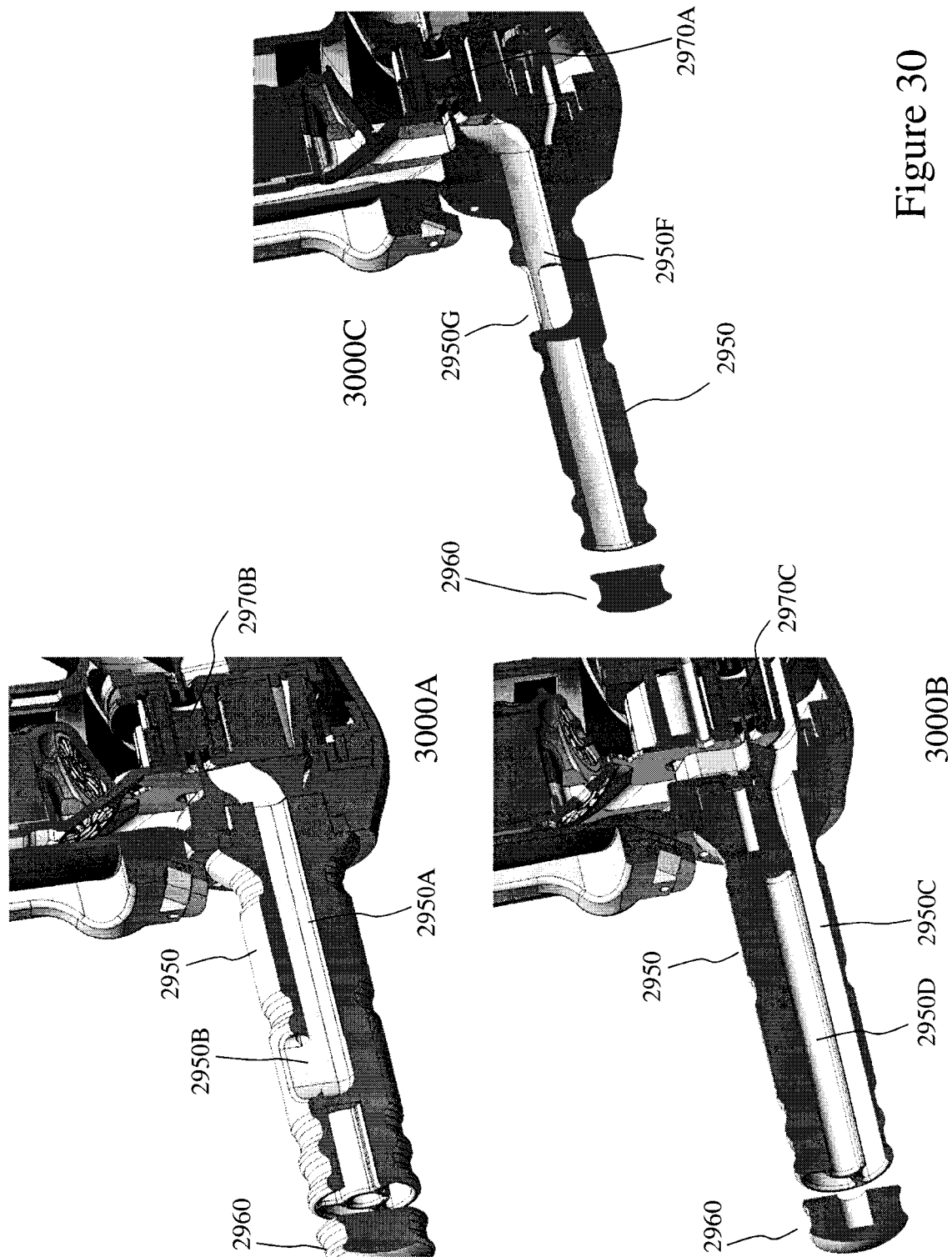
FIG. 30 depicts cross-sectional perspective views of the FLUDEV of FIG. 29A according to an embodiment of the invention showing the internal fluidic geometry of the extended actuator arm.

Accordingly, referring to FIG. 30 there are depicted first to third cross-sectional perspective views 3000A to 3000C respectively of the FLUDEV of FIG. 29A according to an embodiment of the invention showing the internal fluidic geometry of the extended actuator arm from the 3EL-SWITCH. First to third cross-sectional perspective views 3000A to 3000C respectively being successively further from the viewpoint of the user with respect to the FLUDEV. Accordingly, within first cross-sectional perspective view 3000A depicts the extended actuator arm 2950 with second actuator 2960 wherein a first fluidic coupling 2950A couples the first fluidic port 2950B of the extended actuator arm 2950 to the second switch 2970B of the 3EL-SWITCH. The first fluidic port 2950B allowing fluid to couple from the fluidic circuit to a skin or casing disposed around the extended actuator arm 2950 either locally to the first fluidic port 2950B or along a predetermined portion of the extended actuator arm 2950.

In second cross-sectional perspective view 3000B there are again depicted the extended actuator arm 2950 with second actuator 2960 wherein a second fluidic coupling 2950C couples a third fluid coupling 2950D and therein would actuate the second actuator 2960 by moving a connecting rod (not shown for clarity) which is coupled to the second actuator 2960 and has a portion disposed within the third fluid coupling 2950D. The second fluidic coupling 2950C is coupled to the third switch 2970C of the 3EL-SWITCH. Third cross-sectional perspective view 3000C depicts the extended actuator arm 2950 with second actuator 2960 wherein a fourth fluidic coupling 2950F couples a second fluidic port 2950G of the extended actuator arm 2950 to the first switch 2970A of the 3EL-SWITCH. The first fluidic port 2950G allowing fluid to couple from the fluidic circuit to a skin or casing disposed around the extended actuator arm 2950 either locally to the first fluidic port 2950G or along a predetermined portion of the extended actuator arm 2950.

Figure 31A:
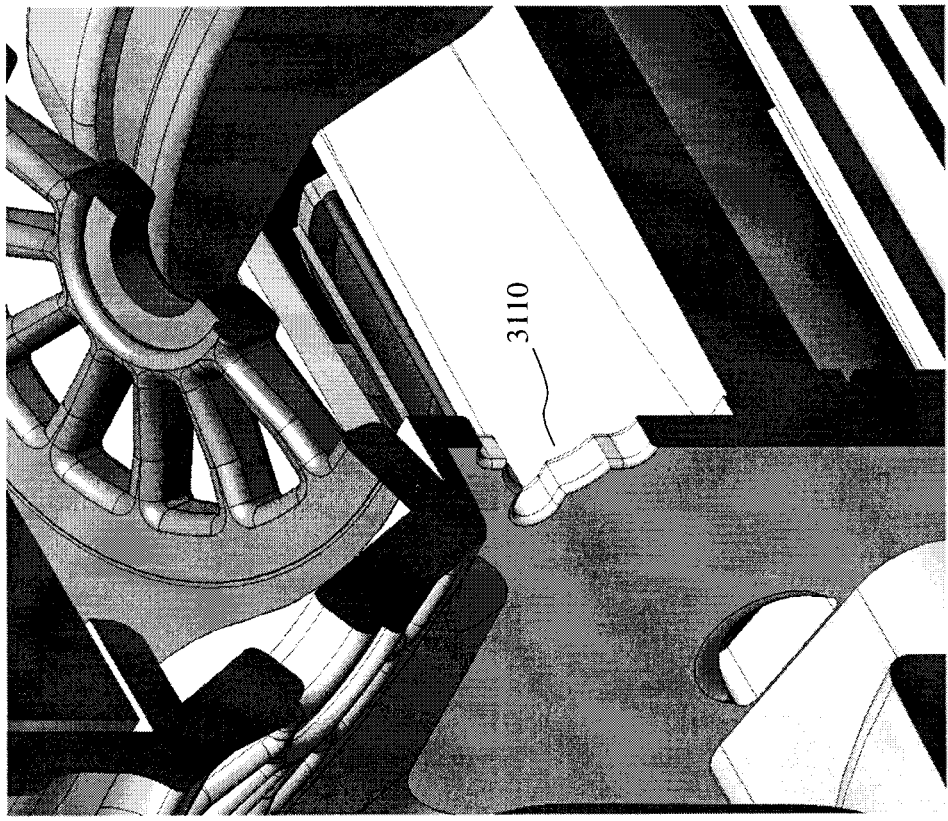
FIG. 31A depicts the location of a pressure relief valve within the FLUDEV of FIG. 29A according to an embodiment of the invention allowing the FLUDEV to operate in "open" loop mode.
Figure 31A:
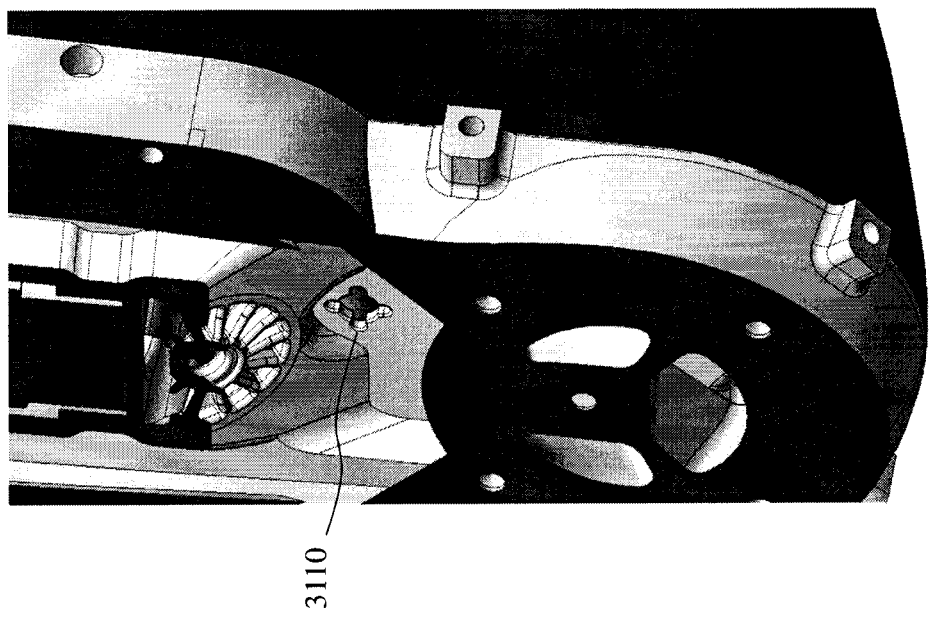

Now referring to FIG. 31A there is depicted a location of a pressure relief valve within the FLUDEV of FIGS. 29A to 30 respectively according to an embodiment of the invention allowing the FLUDEV to operate in "open" loop mode. A FLUDEV without a pressure relief valve requires the controller to manage pumping fluid and coupling it to/from the actuators in order for either the EL-PUMP to not "stall" as it cannot pump against the pressure already within the fluidic circuit or for one or more of the actuators to fail as they exceed their maximum pressure. Accordingly, the controller of the FLUDEV selectively activates the fluidic switches so that fluid is coupled into and out of the actuators so that the pressure is maintained. However, with a pressure relief valve the FLUDEV can pump fluid in an "open" loop configuration without any feedback as once the predetermined threshold pressure of the pressure relief valve is reached a fluidic port between the positive and negative sides of the fluidic circuit (e.g. bypassing the output (positive) side of the EL-PUMP to the input (negative) side of the EL-PUMP without going through the fluidic actuators, switches etc. In FIG. 31A in first and second images 3100A and 3100B respectively the pressure relief valve is depicted as only the valve opening 3110 without the valve body for clarity.

Figure 31B:
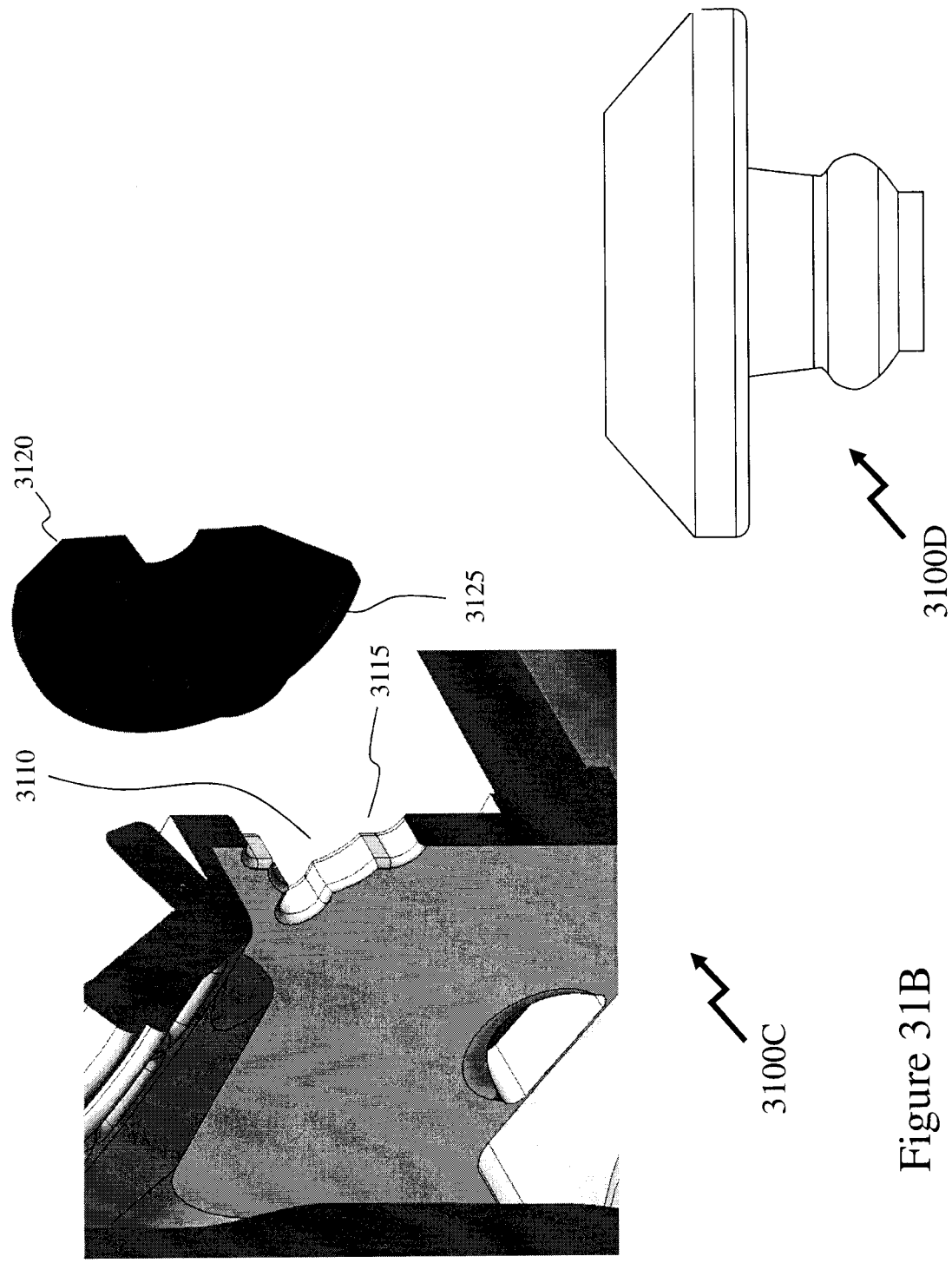
FIG. 31B depicts the geometry of the pressure relief valve with valve element according to the design depicted in FIG. 31A for an embodiment of the invention.

In FIG. 31B the geometry of the pressure relief valve with valve element according to the design depicted in FIG. 31A within first and second images 3100A and 3100B respectively for an embodiment of the invention is presented in third and fourth images 3100C and 3100D. Accordingly, the valve body 3120 is depicted with valve opening 3110 in third image 3100C in perspective exploded cross-sectional view whilst fourth image 3100D depicts the side elevation of the valve body 3120. Accordingly, below the trigger pressure the valve seat 3125 of the valve body 3120 is against the low pressure side surface 3115 of the FLUDEV. When the trigger pressure is reached the pressure within the valve opening 3110 pushes the valve seat 3125 away from the low pressure side surface 3115 of the FLUDEV. The valve opening 3110 comprises as depicted a central opening within which the central stem of the valve body 3120 is retained and can move. Disposed at four points around the periphery of the central opening are secondary openings. The dimensions of the secondary openings and thickness of the valve seat 3125 allows for the trigger pressures at which the pressure relief valve "cracks" (opens) and "reseals" (closes) can be adjusted as well as the flow rate through the pressure relief valve when open. Referring to Table 1 below the crack and reseal pressures of pressure relief valves with varying preload (thickness of the valve seat geometry).

TABLE 1

Performance of Pressure Relief Valves versus Thickness of Valve Seat Geometry

| Preload | Crack Pressure (psi) | Reseal Pressure (psi) |
|---|---|---|
| 0.060" | 9.5 | 8.0 |
| 0.050" | 8.5 | 7.5 |
| 0.045" | 7.0 | 6.0 |

Now referring to FIG. 32A there is depicted an exemplary geometry of the actuator 3200 for the extended actuator arm of the FLUDEV according to an embodiment of the invention as depicted in FIGS. 29A to 30 respectively. The actuator 3200 depicted in first and fourth perspective cross-sectional views 3200A to 3200D which respectively comprise:

First perspective cross-sectional view 3200A comprising extended actuator arm 2950 with second actuator 2960 (linking element between extended actuator arm 2950 and second actuator 2960 omitted for clarity);

Second perspective cross-sectional view 3200B comprising barrier 3230;

Third perspective cross-section view 3200C comprising bladder 3240; and

Fourth perspective cross-section view 3200D wherein the bladder 3240 is depicted comprising sock 3210 with zigzag features 3220.

The barrier 3230 prevents fluid from the fluidic circuit of which the extended actuator arm 2950 forms part leaking/bleeding through reducing the volume of fluid within the fluidic circuit. Accordingly, this allows for a wider selection base for the materials for the bladder 3240 as the bladder 3240 is now not required to eliminate fluidic movement through it as well as allowing for the bladder 3240 to be constructed in different geometries and from different materials without consideration of compatibility with the fluid in the fluidic system, porosity, etc. Accordingly, as depicted the bladder 3240 is formed from a sock 3210 and zigzag features 3220. The sock 3210 is formed from a material which has a low Young's modulus, i.e. it is elastic, whereas the zigzag features 3220 are formed from a material which has a higher Young's modulus, i.e. it is not elastic. Accordingly, as the sock 3120 expands under the pressure of the fluid the zigzag features "unfold" until they are fully open (unfolded) at which point they limit further motion. The barrier 3230 is similarly formed of a low Young's modulus material such that it expands with the fluid. If the zigzag features 3220 are all identical then the sock 3210 will expand in the same manner along its length.

However, if some zigzag features 3220 are dimensioned differently then they will limit motion of the sock 3210 at a different expansion point to the other zigzag features 3220. If the zigzag feature 3220 is already fully expanded or unfolded at the initial diameter of the sock 3210 around the extended actuator arm 2950 then these sections of the bladder 3240 will not change in diameter as fluid flows within the extended actuator arm 2950 and barrier 3230. In this manner, through adjusting the properties/dimensions of the zigzag features 3230 then bladder 3240 can be considered to be in different sections linked to different fluidic channels within the extended actuator arm 2950. The absence of zigzag features 3220 within the end of the sock 3210 and hence bladder 3240 allows the second actuator to extend out and increase the length of that portion of the device.

Accordingly, the combination of a low Young's modulus sock 3210 with high Young's modulus zigzag features 3220 results in a bladder 3240 which expands rapidly with low resistance until the zigzag features 3220 are fully unfolded at which point the bladder 3240 exhibits a high resistance to further expansion. In this manner a bladder 3240 may comprise multiple sections each offering low initial resistance until the zigzag elements are unfolded with the range of expansion defined by the zigzag elements. These multiple sections may be coupled to different fluidic portions of the fluidic circuit or to a common fluidic port. Resilient zigzag elements may provide for differentiation of sections such that, for example, the sections of the bladder linked to the first fluidic port 2950B and second fluidic port 2950G are independent with the dimension of the portion of bladder with these resilient zigzag elements does not change as fluid flows out from or back into the first fluidic port 2950B and second fluidic port 2950G, for example.

Within embodiments of the invention the zigzag elements are typically formed from a different elastomeric material to those of the sock. However, in other embodiments of the invention the zigzag elements and sock may be formed from a common elastomeric material but processed differently to achieve the different mechanical properties. In such embodiments the zigzag elements and sock are therefore the same piece part and the zigzag elements are not essentially embedded but sections of the sock. For example, localized thermal processing and/or chemical processing may provide the desired change in mechanical properties of the common material to define the zigzag elements within the overall sock.

Accordingly, an actuator can be designed to expand as an elastomer without zigzag elements such that there is no limiting the stretch mechanism and accordingly the controller within the FLUDEV is programmed so that the valves (fluidic switches) do not overfill the otherwise ever expanding actuator. However, in the event of a program failure then the FLUDEV would continue pumping fluid into the actuator wherein if the actuator failure point with respect to pressure is below the pressure the FLUDEV can generate within the actuator before the EL-PUMP etc. stall then the actuator will fail. However, by exploiting embodiments of the invention such as those described and depicted in respect of FIG. 32 then the actuator can be designed to handle the maximum generatable pressure within the FLUDEV such that the actuator does not rupture or fail irrespective of how long the controller seeks to fill the actuator as the maximum pressure generatable by the FLUDEV is below the failure threshold of the actuator.

The inventors note that where actuators are implemented without such zigzag elements to limit expansion, or even in other instances where they are employed, it may be beneficial to form the actuator portions that expand from one or more cross linked elastomers, e.g. a thermoset rubber for example, as this will limit the overall stretch within the actuator after repeated stretching. As noted above with a purely elastic actuator solution, i.e. one without a zigzag element or a non-elastic thread or low elasticity thread etc. formed within the actuator to limit expansion then the actuator will expand until the controller stops pumping more liquid in, but this solution has the advantage that by controlling what pressure the balloon is filled with, or how much volume is pumped into the actuator, one can control how big the device gets. If operated at lower pressure(s), the device typically does not get as big. However, with the zigzag or thread approach there is little size difference between say 4 psi and 7 psi as the actuator may be, for example, 90% full with 4 psi and only grows slightly more at 8 psi. However, the benefit is that rapid motion can be achieved with relatively small pressure changes in contrast to the purely elastic actuator. Hence, a design with zigzag elements within the sock will rapidly expand to maximum dimensions before the zigzag elements abruptly reduce the rate of subsequent expansion. Accordingly, depending upon the desired functionality of the actuator different designs may be employed within the same FLUDEV.

Figure 32B:
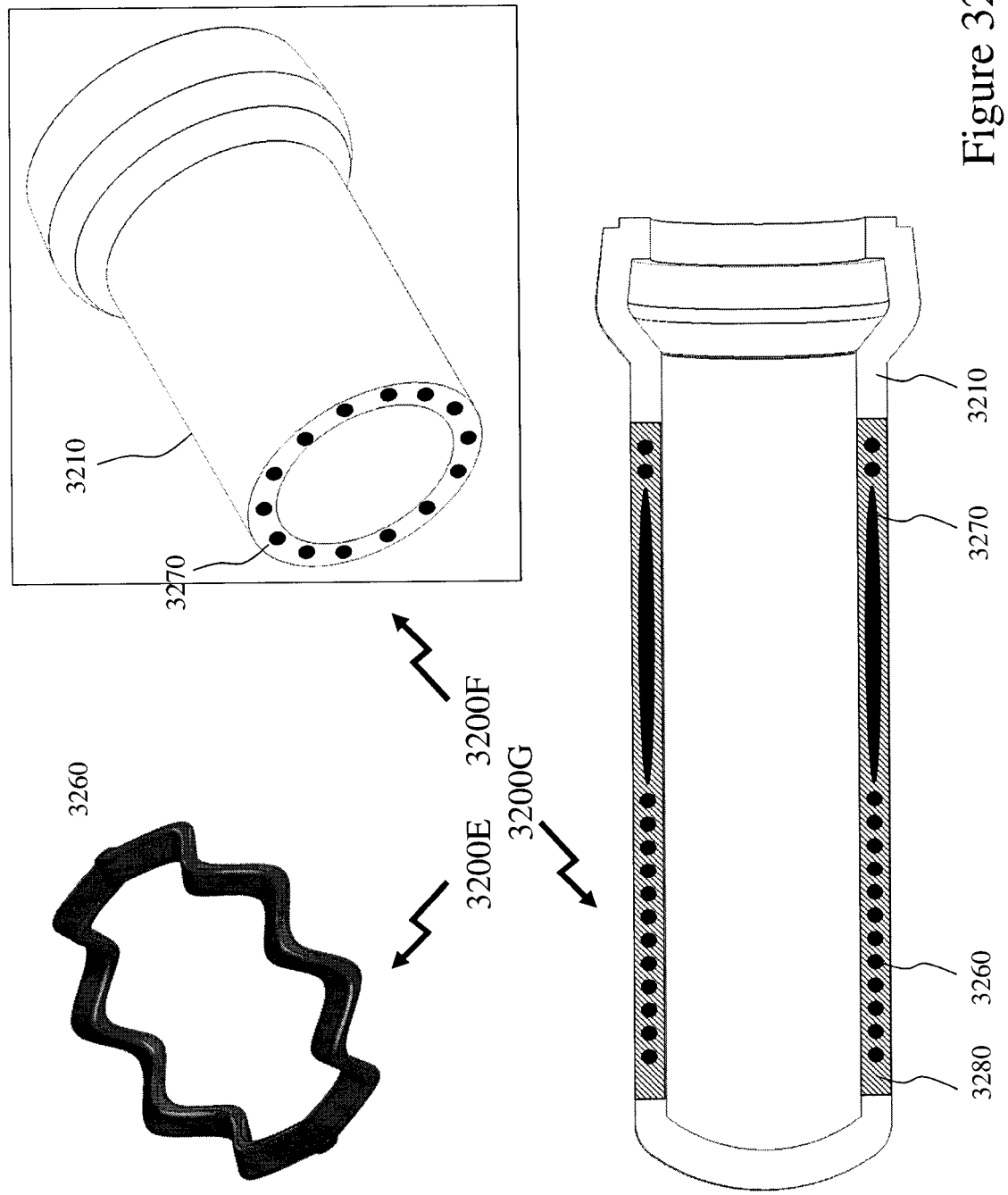

Referring to FIG. 32B in first image 3200E a single zigzag element 3260 is depicted. The cross-sectional geometry of the zigzag element, a radial zigzag element 3260 which allows expansion radially, is rectangular although it would be evident that within other embodiments of the invention the cross-sectional geometry may be square, circular, elliptical, a regular polygon, or an irregular polygon for example. Within second image 3200F a sock 3210 is depicted formed from a low Young's modulus material with series of axial zigzag elements 3270 disposed longitudinally within it. Without extension of the sock 3210 the elements 3270 are in a zigzag format longitudinally along the sock 3210 and extend as the sock expands before they reach their full extent and stop the sock 3210. In third image 3200G a sock 3210 is depicted comprising zigzag elements 3260 in one portion and axial zigzag elements 3270 within another portion. Whilst the elements within the sock have been described as zigzag this is employed within this description to provide the reader with a mental visualization of what a high Young's modulus element in unexpanded format may resemble before the sock expands straightening the zigzag element. It would be evident that the zigzag elements may fold in only one direction (supporting radial or axial expansion for example) or in two directions (supporting radial and axial expansion concurrently). The zigzag elements may be formed from a harder plastic, for example a nylon or a higher durometer elastomer, such that they are embedded within a softer plastic, e.g. a lower durometer elastomer. Accordingly, by appropriate selection of the materials the zigzag elements may prevent any additional extension once extended, provide for directional control of stretch, or reduce the rate of extension once the elements reach their fullest extension.

Figure 33A:
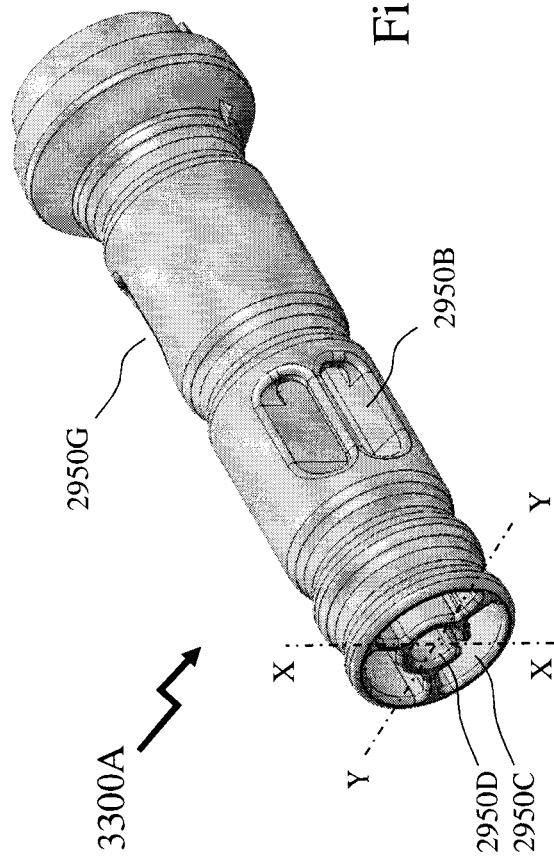
FIGS. 33A and 33B depict the inner mechanical element of the extended actuator arm according to an embodiment of the invention depicted in FIG. 29A in multiple cross-sectional perspective views.
Figure 33A:
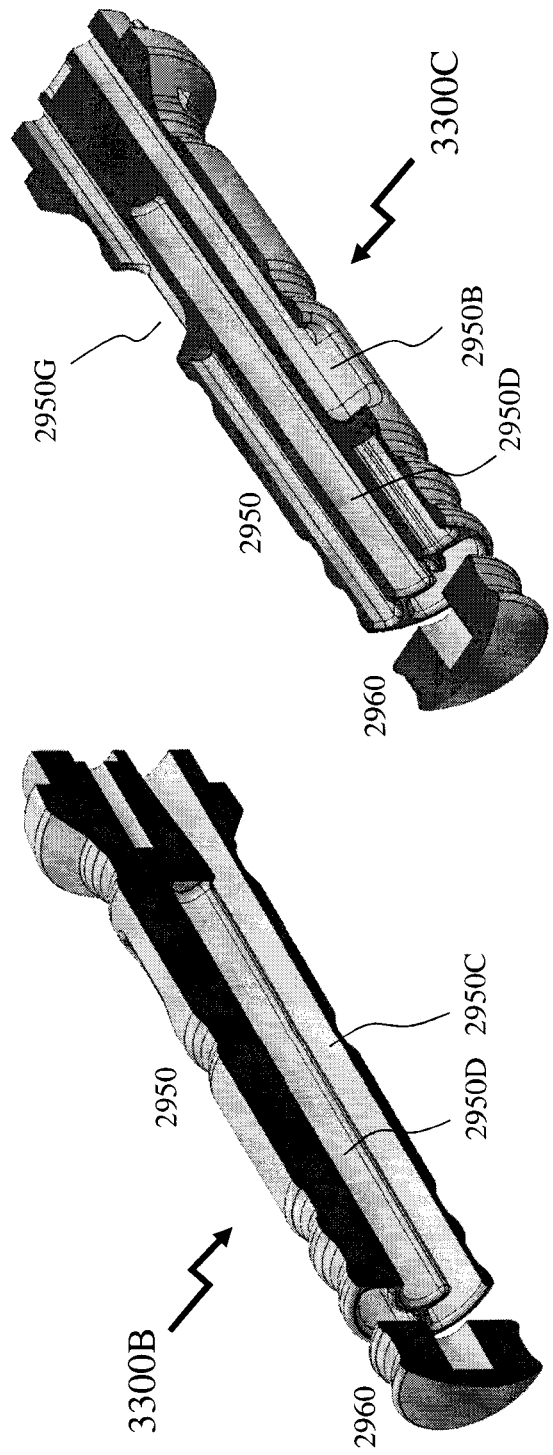
Figure 33B:
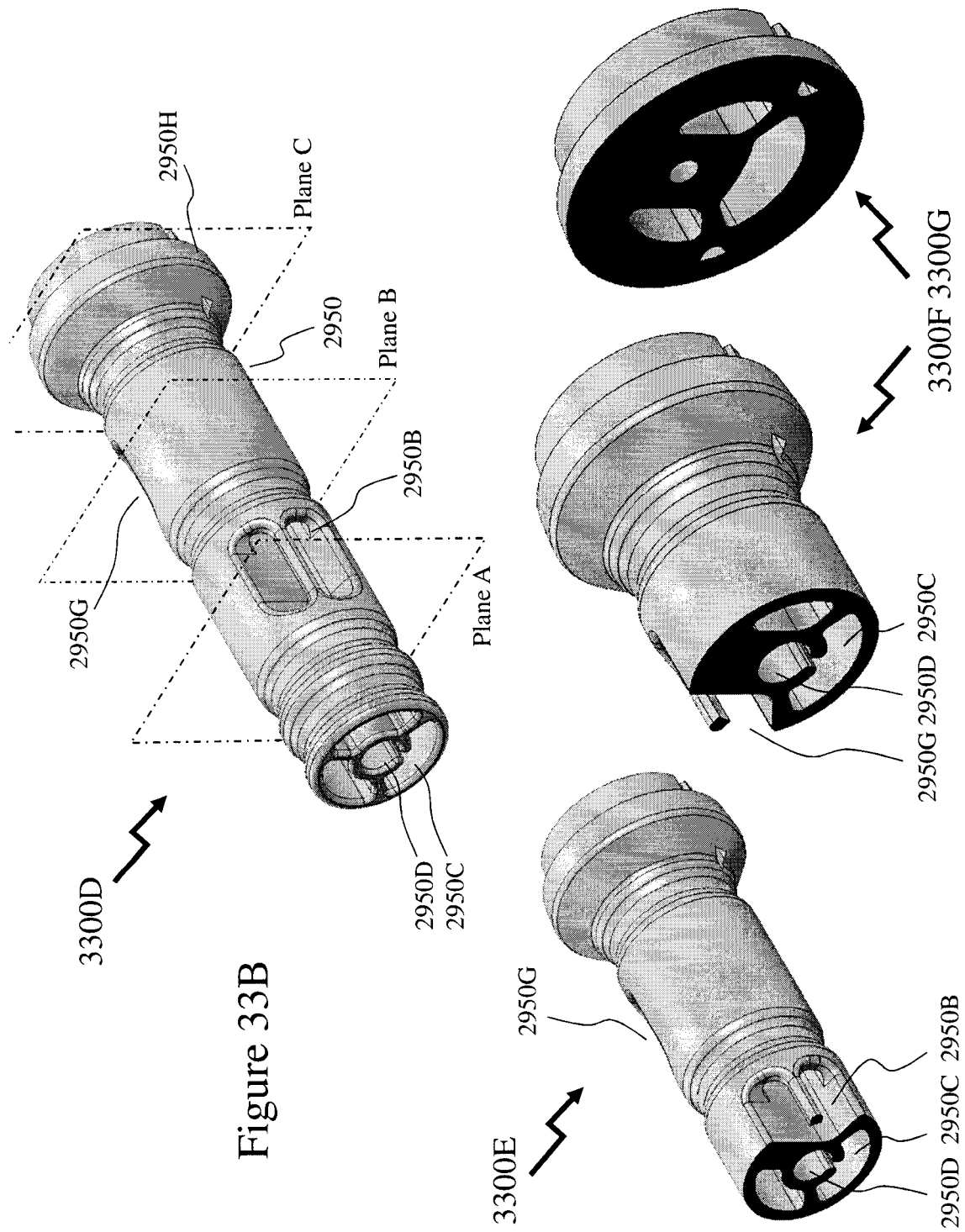

Referring to FIGS. 33A and 33B there are depicted first to seventh images 3300A to 3300G of the extended actuator arm 2950. First and fourth images 3300A and 3300D respectively depict the extended actuator arm 2950 with the first fluidic port 2950B, second fluidic coupling 2950C, third fluidic coupling 2950D, and second fluidic port 2950G together with mounting 2950H. Second and third images 3300B and 3300C respectively depicted cross-sections along vertical section X-X and horizontal section Y-Y respectively and show the internal structure in a similar manner as the first to third cross-sectional perspective views 3000A to 3000C respectively in FIG. 30 linking the bladder 3240 which fits over the extended actuator arm 2950 but is not depicted for clarity to the fluidic switches in the body of the FLUDEV to which the extended actuator arm 2950 is joined via mounting flange 2950H.

In FIG. 33B the fifth to seventh images 3300E to 3300G respectively depict the extended actuator arm 2950 through first to third section planes A to C respectively. Accordingly, these depict:

Fifth image 3300E along first section plane A showing the first fluidic port 2950B, second fluidic coupling 2950C and third fluidic coupling 2950D;

Sixth image 3300F along second section plane B showing the second fluidic coupling 2950C, third fluidic coupling 2950D, and second fluidic port 2950G; and Seventh image 3300G along third section plane C through the mounting flange 2950H.

Figure 34:
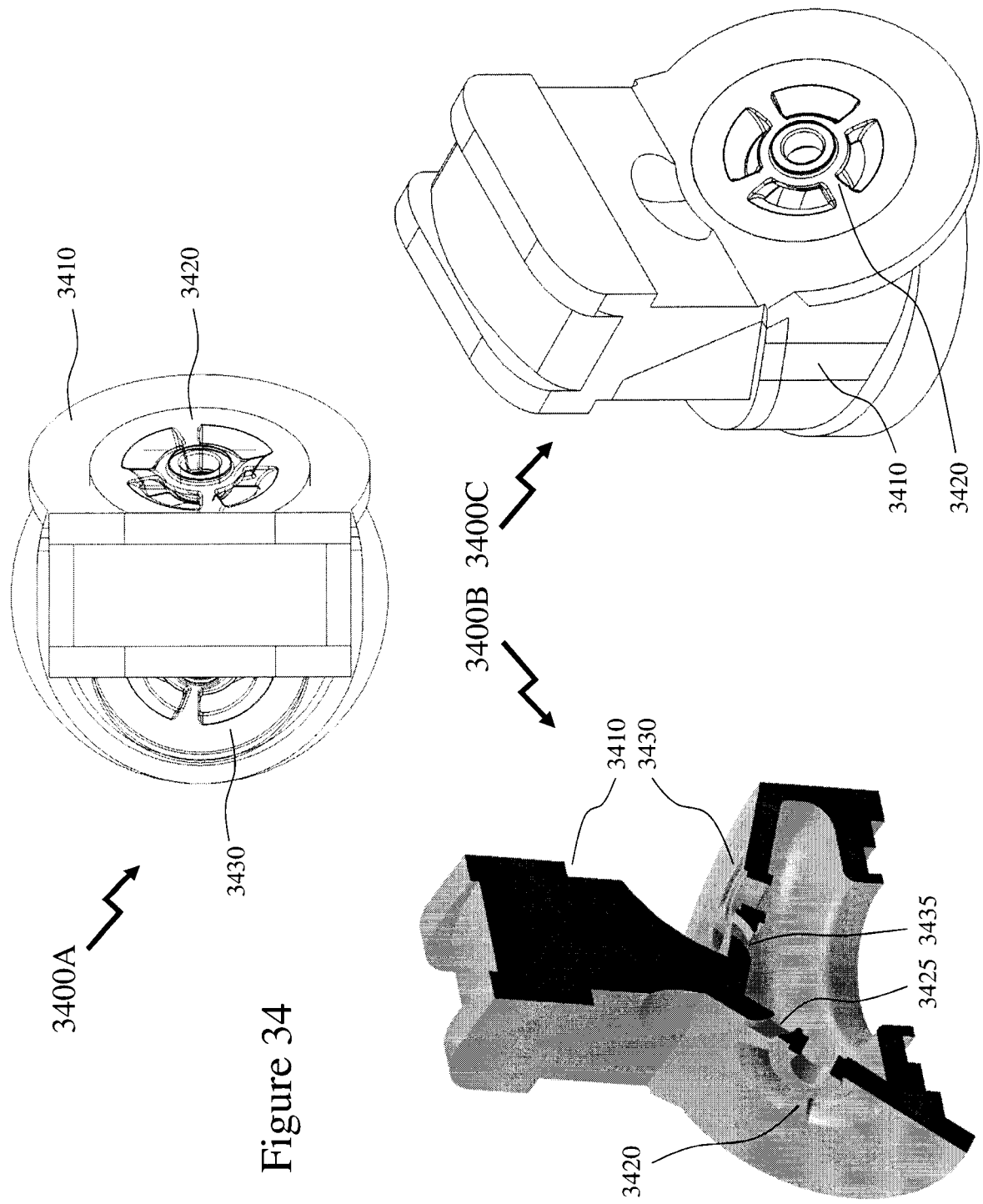
FIG. 34 depicts an inlet/outlet valve assembly for an EL-PUMP according to an embodiment of the invention providing low noise operation through fluidic flow management.

Now referring in FIG. 34 there is depicted an inlet/outlet (I/O) non-return valve (NRV) assembly for an EL-PUMP according to an embodiment of the invention providing low noise operation through fluidic flow management. First image 3400A depicts a plan view of the I/O NRV assembly comprising body 3410, first port 3420 (an input or output according to fluidic circuit attached to the I/O valve assembly and second port 3430 (another input or output or the other of output or input). The valve covers for the first port 3420 and second port 3430 are omitted for clarity. If the valve cover is on the outside of the I/O NRV assembly, then the port is an outlet as the NRV will open as fluid flows from inside to outside whereas if the valve cover is on the inside then the port is an inlet as the NRV will open as fluid flows from outside to inside. Third image 3400C depicts the I/O NRV assembly in perspective view with body 3410 and first port 3420.

However, second image 3400B depicts a variant design of the I/O NRV assembly wherein the ports of the first port 3420 and second port 3430 are profiled in order to reduce device noise arising from fluidic flow effects within the EL-PUMP. By appropriate design the ports also reduce pressure drop across them. The first and second ports 3420 and 3430 as depicted comprise four annular sections with four "spokes" supporting the central portion within which the valve stem of the valve cover is inserted. The number of sections may vary but the profile is established to direct fluid flow.

Figures 35, 36:
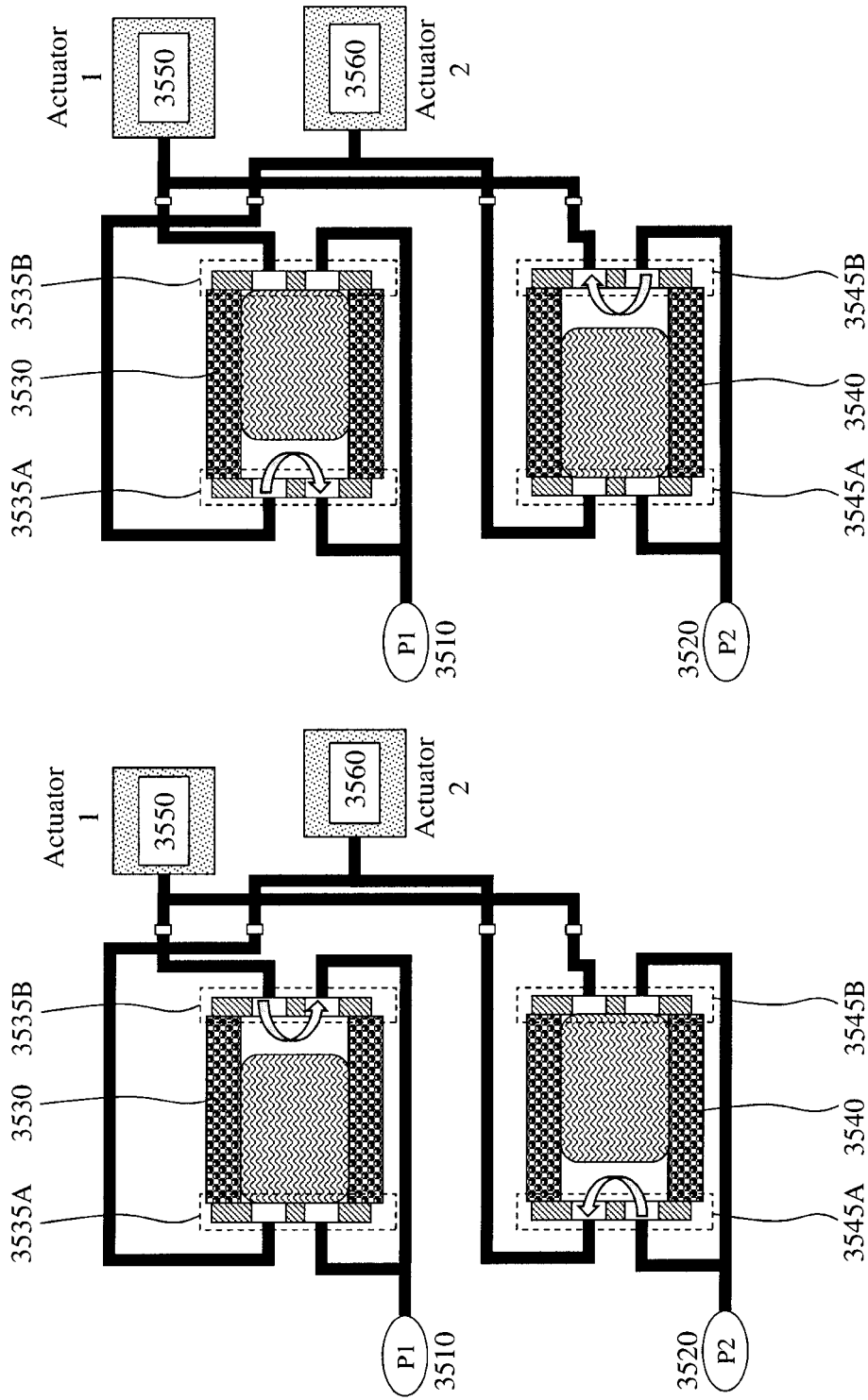
FIGS. 35 and 36 depict a configuration of dual fluidic switches in combination with dual fluidic actuators according to an embodiment of the invention with both switches couple to both actuators and positive/negative flow reservoirs.

Referring to FIGS. 35 and 36 there is depicted a configuration of dual fluidic switches in combination with dual fluidic actuators according to an embodiment of the invention with both switches couple to both actuators and positive/negative flow reservoirs. Accordingly, a first port 3510 at a pressure P1 and a second port 3520 at a pressure P2 are depicted, where P2>P1. First port 3510 is coupled to first and second I/O NRV assemblies 3535A and 3535B at either end of a first electromagnetically driven fluidic switch (EL-SW) whilst the second port 3520 is coupled to third and fourth I/O NRV assemblies 3545A and 3545B at either end of a second EL-SW 3540. From first EL-SW 3530 the other port of each of the first and second I/O NRV assemblies 3535A and 3535B are coupled to Actuator 2 3560 and Actuator 1 3550 respectively. Similarly, from second EL-SW 3540 the other port of each of the third and fourth I/O NRV assemblies 3545A and 3445B are coupled to Actuator 1 3550 and Actuator 2 3560 respectively.

Within the following description in respect of FIGS. 35 to 42 an I/O NRV is referred to as "closed" when the piston within the EL-SW is towards that end of the EL-SW so that the piston blocks the openings that allow fluid to flow from the input port of the I/O NRV to the output port of the I/O NRV. Similarly, the I/O NRV is referred to as "open" when the piston within the EL-SW is towards the other end of the EL-SW so that the piston is not blocking the openings that allow fluid to flow from the input port of the I/O NRV to the output port of the I/O NRV. Further, reference to an actuator being "actuated" implies that the fluidic system is providing or has provided fluid to the actuator to actuate it. Reference to an actuator being "not actuated" implies that the fluidic system is not providing fluid to it but has withdrawn or is withdrawing fluid. FIGS. 35 to 42 depict snapshots of an operating sequence such that the "flow" arrows within the following description in respect of FIGS. 35 to 42 depict that at the specific snapshot for a system sequentially "pressurizing" each actuator wherein first port 3710 (P1) and second port 3720 (P2) are coupled to the fluidic system such that P2 "pumps" fluid into the fluidic system shown whilst P1 "pumps" fluid out of the fluidic system.

In FIG. 35 the first EL-SW 3530 is depicted in the position that first I/O NRV 3535A is closed and second I/O NRV 3535B is open such that Actuator 1 3550 is coupled to first port 3510. Similarly, second EL-SW 3540 is depicted in the position that third I/O NRV 3454A is open and fourth I/O NRV 3545B closed such that Actuator 2 3560 is coupled to second port 3520. For example, within an embodiment of the invention P1=0 psi and P2=7 psi such that P2−P1=7 psi whilst within another embodiment of the invention P1=−10 psi and P2=−3 psi such that P2−P1=7 psi still. If P2=7 psi and P1=0 psi then the configuration depicted in FIG. 35 results in Actuator 2 3560 being actuated (i.e. its pressure being now P2) but not Actuator 1 3550 (its pressure being P1). Now referring to FIG. 36, the first EL-SW 3530 is depicted in the position that first I/O NRV 3535A is open and second I/O NRV 3535B is closed such that Actuator 2 3560 is coupled to first port 3510. Similarly, second EL-SW 3540 is depicted in the position that third I/O NRV 3545A is closed and fourth I/O NRV 3545B open such that Actuator 1 3550 is coupled to second port 3520. Accordingly, in the configuration depicted in FIG. 36 Actuator 1 3550 is actuated (i.e. its pressure being now P2) but not Actuator 2 3560 (its pressure being P1).

Figures 37, 38:
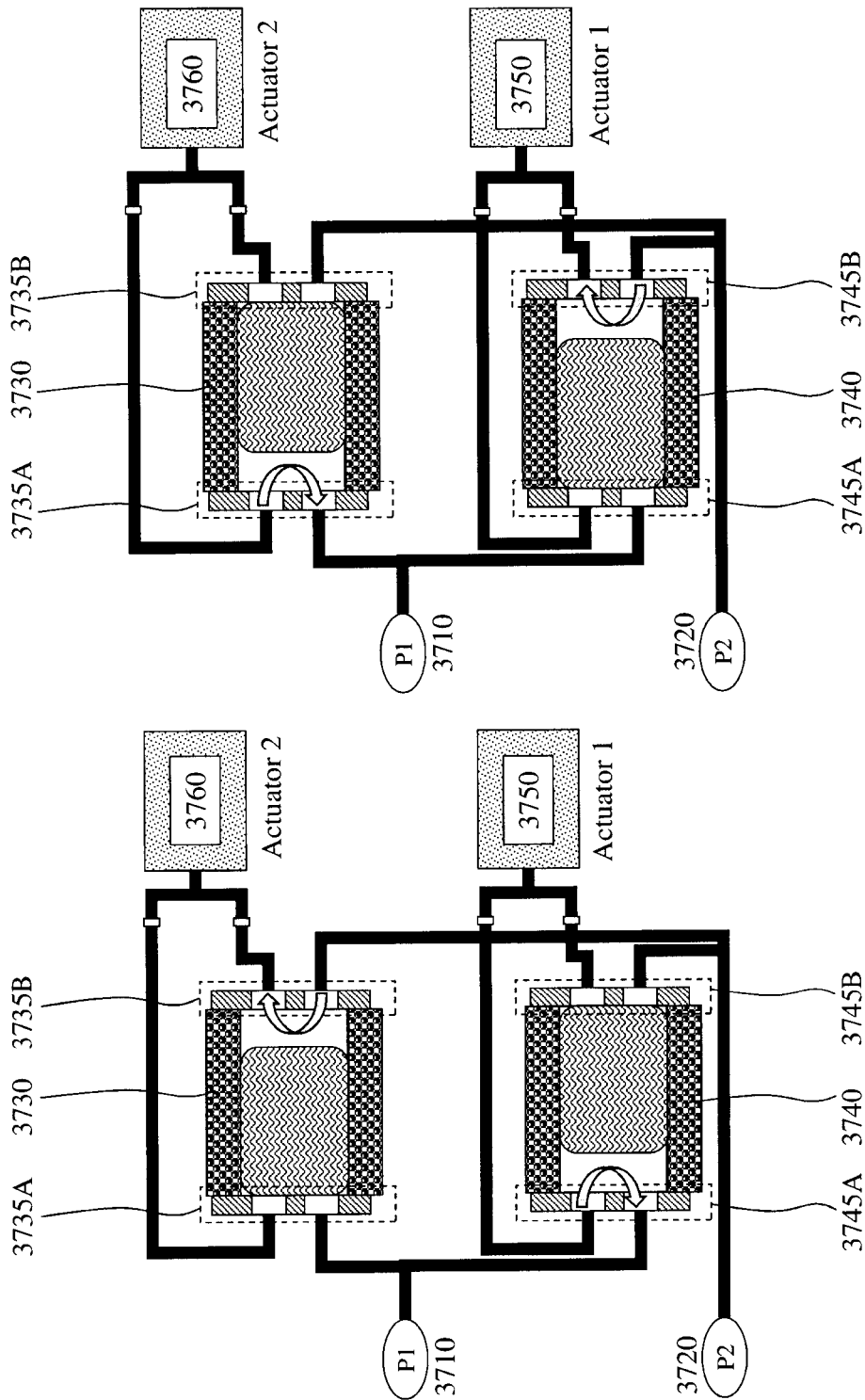
FIGS. 37 and 38 depict a configuration of dual fluidic switches in combination with dual fluidic actuators according to an embodiment of the invention with each switch coupled to a single actuator and positive/negative flow reservoirs.

Referring to FIGS. 37 and 38 there is depicted a configuration of dual fluidic switches in combination with dual fluidic actuators according to an embodiment of the invention with both switches couple to both actuators and positive/negative flow reservoirs. Accordingly, a first port 3710 at a pressure P1 and a second port 3720 at a pressure P2 are depicted, where P2>P1. First port 3710 is coupled to first I/O NRV assembly 3735A of first EL-SW 3730 and third I/O NRV assembly 3745A of second EL-SW 3740. Second port 3720 is coupled to second I/O NRV assembly 3735B of the first EL-SW 3530 and the fourth I/O NRV 3745B of the second EL-SW 3740. From first EL-SW 3730 the other port of each of the first and second I/O NRV assemblies 3735A and 3735B are coupled to Actuator 2 3760. Similarly, from second EL-SW 3740 the other port of each of the third and fourth I/O NRV assemblies 3745A and 3745B are coupled to Actuator 1 3750.

In FIG. 37 the first EL-SW 3730 is depicted in the position that first I/O NRV 3735A is closed and second I/O NRV 3735B is open such that Actuator 2 3750 is coupled to second port 3720. Similarly, second EL-SW 3540 is depicted in the position that third I/O NRV 3454A is open and fourth I/O NRV 3745B closed such that Actuator 1 3750 is coupled to first port 3710. Accordingly, in the configuration depicted in FIG. 37 Actuator 2 3760 is actuated (i.e. its pressure being now P2) but not Actuator 1 3750 (its pressure being P1). Then, referring to FIG. 38, the first EL-SW 3730 is depicted in the position that first I/O NRV 3735A is open and second I/O NRV 3735B is closed such that Actuator 2 3760 is coupled to first port 3710. Similarly, second EL-SW 3740 is depicted in the position that third I/O NRV 3754A is closed and fourth I/O NRV 3745B open such that Actuator 1 3750 is coupled to second port 3720. Accordingly, in the configuration depicted in FIG. 38 Actuator 1 3750 is actuated (i.e. its pressure being now P2) but not Actuator 2 3760 (its pressure being P1).

Figures 39, 40:
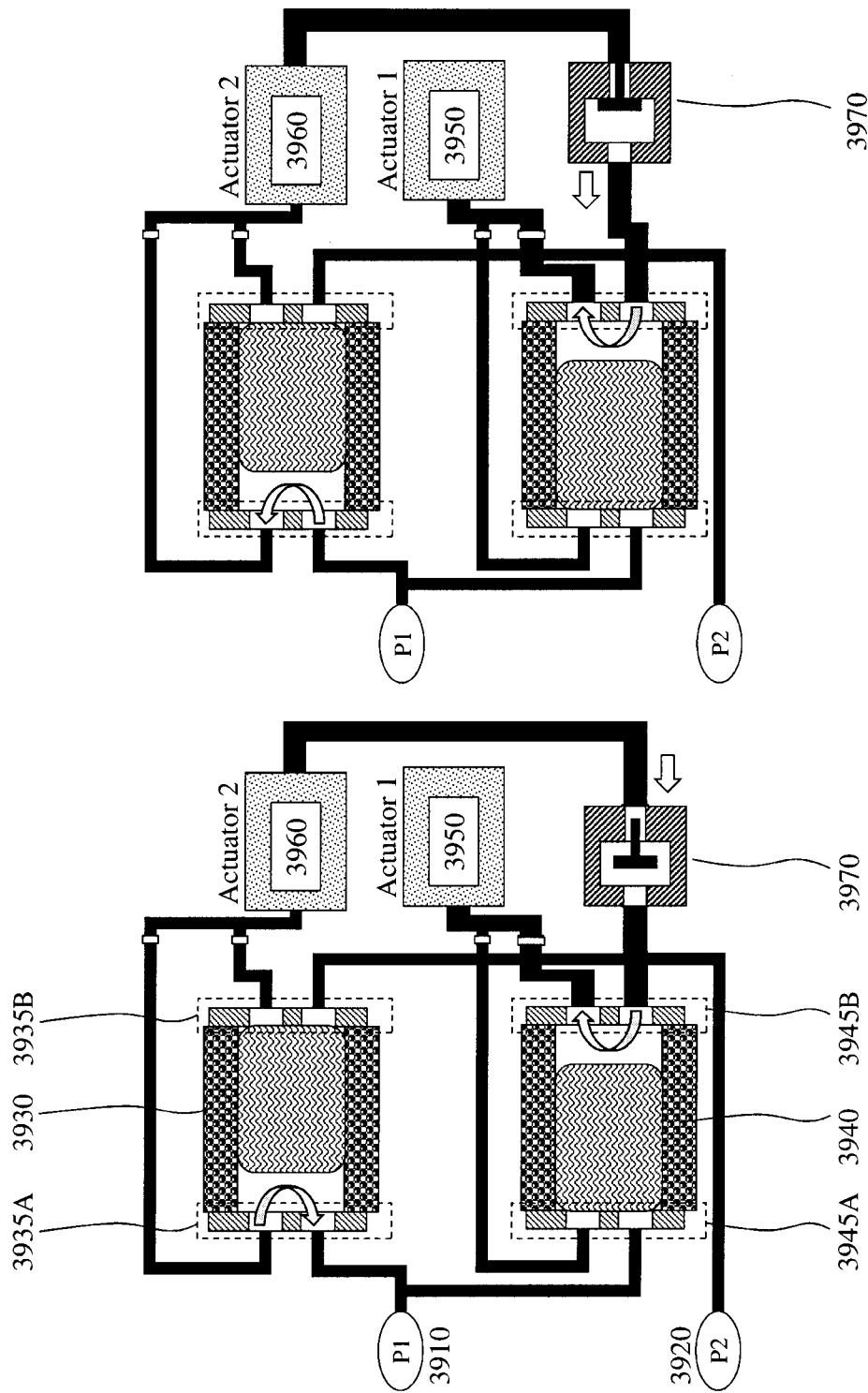
FIGS. 39 and 40 depict a configuration of dual fluidic switches in combination with dual fluidic actuators according to an embodiment of the invention with each switch coupled to a single actuator and positive/negative flow reservoirs and a pressure actuated valve coupling one actuator to the other switch.

Referring to FIGS. 39 and 40 there is depicted a configuration of dual fluidic switches in combination with dual fluidic actuators according to an embodiment of the invention with both switches couple to both actuators and positive/negative flow reservoirs. Accordingly, a first port 3910 at a pressure P1 and a second port 3920 at a pressure P2 are depicted, where P2>P1. First port 3910 is coupled to first I/O NRV assembly 3935A of first EL-SW 3930 and third I/O NRV assembly 3945A of second EL-SW 3940. Second port 3920 is coupled to second I/O NRV assembly 3935B of the first EL-SW 3930 and the fourth I/O NRV 3945B of the second EL-SW 3940. From first EL-SW 3930 the other port of each of the first and second I/O NRV assemblies 3935A and 3935B are coupled to Actuator 2 3960. Similarly, from second EL-SW 3940 the other port of each of the third and fourth I/O NRV assemblies 3945A and 3945B are coupled to Actuator 1 3950. Additionally, Actuator 2 3960 is coupled to a non-return relief valve (NRRV) 3970 which then couples to the fourth I/O NRV 3945B.

In FIG. 39 the fluidic system is depicted at a snapshot where the first EL-SW 3930 is depicted with first I/O NRV 3935A is open and second I/O NRV 3935B is closed such that Actuator 2 3960 is coupled to first port 3910. Similarly, second EL-SW 3940 is depicted in the position that third I/O NRV 3454A is closed and fourth I/O NRV 3945B open such that Actuator 1 3950 is coupled to second port 3920. In the snapshot depicted in FIG. 39 Actuator 2 3960 was previously coupled to P2 3920 such that it "is" at pressure P2 whilst Actuator 1 3950 was previously coupled to P1 3910 such that it "is" at pressure P1. Accordingly, at the point second EL-SW 3940 switches to couple Actuator 1 3950 to P1 3920 then the fluidic circuit between the second EL-SW 3940 to Actuator 1 3950 is at P1, i.e. a low pressure initially and the pressure at the input of the fourth I/O NRV 3945B as flow begins causes the pressure at that point to be below P2.

As a result of the pressure differential now across NRRV 3970 it opens such that fluid from Actuator 2 3960 flows for a short period of time through the NRRV 3970 to the fourth I/O NRV 3945B. Subsequently, at a snapshot later in time as depicted in FIG. 40 the pressure drop across the NRRV 3970 reduces and reverses as the pressure of the fluid within Actuator 2 3960 drops. Accordingly, the NRRV 3970 closes and now Actuator 1 3950 is filled solely from the fluid flowing from second port 3920 through fourth I/O NRV 3945B. As a result of the fluidic circuit depicted in FIGS. 39 and 40 then as a configuration change from actuating a first actuator to a second actuator occurs then an initial rapid fluid flow arises from the first actuator to the second actuator directly without requiring the fluid to flow through the full fluidic circuit via the pump or pumps etc. It would be evident that the NRRV 3970 also prevents fluid flowing from the second port 3920 to the Actuator 2 3960 when this is at lower pressure than P2, the pressure at second port 3920.

Figures 41, 42:
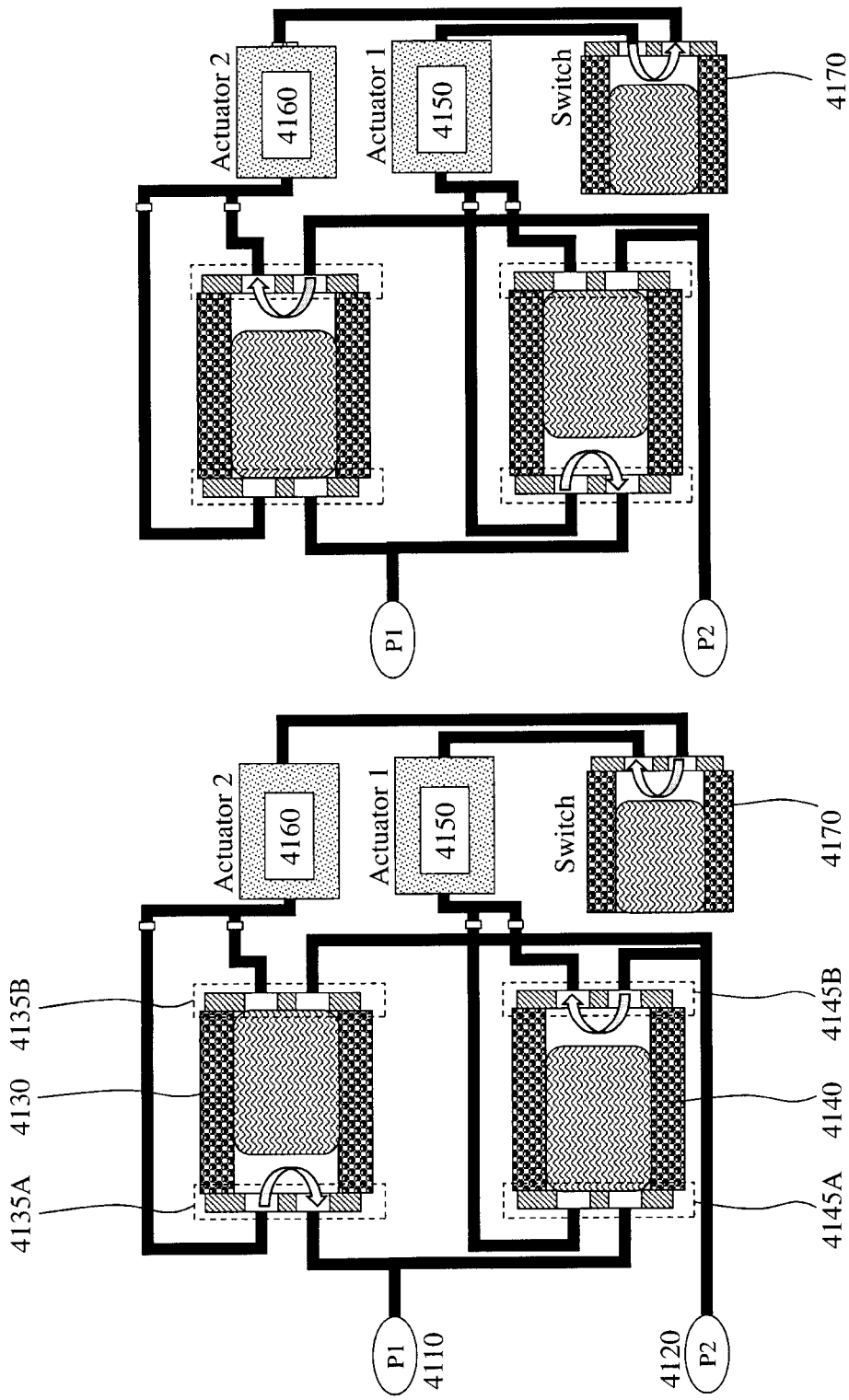
FIGS. 41 and 42 depict a configuration of dual fluidic switches in combination with dual fluidic actuators according to an embodiment of the invention with each switch coupled to a single actuator and positive/negative flow reservoirs with an additional switch coupling between the actuators.

Referring to FIGS. 41 and 42 there is depicted a configuration of dual fluidic switches in combination with dual fluidic actuators according to an embodiment of the invention with both switches couple to both actuators and positive/negative flow reservoirs. Accordingly, a first port 4110 at a pressure P1 and a second port 4120 at a pressure P2 are depicted, where P2>P1. First port 4110 is coupled to first I/O NRV assembly 4135A of first EL-SW 4130 and third I/O NRV assembly 4145A of second EL-SW 4140. Second port 4120 is coupled to second I/O NRV assembly 4135B of the first EL-SW 4130 and the fourth I/O NRV 4145B of the second EL-SW 4140. From first EL-SW 4130 the other port of each of the first and second I/O NRV assemblies 4135A and 4135B are coupled to Actuator 2 4160. Similarly, from second EL-SW 4140 the other port of each of the third and fourth I/O NRV assemblies 4145A and 4145B are coupled to Actuator 1 4150. Additionally, Actuator 2 4160 is coupled to third EL-SW 4170 which then couples to the fourth I/O NRV 4145B.

In FIG. 41 the fluidic system is depicted at a snapshot where the first EL-SW 4130 is depicted with first I/O NRV 4135A is open and second I/O NRV 4135B is closed such that Actuator 2 4160 is coupled to first port 4110. Similarly, second EL-SW 4140 is depicted in the position that third I/O NRV 3454A is closed and fourth I/O NRV 4145B open such that Actuator 1 4150 is coupled to second port 4120. In the snapshot depicted in FIG. 41 Actuator 2 4160 was previously coupled to P2 4120 such that it "is" at pressure P2 whilst Actuator 1 4150 was previously coupled to P1 4110 such that it "is" at pressure P1. Accordingly, at the point second EL-SW 4140 switches to couple Actuator 1 4150 to P1 4120 then the fluidic circuit between the second EL-SW 4140 to Actuator 1 4150 is at P1, i.e. a low pressure initially and the pressure at the input of the fourth I/O NRV 4145B as flow begins causes the pressure at that point to be below P2.

If at this point third EL-SW 4170 is opened then fluid from Actuator 2 4160 flows through the third EL-SW 4170 to the fourth I/O NRV 4145B. Subsequently, at a snapshot later in time the pressure drop across the third EL-SW 4170 reduces and would reverse as the pressure of the fluid within Actuator 2 4160 drops and that within Actuator 1 4150 rises. Accordingly, the third EL-SW 4170 closes and now Actuator 1 4150 is filled solely from the fluid flowing from second port 4120 through fourth I/O NRV 4145B. In contrast to the fluidic circuit depicted in FIGS. 39 and 40 when at a later point in time Actuator 1 4150 "is" at pressure P2 whilst Actuator 2 4160 "is" at pressure P1 then as the first and second EL-SWs 4130 and 4140 are switched to route fluid to "empty" Actuator 1 4150 and "fill" Actuator 2 4160 then activating third El-SW 4170 results in fluid flowing through third El-SW 4170 from Actuator 1 4150 to Actuator 2 4160. Again, under action of the controller within the FLUDEV the third EL-SW 4170 is subsequently closed as the fluid pressure within Actuator 1 4150 reduces to less than that within Actuator 2 4160 such that the fluid flow does not reverse against the desired flow for the current operation of the FLUDEV within which the fluidic circuit depicted in FIGS. 41 and 42 respectively.

Figure 43:
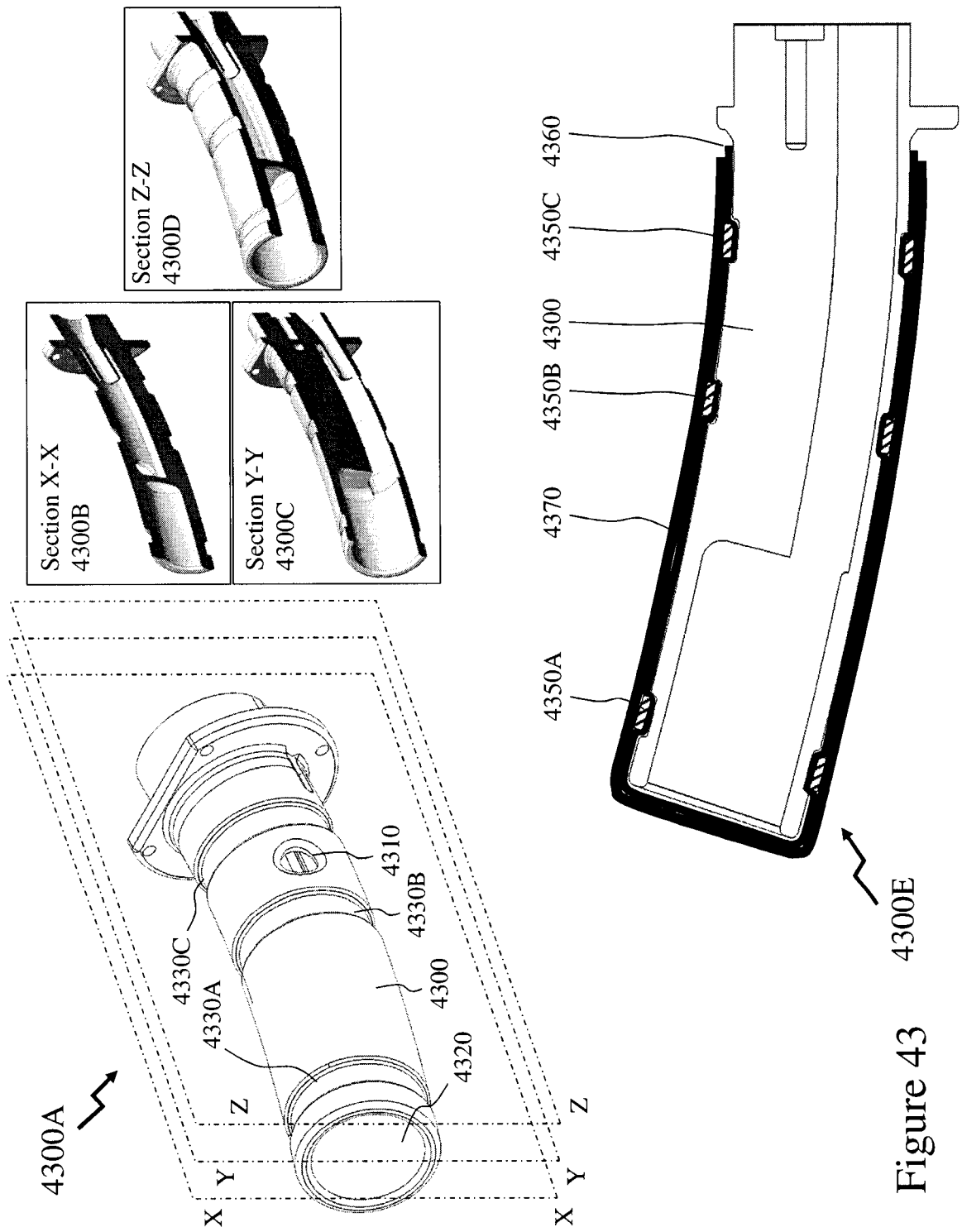
FIG. 43 depicts an inner mechanical element of an extended actuator arm together with single elasticated shell with non-elastic rings to define different actuators sections and outer casing according to an embodiment of the invention.

Now referring to FIG. 43 there is depicted an inner mechanical element of an extended actuator arm together with single elasticated shell with non-elastic rings to define different actuators sections and outer casing according to an embodiment of the invention. Such an extended actuator arm being similar to that depicted and described in respect of FIGS. 33A and 33B respectively. First image 4300A depicts the extended actuator arm 4300 which is depicted in second to fourth images 4300B to 4300D along section lines X-X, Y-Y, and Z-Z respectively as depicted in first image 4300A. Accordingly, the extended actuator arm 4300 comprises a plurality of fluidic channels which each connect from the main body of the FLUDEV with the pump, valves, reservoir etc. to an opening either along the external length of the extended actuator arm, e.g. first opening 4310, or its end, second opening 4320. Disposed along the length of the extended actuator arm 4300 are three grooves 4330A to 4330C. When assembled and deployed the extended actuator arm 4300 has a casing 4360 and shell 4370 disposed over it together with first to third rings 4350A to 4350C. Each of the first to third rings 4350A to 4350C is aligned with and within one of the three grooves 4330A to 4330C respectively. Accordingly, each of the first to third rings 4350A to 4350C respectively is formed from a material which has a higher Young's modulus than that of either the shell 4360 and casing 4370 such that when fluid is pumped into a fluidic channel and hence to the opening within the extended actuator arm 4300 the increased pressure results in the fluid causes the shell 4360 and casing 4370 to expand along that section of the extended actuator arm 4300 associated with that fluidic channel as bounded by which of the first to third rings 4350A to 4350C are disposed along the extended actuator arm 4300 away from the opening the fluid. The shell 4360 preventing fluid egress whilst the casing 4370 provides the surface against the user's skin, for example. Optionally, no casing 4370 is provided such that the external surface is the shell 4360 and first to third rings 4350A to 4350C respectively.

Within the embodiments of the invention described and depicted supra in respect of FIGS. 1 to 44 the pump has been primarily described as being an electromagnetic pump (EL-PUMP). However, other pumps may be employed within embodiments of the invention including, but not limited to:

Rotary-type positive displacement pumps such as internal gear, screw, shuttle block, flexible vane or sliding vane, circumferential piston, flexible impeller, helical twisted roots, and lobe pumps;

Reciprocating-type positive displacement pumps such as piston pumps, plunger pumps or diaphragm pumps;

Linear-type positive displacement pumps such as progressive cavity pumps; and

Non-positive displacement pumps.

Within the embodiments of the invention described and depicted supra in respect of FIGS. 1 to 43 the fluidic actuators coupled to the FLUBINTs have not been described and depicted. However, in embodiments of the invention these are a sealed portion of vinyl tubing for example wherein the elastomeric balloon is formed from a process comprising:

Sealing first end of elastomeric tube;

Seal second end of elastomeric tube;

Add nipple to elastomeric tube at appropriate position;

Pierce vinyl tubing through nipple.

Referring back to FIG. 12 then the elastomeric tube corresponds to flexible wall 1260 in third image 1200C and the nipple corresponds to nipple 1240 in first to third images 1200A to 1200C respectively which attaches to the opening within the scaffold and/or shell. Accordingly, as noted above the FLUDEV casing, pump, switch/valve assemblies, manifolds, scaffold, shell etc. can all be assembled as these are all defined through mechanically interconnected elements and then the fluidic actuators (balloons) are added to the mechanical assembly before the product is coated with an elastomer outer layer for the casing.

Optionally, the vinyl or other material employed to form the flexible "balloons" of the fluidic actuators may be coated with a barrier material (e.g. moisture barrier) to reduce the rate of fluid leakage from the balloons during the lifetime of the FLUDEV such that there is no requirement for the user to refill the fluid. This may be appropriate as the total surface area of the "balloons" and other portions of the fluidic circuit may have overall a large surface area such that even modest barrier penetration rates over a 10-year lifetime, for example, are significant. However, care must be taken with the barrier materials/elastomer etc. in order to allow hydrogen gas generated within the recharging process of the FLUDEV batteries to escape from the device.

Alternatively, as depicted in FIG. 44 there are depicted first and second configurations for attaching a "balloon" of a fluidic actuator directly to a FLUDEV without the user of sealed elastomeric tubes and nipples. Referring to first configuration 4400A there is depicted a partial cross-section through a FLUDEV according to an embodiment of the invention wherein a scaffold 4460 has a shell (or casing) 4450 disposed around within which are a series of recesses 4440 having a profile that defines an opening in the shell 4450 which is smaller than the remainder of the recess. Fitted within each recess 4440 are tube ribs 4430 which are formed along the surface of the elastomeric sheet 4410. Accordingly, the tube ribs 4430 are dimensioned so that they are wider distal the elastomeric sheet 4410 than at the point they join the elastomeric sheet 4410. Accordingly, compression of the tube ribs 4430 and insertion into the recesses 4440 results in the equivalent of a "mortice-and-tenon" type joint such that a predetermined force is required to remove the tube ribs 4430 from their recesses 4440 which is established in dependence upon the material properties of the tube ribs 4430, casing 4450, and the geometry of the tube ribs 4430/recesses 4440. Accordingly, the region between the elastomeric sheet 4410 and casing 4450 defines a "balloon" fluidic actuator which is coupled to the fluidic circuit, EL-PUMP, EL-VALVE(s) etc. through an opening within the scaffold 4460 and casing 4450 which is not depicted for clarity but has been described above in respect of embodiments of the invention. Optionally, an adhesive or glue may be used to fill the recesses 4440 and increase the retention of the tube ribs 4430 within the recesses 4440 and hence the casing 4450.

Alternatively, as depicted in second configuration 4400B in FIG. 44 there is depicted a partial cross-section through a FLUDEV according to an embodiment of the invention wherein a scaffold 4460 has a shell (or casing) 4450 disposed around within which are a series of recesses 4440 having a profile that defines an opening in the shell 4450 which is smaller than the remainder of the recess. Fitted within each recess 4440 are tube ribs 4430 which are formed along the surface of the elastomeric sheet 4410. Accordingly, the tube ribs 4430 are dimensioned so that they are wider distal the elastomeric sheet 4410 than at the point they join the elastomeric sheet 4410. Accordingly, compression of the tube ribs 4430 and insertion into the recesses 4440 results in the equivalent of a "mortice-and-tenon" type joint such that a predetermined force is required to remove the tube ribs 4430 from their recesses 4440 which is established in dependence upon the material properties of the tube ribs 4430, casing 4450, and the geometry of the tube ribs 4430/recesses 4440. Accordingly, the region between the elastomeric sheet 4410 and casing 4450 defines a "balloon" fluidic actuator which is coupled to the fluidic circuit, EL-PUMP, EL-VALVE(s) etc. through an opening within the scaffold 4460 and casing 4450 which is not depicted for clarity but has been described above in respect of embodiments of the invention. However, in contrast to the first configuration 4400A the scaffold 4460 has a groove 4480 that connects with openings 4470 within the casing 4450 such that if an adhesive or glue is fed into the groove 4480 it flows and fills the openings 4470 and regions between the recesses 4440 and tube ribs 4430. This "flow" may be by what is commonly known as capillary action or wicking. The openings 4470 may be discrete or they may be along the length of the recesses 4440. For example, each tube rib 4430 is an annular ring on a "sock" form elastomeric sheet 4410 such that the "balloons" are annular rings that react to the fluidic volume/pressure within them.

However, in order to address any leakage of the various elements within the FLUDEV the negative side of the fluidic circuit is coupled to the regions where the leakage occurs. Accordingly, within the FLUDEV described and depicted in respect of FIGS. 1 to 18 this is the region between the shell/scaffold of the FLUDEV and the casing of the FLUDEV as evident in FIG. 3 wherein the "outlets" of the negative side of the "6-Shooter" 1400 couple to the region between the scaffold/shell and casing which is coupled to the negative side of the EL-PUMP. Accordingly, whilst not depicted within FIGS. 1 to 18 the actuated member and/or other portions of the scaffolding/shell may comprise surface grooves and/or texturing allowing fluid accumulating within the casing to be pumped back to the negative side of the fluidic circuit.

Such barriers, casing, shell, scaffold, etc. must also be designed from the viewpoint that a typical assembly process will be low temperature/dry whereas the application environment is typically warm/wet. This becomes even more important when considering the EL-PUMP and EL-VALVE portions of the FLUDEV.

An additional consideration within a FLADEEV such as that described and depicted in respect of FIGS. 1 to 44 is electromagnetic and/or magnetic crosstalk or cross-coupling between the different multiple electromagnetically driven elements and their permanent magnet pistons and washers. Accordingly, in some embodiments of the invention such as the 6-Shooter described and depicted in respect of FIGS. 12 to 14C the close proximity required for small footprint EL-VALVE necessitates the introduction of magnetic field blocking. Considering insert 1400C in FIG. 14C then an EL-VALVE 14000 is depicted within the switch body 1440. As evident within this image and in fact the main images in FIGS. 14B and 14C a clear annular region exists around the periphery of each EL-VALVE 14000 within the switch body 1440.

Accordingly, a magnetic shield may be disposed within this region around each EL-VALVE 14000 or a subset of EL-VALVEs 14000 in order to limit electromagnetic and/or magnetic crosstalk between the EL-VALVEs 14000. Such a magnetic shield may be a section of iron tube/pipe for example, insulated conductive tape wound around the EL-VALVE 14000, or an injection molded magnetically and/or electrically conductive element. Alternatively, this may be formed from a magnetic shielding material such as a diamagnetic material, for example. This shield or sleeve covers the outside of the washers so has good magnetic connection to washers and to keep magnetic flux contained. It would be evident to one of skill in the art that the more tuned and efficient the switches (valves) become the smaller the surplus latching force and the smaller the excess magnetic force from the coils to flip switch position. Accordingly, the importance of the sleeve/shield increases to isolate the switches from each other.

Within embodiments of the invention described supra in respect of FIGS. 1 to 44 and of EL-VALVEs and EL-PUMPs the piston may be magnetic but it may also be a ferromagnetic material such as iron. In these instances, the latching of a valve may be achieved through the use of magnets instead of washers at each end, or alternatively a magnet could just be touching a washer, close to a washer, or even protrude into or beyond the outer washer face.

Within embodiments of the invention described supra in respect of FIGS. 1 to 44 EL-VALVEs have been described as connected to a "manifold." However, it would be evident that within other embodiments of the invention each EL-VALVE may be connected via tubes that run to a common point or are each individually connected to the positive (e.g. +7 psi) and negative (0 psi) reservoirs.

Within embodiments of the invention described supra in respect of FIGS. 1 to 44 the scaffold has been described as providing a mechanical structure housing the fluidic motor. However, in other embodiments of the invention the scaffold (scaffolding) may not house the fluidic motor but rather could the fluidic motor to the rest of the FLUDEVs frame in a rigid, semi-rigid or flexible manner. Optionally, the fluidic motor may float within the elastomer skin and flex independently to the rest of the FLUDEV's body.

Within embodiments of the invention described supra in respect of FIGS. 1 to 44 the FLUDEVs have been described and depicted as having a skin encasing the scaffold/shell/actuators in the different combinations that these are present.

However, within other embodiments the FLUDEV may have some regions covered with the skin and others uncovered or alternatively the entire FLUDEV may not have an outer skin. In these instances, the external surface(s) of actuator(s) itself(themselves) may form the external surface of the FLUDEV.

Within embodiments of the invention described supra in respect of FIGS. 1 to 44 an EL-PUMP is described as pumping fluid from a reservoir to one or more fluidic actuators. However, within other embodiments of the invention the reservoir could be on the upstream side so that the EL-PUMP is pumping into the reservoir.

Optionally, the EL-VALVEs described and depicted within embodiments of the invention described supra in respect of FIGS. 1 to 44 may connect fluidic actuators with the positive reservoir or directly to inlet of the pump.

Optionally, embodiments of the invention employing a pressure relief valve allow for the EL-PUMP to over driven and have it "ramped" up prior to the opening of an EL-VALVE such that the positive side of the fluidic circuit is at maximum pressure in order to maximize fluid inrush to the actuator through the EL-VALVE and fluidic circuit without requiring a closed loop pump control system and its associated pressure and/or flow monitors. Within embodiments of the invention described supra in respect of FIGS. 1 to 44 the FLUDEVs have been described as having a reservoir or reservoirs. However, within other embodiments of the invention a small reservoir may be provided on the pump outlet by the expansion of the positive side fluidic capacitor diaphragm changing the volume of the fluidic capacitor changes from an interim positive pressure to the positive pressure with the pump activated when the EL-VALVEs open whilst the pump is running slowly. There is a period of time, approximately 1 second in the inventor's FLUDEVs established to date, to detect pressure loss and ramp the pump up as the flow demand on the pump suddenly changes when the valves open rapidly. The same occurs when the EL-VALVEs are closed in that the pump may be running at 100% power but suddenly the flow demand is reduced when an actuator is full, it becomes static at the rated positive pressure, or a valve is closed when the fluidic actuator is partially full.

Optionally, within other embodiments of the invention the fluid from a "full" actuator can be "pulled" from when filling another actuator. This would be, typically, in addition to exploiting the positive side (or negative side) fluidic capacitor diaphragm within these fluidic circuits (when implemented) with or without a distinct single purpose reservoir. A reservoir may be disposed on the pressurized (positive) side of the fluidic circuit and/or the zero pressure or negative pressure (negative) side of the fluidic circuit. Within embodiments of the invention the reservoir may provide low resistance to the removal or addition of fluid to it, alternatively it can have elastic properties which provides a high resistance to increases in its volumes to resist changes in its volume but offers low resistance to volume reductions, or it may be inelastic and offer high resistance to both increases and decreases in volume.

Optionally, with an appropriate proportional—integral—derivative controller and fast pressure sensors to quickly detect pressure changes and quickly change power up or down of the pump it may be possible for the positive reservoir to maintain a pressure equal to that of the set-point pressure. of the set PSI, typically 4 to 7 PSI for most users, within a small range +/−0.5 PSI. Optionally, within embodiments of the invention the positive side fluidic capacitor (positive side reservoir) and negative side fluidic capacitor (negative pressure reservoir) may have different volumes and be separate to the overall reservoir for the FLUDEV which must accommodate the difference between the minimum fluid within the fluidic circuit of the FLUDEV (other than the reservoir) and the maximum fluid within the fluidic circuit of the FLUDEV (other than the reservoir).

Within embodiments of the invention described supra in respect of FIGS. 1 to 44 the actuator material may be formed by blow molding, dip molding, formed, or employ welded sheets. Alternatively, exploiting multiple shot or increased complexity injection molding tooling, three-dimensional (3D) printing, an additive manufacturing (AM) process, the "lost wax" process, or similar molding technique can be employed to provide actuators with either constant or variable wall thickness, geometry, and elastic properties.

Potentially over extended operation at high pressure or pulsed to full pressure repeatedly and higher temperatures (e.g. 40° C.) vinyl tubing or actuators of vinyl sheeting welded together may slowly stretching over time with potential for permanent stretching to occur. Optionally, the fluidic actuators may employ "weldable fabric" which comprises a thin layer of polyurethane or vinyl etc. laminated or sprayed onto thin fabric. Beneficially, the thin fabric is flexible, so it collapses efficiently and/or quickly, and the plastic film makes it water tight. Optionally, thinner actuators may be employed therefore with 0.005" (0.127 mm) weldable fabric can be used instead of thicker 0.008" (0.2 mm) to 0.012" (0.3 MM) or thicker vinyl sheet.

Within embodiments of the invention described supra in respect of FIGS. 1 to 44 the concept of a moisture barrier was introduced to reduce leakage from the fluidic system within the FLUDEV. One solution is for the casing to be a moisture barrier so the FLUDEV does not dry out over time or require a re-fill cap etc. Alternatively, one could make each part a moisture barrier, so the casing does not have to be. Within embodiments of the invention described supra in respect of FIGS. 1 to 44 although not described or depicted a permeable membrane may be provided between the outside of FLUDEV and the battery cavity allowing it to breathe through the casing as necessary for rechargeable batteries with the hydrogen they release. Optionally, the external casing can be applied "all-in-one" over a hard scaffold with actuator shells wherein the casing may allow for leaked fluid return to the fluidic circuit. The actuator shells being for example those with zigzag elements, those without zigzag elements, those defined by rigid bands (e.g. compression bands as depicted in FIG. 43), etc.

Within embodiments of the invention described supra in respect of FIGS. 1 to 44 the insertable portion of the FLUDEV has been described and depicted as being formed from multiple sections that are assembled forming the plurality of fluidic channels wherein the plurality of sections are manufactured separately to one another. Alternatively, with multiple shot or more complex injection molding tooling, three-dimensional (3D) printing, an additive manufacturing (AM) process, the "lost wax" process, or similar molding technique a scaffold may be created in a single part with the internal channels in it. Optionally, an alternative design may employ a hollow outer tube within multiple elastomer or plastic tubes connecting the actuator nipple to the valve.

Within embodiments of the invention described supra in respect of FIGS. 1 to 44 the FLUDEVs have been described and depicted with a scaffold. However, within other FLUDEVs there may be no scaffold and the device comprises, for example, a elastomer skin over fluidic actuators which has a bit of shape to them and some thickness to their inward facing surfaces, so when collapsed, the internal actuators would give the skin a particular geometry, e.g. a butt plug, and when they are filled with fluid, it would look like a bigger plug, with maybe a prostate bulge. Alternatively, the scaffolding may be employed only in specific regions such as that held by a user, for example wherein the remainder is fluidic actuators with increased thickness than just 0.010" wall vinyl, for example. Alternatively, the skin could have "arms" that extend into the FLUDEV to occupy space between the thin actuators to give the FLUDEV some shape or body volume when the actuators are "empty."

Within embodiments of the invention the overall "bias" of an actuator(s) may be adjusted by providing a bladder, e.g. one exploiting compressed air, for example, that as inflated expands the actuator(s) and now the fluidic system is adding fluidic to the already partially expanded actuator(s). Such a bladder may be particularly beneficial in FLUDEVs without reservoirs or with low volume reservoirs relative to the overall fluidic system volume. Alternatively, the fluidic system may operate to rapidly expand actuator(s) to a predetermined "start" condition wherein the device variations are then added to this "start" condition. It would also be evident that a bladder may be provided for a second fluidic circuit independent from a first fluidic circuit comprising the EL-PUMP, EL-VALVE(s), actuators etc. This second fluidic circuit may, for example, exploit air whilst the first fluidic circuit employs a liquid. Accordingly, this second fluidic circuit may allow the size of an actuator, actuator arm, shape of a FLUDEV element or elements etc. to be established under user control such that this remains constant independent of operation of the first fluidic circuit. Accordingly, for example considering the device depicted in FIG. 1 then this may allow for the angle between the first stimulator 120 and actuated member 140 to be adjusted under user control for fit or preference. Optionally, this bladder may allow for accommodation in the reduction of the fluid volume within the first fluidic circuit over time due to an imperfect barrier for the fluid arising from the materials used within the fluidic circuit and/or mechanical tolerances, wear-and-tear etc.

Alternatively, the shape/geometry of portions of the FLUDEV may be adjusted through exploitation of the use of one or more thermoplastics within the device. For example, a thermoplastic section disposed at the base of the actuated member 140 at the point the actuated member joins the FLUDEV body may allow for the user to adjust the shape/geometry to allow for customized fit and/or preference. For example, using a thermoplastic such as HDPE for this section would allow the FLUDEV to be inserted into a container with hot water such that the HDPE reaches close to or its softening temperature allowing the section to be deformed with relatively low force. If all other elements of the FLUDEV have higher softening temperatures, then the remaining portions of the FLUDEV are unaffected. Alternatively, the deformable element is raised to the appropriate temperature through exposure to hot air (e.g. hair dryer) or may incorporate heaters allowing the device to be electrically heated in that region for adjustment.

Within embodiments of the invention described supra in respect of FIGS. 1 to 44 the EL-VALVEs and EL-PUMP are described with a piston sliding within a bobbin around which is wound the coil or coils. Alternatively, a pair of coils could be at the either end of the EL-VALVE, outboard of the piston. Optionally, designs may employ a single coil with two magnets. Each magnet would close a gasket or open in a manner similar to that described in respect of embodiments of the invention and rather than a double ended solution, each magnet would close its own single valve. In this alternative each valve end has its own magnet. Optionally, the ports on the EL-VALVE may be within the side walls of the piston tube such that the fluid flow is perpendicular to the axis of the EL-VALVE when the piston is moved to unblock the ports. This configuration being referred to as a "T" valve configuration rather than a "U" valve configuration wherein the ports are on the end of the EL-VALVE such that fluid flow in/out is along the axis of the EL-VALVE and the fluid undergoes a "U-turn" between inlet and outlet.

Whilst within the preceding FIGS. 1 to 44 the body of the insertable portion has not been described or depicted in detail these may be similar to one or more prior art dildos and/or vibrators and other ADDEVs. The outer surface of an insertable portion of the FLUDEV may be smooth, contoured, grooved, ribbed, and/or comprise bumps and/or nubbies. Optionally, the contours may extend further across the upper surface of the ADDEV or they may be more centrally limited. Optionally, the depth, spacing, and number of grooves may vary as well as their surface profile from symmetric to asymmetric etc. Optionally, the upper surface may be smooth, or it may be profiled by the distribution of nubbies across upper surface regions in some embodiments of the invention. Within others features that have multiple "fingers" or "fronds" may be employed to provide different sensations. Optionally different regions of the ADDEV may have different structures such as nubbies, grooves, smooth areas etc. on the upper central bump as well as its sides.

Further, whilst the actuated member was described and depicted with respect to FIGS. 1 to 18 with 6 FLUBINTs along its length with 4 chambers coupled to 2, 2, 1, and 1 FLUBINTs it would evident that other configurations may be considered and implemented both in terms of the number of FLUBINTs, their positions, the number of chambers coupled to them and the number of FLUBINTs actuated from each chamber within the actuated member. It would be further evident that alternate designs of FLUDEVs may exploit two or more actuated members and/or actuated members in conjunction with non-actuated members or actuated members exploiting convention prior art mechanical vibration elements or alternate vibration/mechanical actuators such as described and depicted by the inventor within their World Patent Application WO/2016/008,032 entitled "Methods and Devices relating to Vibratory Impact Adult Devices" filed Jul. 17, 2015.

The FLUDEV may be provided in a range of physical sizes such that, for example, the length of an inserted actuated member (e.g. for vaginal insertion) may be 65 mm, 75 mm, 100 mm, 125 mm, 150 mm, or 200 mm for example (2.5", 3", 4", 5", 6" or 8") and its lateral dimensions may be, for example, 15 mm, 25 mm, 35 mm, 40 mm, 50 mm, or 75 mm (0.6", 1", 1.4", 1.6", 2", or 3"). Similarly, lengths between vaginal and clitoral elements or vaginal and anal elements may be provided in different dimensions. Where an anal insertion element is provided its length and lateral dimensions may be over a similar range as the vaginally inserted portion. Whilst typically the vaginally inserted portion will have limited width variations along its length an anally inserted portion may have larger width variations and may have a length/width ratio lower than the vaginally inserted portion. However, other dimensions, aspect ratios, cross-section geometries etc. may be employed without departing from the scope of the invention. In embodiments of the invention supporting an FLUDEV with separate motor element for placement elsewhere on the user's body and/or apparel this intermediate flexible drive shaft may be 75 mm, 100 mm, 125 mm, 150 mm, 200 mm, or 300 mm for example (3", 4", 5", 6", 8", or 12") and its lateral dimensions may be, for example, 2.5 mm, 5 mm, 7.5 mm, or 10 mm (0.1", 0.2", 0.3", or 0.4").

Typically, the construction of an FLUDEV such as depicted within embodiments of the invention described in respect of FIGS. 1 to 18 will employ one or more central scaffolds which provides rigidity to the required portions of the FLUDEV which may be surrounded by a shell and then a casing. Whilst the casing and shell may be transparent or semi-transparent over portions or all of the FLUDEV it is common for the FLUDEV to be opaque. An outer casing may be coloured based upon skin colour tones based upon ethnicity or personal preference, e.g. Caucasian, Negroid, Mongol, light, dark, etc. as well as single colour, binary colour, multiple colour etc. According to the complexity acceptable then the outer casing may be formed from a variety of colours and/or be patterned for a specific design. Typically, such colours will be part of an elastomer or other elastomer employed in forming the casing although in other embodiments of the invention the casing may be coloured once formed and a protective fluid proof, non-toxic, non-abrasive coating formed atop these applied colours. Such instances of applied colours may include metallic lacquers, particulate lacquers for "sparkle", etc. Exploitation of elastomer coatings for the flexible drive shaft allows similar options although pigmenting of a wide variety of plastics employed in cables etc. may also be employed for outer casings of flexible drive shafts formed from other plastics and/or elastomers.

Optionally, the elastomer may be clear and either embedded into the elastomer or a shell of the FLUDEV are LEDs, such as multi-colour LEDs for example, allowing the colour of the FLUDEV to be varied either statically or dynamically, such as for example in response to commands from an associated PED generated in response to controlling ambient light, music, audiovisual content etc. Beneficially, medical grade elastomer is clear thereby removing the requirement for any additional coating (e.g. food grade urethane) in conjunction with pigmented elastomers. Accordingly, an FLUDEV may with medical grade elastomer be clear and formed from an initial sticky soft elastomer, e.g. 20 durometers, with a micro-layer (spray coated for example) of high durometer medical grade elastomer, for example 70-90 durometer, to create "slippery" surface and avoid silky smooth surface that typically requires use of urethane coating.

Typically, the casing for the FLUDEV will be formed from a non-toxic, hypoallergenic elastomer to provide a safe smooth surface although some regions of the FLUDEV may be coated, textured and/or finished with a variation from that of the remainder of the casing in order to enhance or promote retention of the FLUDEV against the user's skin or clothing. Typically, the outer surface of the casing will be formed to provide low friction as well as resistance to lubricants that may or may not be employed.

Typically, within the outer elastomer or elastomeric casing is a shell that houses internally, in the embodiments presented, vibratory motors, battery, control circuit and charging port. Within embodiments of the invention other functional elements may be employed for generating physical stimulus, providing user interface, wireless transceiver for communicating to an associated electronic device (PED or FED) or other FLUDEV, etc. Within the description of embodiments of the invention and associated figures such elements are not presented for clarity of description, figures etc. However, such elements may or may not be implemented within embodiments of the invention. Accordingly, the shell may comprise a single chamber or a plurality of chambers and may be formed from a single piece part or multiple piece parts which are connected via the casing and/or discrete or connected by a central portion with different degrees of rigidity range from solid to a living hinge.

Optionally, the FLUDEV may employ one, two, three or more motors as well as actuators of one, two or more different technical approaches. For example, one or more vibratory motors may provide high end vibrations whilst one or more vibratory or high impact gear-reduced motors may provide a low frequency "rumble" from larger weighted motors or through controlled frequency offset "throbbing." Optionally, linear vibratory motors may be disposed within the regions on the outer surface of the recipient's body or the inserted portion(s) whilst generally rotating asymmetric weight motors are within the shell of the inserted portion(s). Optionally, the outer surface of the FLUDEV may provide electrical stimulation contacts through metal contacts or conductive elastomer pads for example at predetermined locations on the inserted portion as well as the discussion supra in respect the clitoral region. Equally, contacts may be disposed on the lower outer portion of the FLUDEV to engage the recipient's buttocks.

Embodiments of the invention with respect to controlling an FLUDEV such as described within the embodiments of the invention supra in respect of FIGS. 5 to 18 may employ one or more methodologies as known within the art. Such control may be provided, for example, through a remote control wirelessly connected to the FLUDEV, a PED or FED wirelessly connected to the FLUDEV, a remote control wired to the FLUDEV, and a control interface on the FLUDEV allowing selection of predetermined program. In instances of wireless interfaced controllers, the control may be local, i.e. by a user engaged in a sexual activity involving the FLUDEV, or the control may be remote.

A FLUDEV according to embodiments of the invention may exploit an EL-PUMP for filling/pressurizing fluidic actuators. Unlike other pumps an EL-PUMP offers essentially independent control of stroke length, stroke frequency, and pressure over a large control range such that very long and/or complex control patterns can be generated in order to provide varying actuation cycles, degree of actuation, etc. of the multiple fluidic actuators within the FLUDEV.

Amongst the issues for users of FLUDEVs is the noise level as in certain instances discreet operation of the device may be desired. Accordingly, whilst the vibrator actuators of the FLUDEVs according to embodiments of the invention are intrinsically quiet unlike their prior art vibratory motor counterparts the EL-PUMP(s) and/or EL-VALVE(s) may require some modifications and/or adaptions to reduce noise within the device. For example, between the 6-Shooter 1400 and Manifold 1030 there are disposed Washers 1470 (or O-rings) formed from a compliant material which act to remove "chatter" between the 6-Shooter 1400 with its oscillating or moving pistons and the actuated member. Such washer or O-ring elements may also be disposed between the inlet of the 6-Shooter 1400 and the outlet port 695 of the wall portion 240. Additionally, the EL-PUMP is primarily isolated as an element apart from its mounting to the wall portion 240 as depicted in FIG. 6 and is surrounded by fluid which dampens acoustic vibrations by appropriate properties of the fluid. Accordingly, the isolation of the EL-PUMP may be adjusted by the flexibility/resilience of the mounting of the EL-PUMP to the scaffold/shell of the FLUDEV.

The inventors have also established that there are tradeoffs in the selection of the viscosity of the fluid within the FLUDEV with respect to different aspects of the FLUDEV. For example, as the fluid viscosity is varied the EL-PUMP efficiency varies but also so does the noise generated by the NRVs within the EL-PUMP, EL-VALVEs, etc. However, lowest noise performance is not at the same viscosity as maximum EL-PUMP efficiency and accordingly in some FLUDEVs the fluidic viscosity will be geared to low noise (e.g. personal consumer devices such as adult devices for example) rather than device "lifetime" on a battery charge. Further, multiple tradeoffs may be established and hence the fluid viscosity may be established based upon the overall device requirements rather than solely electrical efficiency. It would be beneficial if the selected fluidic viscosity in such tradeoffs sustained laminar flow within the different fluidic elements such as EL-PUMP, EL-VALVE, etc.

Embodiments of the invention with respect to powering an FLUDEV such as described within the embodiments of the invention supra in respect of FIGS. 1 to 18 may employ one or more methodologies as known within the art. For example, the FLUDEV may comprise a rechargeable battery or batteries within the shell which may be of a standard form/type, such as AA, AAA, etc. or custom to the FLUDEV and/or another product. Alternatively, the FLUDEV may employ non-rechargeable batteries and require an access to allow in insertion/removal of the battery or batteries or the FLUDEV may be disposed of once the batteries have been exhausted. Optionally, the FLUDEV may be powered directly from electrical mains supply through a transformer to support extended use or high power requirements not supportable by realistic battery configurations allowing extended use. Where an electrical connection is made to the FLUDEV this may be similarly via a technique known in the prior art such as plug-socket connection, magnetic electrical connectors, etc.

Whilst the FLUDEV has been primarily described with respect to an FLUDEV for use in providing stimulation to a female user vaginally/clitorally it would be evident that embodiments of the invention may also be employed providing stimulation of the external vaginal area, labia, perineum, nipples, breasts etc. as well as male perineum, testes, etc.

Embodiments of the invention with respect to the FLUDEV such as described within the embodiments of the invention supra may employ a wide flat, "sticky" surface for a predetermined portion of the outer surface for engaging a recipient's body (e.g. being formed from a low durometer elastomer for example) so that the surface is designed to "stick" to skin, so it stays in place or has higher resistance to motion. This "sticky" surface may be mirror surface, matt or textured for grip. Examples of materials may be those with durometer ideal Shore A10 or lower, Shore A5 or lower, or Shore A1. In some embodiments of the invention a region or regions of the casing may be formed from a gel such as the Ecoflex™ platinum catalyzed elastomers for example certified to ISI 10993-10 for skin irritation/sensitization and having, for example, Shore 00-50 hardness (below the Shore A scale), Shore 00-30 hardness, Shore 00-20 hardness, or Shore 00-10 hardness. Within embodiments of the invention the footprint of the casing may be significantly larger than the shell (mechanical assembly) footprint, larger than the shell print, approximately the same as the shell footprint, and smaller than the shell footprint. Where the shell footprint is larger than the shell footprint its mechanical structure may be such that it does not droop under its weight/gravity when held free, droops a small amount, droops a moderate amount, or droops completely according to the desired characteristics. In embodiments of the invention the casing around the shell may act like a thin sheet (<<1 mm thick), like a fabric or material, like a sheet (~1 mm), a thick sheet (>1 mm). Optionally, the lower surface of the casing designed for placement against a user's groin/stomach may be sticky and when washed recover this stickiness in its entirety or in different regions or areas.

Optionally, the outer surface which may contact the user may be smooth with low friction to human skin, smooth with minimal friction to human skin, smooth with moderate friction to human skin, smooth with high friction to human skin in its entirety or in different regions or areas. Alternatively, the surface may be smooth, textured, and/or rough and have low friction, negligible friction, moderate friction, and/or high friction in its entirety or in different regions or areas. Optionally, the surface may be textured with low friction to human skin, textured with minimal friction to human skin, textured with moderate friction to human skin, or textured with high friction to human skin in its entirety or in different regions. Optionally, the surface of the casing in its entirety or in different regions or areas may be used in conjunction with disposable sheets that provide adhesion and/or friction in predetermined levels.

Within embodiments of the invention the casing, for example formed from elastomer, is the only material surrounding the casing and the surface profile is derived from applying the casing to the contoured surface of the shell. In other embodiments of the invention the surface profile is derived from multiple applications of a single material forming the casing. In other embodiments of the invention an additional material or materials are disposed between the shell and the casing. This, may for example, be a preform formed from the same material as the casing such that the casing is applied as a single or multiple dip coating for example, a preform formed from another elastomer of different characteristics to the casing, a preform formed from a plastic, a preform formed from a low density foam, from a medium density foam, or a high density foam. Alternatively, a combination of materials may be employed such as two or more plastics, two or more foams, a foam and a plastic, a foam and an elastomer, a form and metal. The materials may be layered, inserted, embedded, etc. without departing from the scope of the invention. However, a characteristic of these materials is the transmission of vibratory motion arising from the active elements within the FLUDEV according to embodiments of the invention. Within passive embodiments this characteristic of material selection is removed.

Within the embodiments of the invention with active elements these are mounted to predetermined portions of the shell which is surrounded by the casing. Other embodiments may exploit a passive inserted portion mimicking a dildo function rather than a vibrator. As noted above the FLUDEV according to embodiments of the invention may, in addition, to an elastomer outer comprise one or more materials to provide mechanical structures such as ridges, shell, scaffold, etc. whilst the casing is smooth.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device comprising:
   a body; defining a plurality of bobbins;
   a plurality of electromagnetically driven valve assemblies disposed within the body, each of the plurality of valve assemblies comprising:
   a piston;
   a bobbin within which the piston slides;
   one or more electromagnetic coils disposed around the bobbin for sliding the piston within the bobbin; and
   a first compliant gasket disposed at a first end of the bobbin comprising an input opening and an output opening to form a first valve associated with a respective valve assembly wherein when the piston is disposed adjacent the first compliant gasket the first valve is closed and fluid flow between the input opening and the output opening is blocked, and when the piston is disposed away from the first compliant gasket, the first valve is open and fluid can flow between the input opening and the output opening;
   an electromagnetically driven fluidic pump comprising a pump input and a pump output; and
   a first manifold comprising a plurality of inlets each fluidically coupled to a respective input opening of the first valve of the respective valve assembly and a plurality of outlets each fluidically coupled to a respective output opening of the first valve of the respective valve assembly, wherein the plurality of inlets are coupled to the pump outlet and the plurality of outlets are each coupled to a respective fluidic channel forming a predetermined portion of the device.

2. The device according to claim 1, wherein each of the plurality of valve assemblies further comprise:
   a second compliant gasket disposed at a second end of the bobbin, the second compliant gasket of each respective valve assembly comprising an input opening and an output opening to form a second valve of the respective valve assembly wherein
   when the piston is disposed adjacent the second compliant gasket the second valve is closed and fluid flow between the input opening and the output opening is blocked, and
   when the piston is disposed away from the first compliant gasket, the second valve is open and fluid can flow between the input opening and the output opening,
   wherein the device further comprises:
   a second manifold comprising a plurality of inlets each fluidically coupled to the input opening of the second compliant gasket of the respective valve assembly and a plurality of outlets each fluidic ally coupled to the output opening of the second compliant gasket of the respective valve assembly, wherein the plurality of outlets are coupled to the pump inlet and the plurality of inlets are each coupled to a respective fluidic channel forming a predetermined portion of the device.

3. The device according to claim 2, wherein for each of the plurality of valve assemblies:
the outlet of the first manifold associated with the respective valve assembly and the inlet of the second manifold associated with the respective valve assembly are coupled to a common port.

4. The device according to claim 1, wherein the plurality of inlets of the first manifold are all coupled to a common inlet coupled to the pump outlet.

5. The device according to claim 1, wherein the plurality of first gaskets are formed on a single gasket disposed across the body.

6. The device according to claim 2, wherein at least one of:
the plurality of first gaskets are formed on a single gasket disposed across the body; and
the plurality of second gaskets are formed on a single gasket disposed across the body.

7. The device according to claim 1, wherein the bobbin of each of the respective valve assembly has at least one opening; and
the first gasket comprises a first region disposed adjacent to the body and a second region defining the inlet opening and outlet opening that projects into at least one opening of the bobbin.

8. The device according to claim 2, wherein the bobbin of each of the respective valve assembly has at least one opening; and at least one of the first gasket and the second gasket comprises:
a first region disposed adjacent to the body and a second region defining the inlet opening and the outlet opening that projects into the at least one opening; and
the second region covers at least a peripheral region around the opening of the at least one opening which is larger than that defining a chamfer or shaped outer portion of the piston.

* * * * *